US008260736B1

(12) United States Patent
Lear et al.

(10) Patent No.: US 8,260,736 B1
(45) Date of Patent: Sep. 4, 2012

(54) INTELLIGENT SYSTEM MANAGER SYSTEM AND METHOD

(75) Inventors: Michael T. Lear, Baltimore, MD (US); Lawrence J. Kolankiewicz, Jr., Baltimore, MD (US); John J. Curry, III, Cambridge, MA (US); Jacob Christensen, Port Orchard, WA (US); John R. Goetz, Orchard Beach, MD (US); Kevin Dillinger, Bel Air, MD (US); James Prosser, Frederick, MD (US); Charles Johnson-Bey, Perry Hall, MD (US); Joseph W. Mills, Kingsville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 528 days.

(21) Appl. No.: 12/555,357

(22) Filed: Sep. 8, 2009

Related U.S. Application Data

(60) Provisional application No. 61/096,414, filed on Sep. 12, 2008.

(51) Int. Cl.
*G06F 17/00* (2006.01)
*G06N 5/02* (2006.01)
(52) U.S. Cl. ............................................. 706/46
(58) Field of Classification Search .............. 706/46
See application file for complete search history.

(56) References Cited

U.S. PATENT DOCUMENTS

| 7,549,077 B2 * | 6/2009 | White et al. | 714/4.12 |
| 2006/0242225 A1 * | 10/2006 | White et al. | 709/202 |

OTHER PUBLICATIONS

L-3 Communications MAPPS Inc., "Orchid® Total Development and Simulation Environment", Jun. 2009, 28 pages, Printed in Canada.
L-3 Communications MAPPS Inc., "Marine Systems—Naval Systems—Integration Ship Management System", © 2006, 1 page, http://www.mapps.l-3com.com/html/marine/isms.html.
Raytheon Company, "Zumwalt-Class Destroyer", © 2008, 2 pages, http://www.raytheon.com/capabilities/products/zumwalt/index.html.
Rolls-Royce, "Marine", © 2004, 1 page, http://www.rolls-royce.com/marine/markets/naval/default.isp.
Rolls-Royce, "A Balanced Marine Product Portfolio", © 2006, 6 pages, Printed in England.
MTU Online, "Ship Automation", date unknown, printed Sep. 2, 2008, 1 page, http://www.mtu-online.com/mtu/en/produ/prodelec/prodelecmari/.
Servowatch, "Home", date unknown, printed Sep. 2, 2008, 2 pages, http://207.56.176.102/.
Northrop Grumman, "Sperry Marine", © 2005, 1 page, http://www.sperrymarine.northropgrumman.com/products/.

* cited by examiner

*Primary Examiner* — Michael B Holmes
(74) *Attorney, Agent, or Firm* — Clement A. Berard, Esq.; Dann, Dorfman, Herrell & Skillman, PC

(57) ABSTRACT

An intelligent system manager system and method for managing and controlling a platform may comprise a management component providing intelligent decision support and managing platform functions responsive to data representative of the platform and equipment thereof; an execution and monitor component for causing execution of commands controlling the platform and equipment thereof, and monitoring the execution of the commands and the status of platform sensors and platform equipment; a display component providing information representative of the current state of the platform and receiving input; and a common services component providing processing services to the management component, to the execution and monitor component and to the display component.

48 Claims, 24 Drawing Sheets

Ship Systems Control Integration       Change | Log Out  [ SID_ROOT_@ICS]

41-02-4FOS-PT-0001

- Explore
- Reporting
- Quick Report
- User Queries
- Export
- Options
- Device Library
- Admin Edit | History

General

| | |
|---|---|
| Component Type | DPT |
| Component ID | 4 |
| Signal Item | 1 |
| Equipment Name | 2565 |
| SWBS | 2505 |
| HMI Screen ID | |
| Commanded/Monitored | Monitored |
| Safety Critical | |
| Signal Type | Analog Input |
| Signal Name | 2566 |
| Remarks | |

Location / Connection

| | |
|---|---|
| Level | 5 |
| Compartment | 31 |
| I/O Box | 2P |

Common Processes (3000)

INTELLIGENT SYSTEM MANAGER SYSTEM AND METHOD

This application claims the benefit of U.S. Provisional Application No. 61/096,414 filed Sep. 12, 2008, entitled "INTELLIGENT SYSTEM MANAGER SYSTEM AND METHOD" which is hereby incorporated herein by reference in its entirety.

The present invention relates to a system manager system and method, and in particular to a system manager system and method that monitors and controls a platform.

Process, plant and machinery control systems, particularly for naval and commercial shipboard applications, as well as for other mobile and fixed applications, have historically been designed in a centralized fashion with many systems operating independently of one another. This practice results in "stove-piped" systems that operate side-by-side and independently, each being controlled on its own, without significant communication amongst the systems. In stove-piped systems, the various elements generally do not communicate or in the limited instances in which they do communicate, communication is via vendor-proprietary communication protocols which oftentimes leads to troublesome issues when integrating, maintaining and/or upgrading a system.

In addition, the application engineering effort required to customize these control systems for specific platform applications has traditionally been significant and has required highly skilled engineers to make different software system modifications for each different platform or application target. Where the application is a ship, for example, it is noted that similar ships, even ships of the same type or class designation, built at different times will differ in certain design features, as is the case for similar applications. The resulting differences introduce problems that will require specialized application engineering.

These conventional closed, proprietary systems are usually more costly to develop and to maintain over the product life cycle for the following reasons:

1. Using vendor proprietary protocols for machinery control results in dependencies upon that vendor, e.g., one or more equipment manufacturers, and thus tends to lead toward sole source solutions. This in turn reduces the ability of system integrators and control system suppliers to competitively select hardware solutions.
2. Using closed or point-to-point communication schemes presents challenges in implementing software systems using advanced approaches (such as real-time physics-based modeling, artificial neural networks, etc.). These communication schemes limit the ability to run software applications on distributed nodes and result in more centralized systems that lack the increased reliability and survivability typically realized in distributed systems. As technology matures and changes, the foregoing effects tend to grow worse and further erode reliability and survivability.
3. Using multiple stove-piped systems rather than one integrated control system adds costs in the areas of operation, training, and maintenance. Typically, each stove-piped system tends to require its own operators, trainers, and maintainers, and so the personnel required to manage multiple stove-piped systems tends to quickly multiply as the number of stove-piped systems on a particular platform increases. An integrated system, on the other hand, tends to require fewer operators, trainers, and maintainers, and so can reduce personnel requirements, thereby to produce significant cost savings throughout the system life cycle. The integrated system may also provide operators with enhanced situational awareness and greater supervisory monitoring and control capability.
4. Lack of integration between subsystem equipment items and their associated control systems limits the ability to develop and utilize autonomous software entities. Decision making software applications can be employed in an integrated system, such as an Intelligent Decision Support System (IDSS), and can be capable of monitoring and controlling the states of equipment and systems, thereby to reduce the cognitive load on operators through increased automation, increased repeatability and higher levels of system integration. This supports cost saving initiatives such as reduced manning in Naval applications and reduced staffing in industrial automation applications.
5. Limited use of open architecture principles and standardized, robust system engineering practices (such as the effective use of ship adaptation data and smart signal management tools) constrains the efficiencies that can be realized when scaling and adapting control systems to different platforms. Typically, these closed proprietary systems require that a unique solution be developed, often from the ground up, for each platform where it is applied.

Accordingly, there is a need for a system and method for intelligently managing a platform.

To this end, an intelligent system manager system for managing and controlling a platform may comprise a management component providing intelligent decision support and managing platform functions responsive to data representative of the platform and equipment thereof, an execution and monitor component for causing execution of commands controlling the platform and equipment thereof and monitoring the execution of the commands and the status of platform sensors and platform equipment, a display component providing information representative of the current state of the platform and receiving input, and a common services component providing processing services to the management component, to the execution and monitor component, and to the display component.

In another aspect, a method for intelligently managing and controlling a platform may comprise:
providing intelligent decision support and managing platform functions for providing tasks and/or commands for controlling a platform and equipment thereof;
causing execution of the tasks and/or commands;
monitoring the execution of the commands and the status of platform sensors and platform equipment;
providing information representative of the current state of the platform and equipment thereof for display;
receiving input for controlling the platform and/or equipment thereof from a human; and
providing common processing services.

BRIEF DESCRIPTION OF THE DRAWING

The detailed description of the preferred embodiment(s) will be more easily and better understood when read in conjunction with the FIGURES of the Drawing which include:

FIG. 7 is an illustration of an example screen snapshot showing an example database screen of the example intelligent system manager system;

Figure 1:
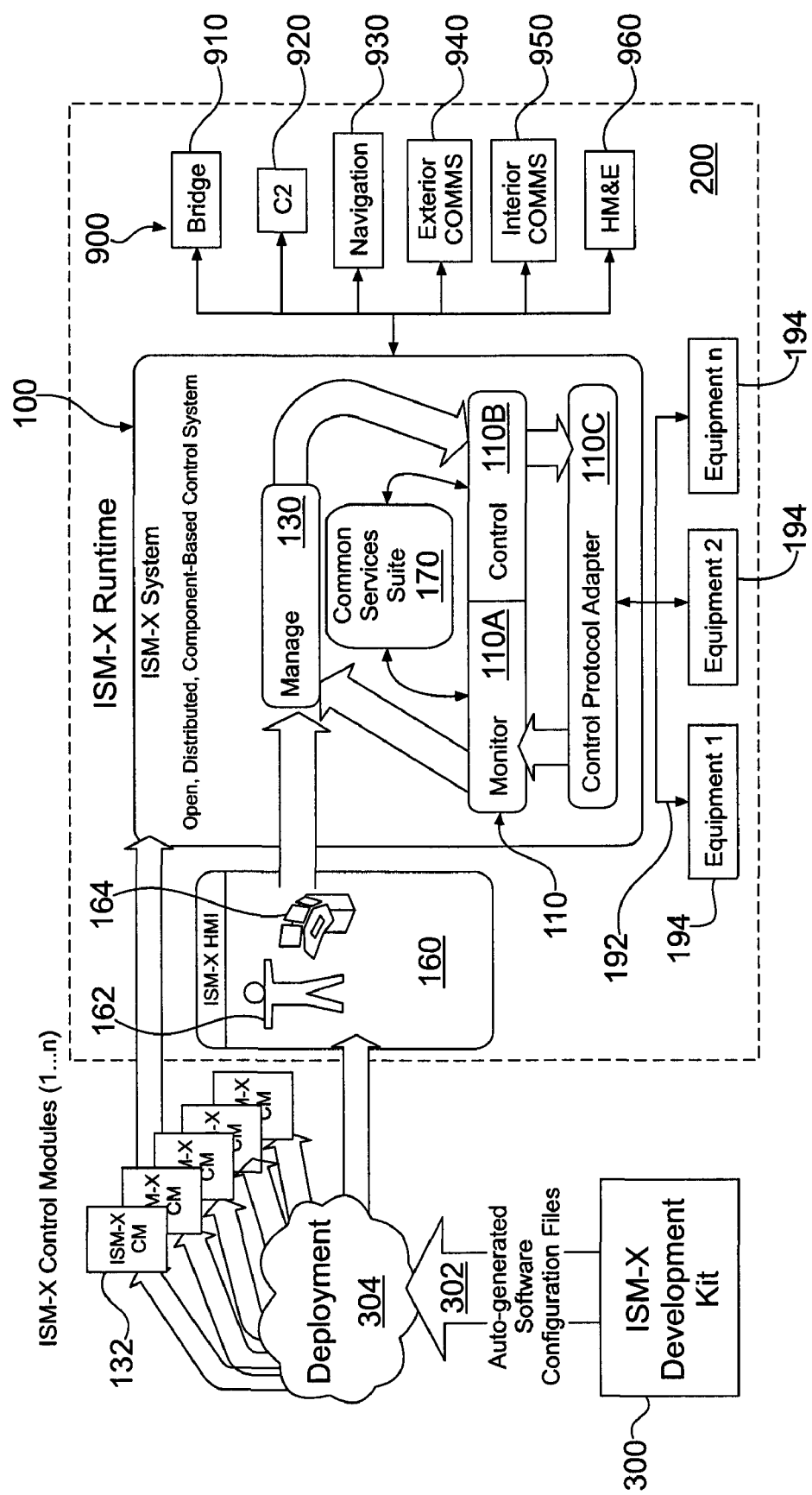
FIG. 1 is a schematic flow diagram illustrating deployment of an example embodiment of an intelligent system manager system having plural components.

In the Drawing, where an element or feature is shown in more than one drawing figure, the same alphanumeric designation may be used to designate such element or feature in each figure, and where a closely related or modified element or partial element is shown in a figure, the same alphanumerical designation primed or designated "a" or "b" or the like may be used to designate the modified or partial element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

As a general matter, the item numbers of the blocks (boxes) of the Figures are identified in the description, and the text in the blocks (boxes) of the Figures generally repeats that information for the convenience of a reader looking at the Figures.

DESCRIPTION OF THE PREFERRED EMBODIMENT(S)

In the example context of a ship control system 100, the ISM-X™ system 100 provides monitoring 110A, management 130 and control 110B of shipboard hull, mechanical and electrical (HM&E) systems including but not limited to Auxiliary, Damage Control, Power, Propulsion, and Ride Control systems. ISM-X™ system 100 is capable of autonomous control of HM&E systems, e.g., through suitable control logic and/or intelligent software applications, or of manual control by ISM-X™ operators 162, e.g., via a human machine interface (HMI) 164. ISM-X™ system 100 also provides external interfaces 900 for communication with Command and Control (C2) systems 920, Integrated Bridge Systems (IBS) 910, Navigation (NAV) Systems 930 and External Communications (EXCOMMS) systems 940 to enable remote (e.g., off board) monitoring and control of the HM&E systems, as well as internal communication systems 950.

The following provides a summary of the ISM-X™ System Architecture, and may be read in conjunction with FIGS. 1, 2, 3, 4, and 5:

The ISM-X™ system 100 includes two primary elements: a Runtime Application 200, and a Development Kit 300 that is utilized to compile Runtime Application 200. Development Kit 300 comprises a Systems Control Intelligent Database (SCID) 310, an automated check list manager 320, and interfaces to software packages (some or all of which may be Commercial Off The Shelf (COTS) software packages) for simplified development of Graphical User Interface (GUI) screens 330, control logic 340, system simulations 350, and data historian/trending functions 360. Data and/or information relating to a platform is typically provided by an engineer, designer or other person seeking to design and/or develop and/or configure a platform or system, e.g., development kit 300 is a considered a tool for such person. Development Kit 300 receives and/or stores data representing a desired and/or specified configuration, characteristics and functions for an actual platform 10, e.g., a ship, vessel, aircraft, installation, building, facility, or other thing or location, including various systems, equipment and machinery thereof. Development Kit 300 may also receive and/or store input data, e.g., representative of sensor values and the like, that represent specifications and/or limits of the conditions and/or status of the platform 10 and its systems, equipment and/or machinery, at which certain actions may be initiated and/or taken.

As described herein, the Development Kit 300 tool processes that received and/or stored data to configure a runtime application 200 that is representative of an actual configuration, condition and/or status of a platform 10 and of its systems, equipment and/or machinery, in a form that will be useful for processing actual then-present data for monitoring, managing and/or otherwise operating such platform 10 when the platform 10 is built or made. Development kit 300 is typically utilized by design engineers, systems engineers, and similar persons, to develop a control system 100; it does not use inputs of actual sensor values which are received by and utilized by runtime application 200. Preferably, the data that is representative of an actual configuration, condition and/or status of a platform 10 and of its systems, equipment and/or machinery, is provided by Runtime Application 200 described herein which may be installed and/or loaded on the platform 10. Such data is typically developed, compiled and displayed on a display or other device in a form that a human designer and/or engineer or other operator can observe, understand, debug, test, and use, in designing and/or configuring the platform 10.

Runtime Application 200 is represented as a component based software system architecture including an Execution and Monitor Component 110, a Management Component 130, a Display Component 150 and a Common Services Component 170. Runtime Application 200 receives and/or stores data representing the configuration, characteristics and functions of an actual platform 10, e.g., a ship, vessel, aircraft, installation, building, facility, or other thing or location, including various systems, equipment and machinery thereof. This platform-specific representative data is provided for a specific platform 10 as compiled into a complete runtime application 200 for that specific platform 10, typically and preferably from development kit 300. While running, Runtime Application 200 receives and/or stores data, e.g., sensor values, alarm values, operator provided values, and the like, that represent the actual then-present condition and/or status, or a desired and/or proposed condition and/or status, of platform 10 and its systems, equipment and/or machinery.

As described herein, Runtime Application 200 evaluates and/or processes that received and/or stored data to generate and provide data that is representative of the actual then-present configuration, condition and/or status of the platform 10 and of its systems, equipment and/or machinery, preferably at a time sufficiently close in time to the reading of the then-present conditions and/or status so as to be useful for monitoring, managing and controlling the platform 10 and its systems, equipment and/or machinery. Such updated then-current data is typically processed and displayed on a display or other device in a form that a human operator can observe, understand and use. For things that may change quickly, e.g., in a matter of seconds or minutes, the updated then-current output data is preferably provided within, e.g., seconds or minutes; for things that change more slowly, e.g., in a matter of several minutes or hours, updated then-current output data may be provided later in time, e.g., after several minutes or hours. Thus, "real-time" may be defined differently in different contexts, and does not mean immediate.

Runtime Application 200:

The Display Component 150 within the ISM-X™ runtime application 200 provides a Graphical User Interface (GUI) via an HMI 164 to the operator 162 for situational awareness, system control capabilities, and display of data from ISM-X™ or external software entities. The Display Component 150 provides a means to display system status and equipment monitoring information to one or more Human Machine Interface (HMI) screens 164, e.g., displays for viewing by and/or interaction with one or more human operators 152. HMI displays 164 may be located at various locations in the operating environment, e.g., a vessel or other platform 10, as may be necessary for operational function, redundancy, and/or for convenience. The Display Component 150 will also process operator input and route the inputs to the appropriate components for further functional analysis, processing, and execution. Display Component 150 contains several core ISM-X™ screens for interaction with ISM-™ common services 170. Display Component 150 also provides the means by which operators 152 can view and navigate amongst custom built GUIs for monitoring, controlling and varying the levels of detail presented regarding individual subsystems.

The Management Component 130 within the ISM-X™ runtime application 200 provides two tiers of control: (a) upper tier Intelligent Decision Support Systems (IDSSs) 131-139, and (b) lower tier Equipment Controllers 140-145. The IDSSs 131-139 are autonomous agents that employ complex logic and decision making algorithms, expert systems, rules engines and predictive models to determine system assessments and corrective actions in response to data provided by one or more sensors and/or manual inputs. Examples of envisioned IDSSs, e.g., in the context of a shipboard HM&E control system, are provided in the Entity Description section below.

The upper tier IDSSs 132-139 submit tasks to a Task Manager 131 which analyzes proposed task priority, impact, availability and compliance with established procedures and/or doctrine. Using these criteria, tasks are de-conflicted (e.g., conflicts between different tasks are resolved and/or tasks are reconciled, and/or conflicts between tasks and doctrine and/or established procedures/limits are resolved and/or reconciled), prioritized, and distributed to the appropriate lower tier Equipment Controller 140-145.

The lower tier 140 of the Management Component 130 within the ISM-X™ runtime application 200 is the Equipment Controller tier 140. The Equipment Controllers 141-145 receive tasks from the upper tier IDSS 131-139 management functions, or from an operator 162 via HMI 160, and determine appropriate step-by-step responses (e.g., equipment commands) and send these commands to the Execution and Monitoring Component 110 for execution. Equipment Controllers 141-145 may be software and/or hardware based traditional Programmable Logic Controllers (PLCs) (e.g., using ladder logic, function blocks, or other IEC 61131 and 61499 standard programming conventions, and/or C++ or Java).

The Execution and Monitor Component 110 within the ISM-X™ runtime application 200 provides an interface 110C with the input/output (I/O) equipment 190-194 associated with all sensors and actuators of the machinery (HM&E) control system. It provides data conversion services (e.g., filters data and converts data from raw signal measurements into engineering units) for current sensor values coming into the system and also distributes the automated tasks, automated commands and operator generated control signals to equipment actuators via the I/O equipment 190-194.

It is noted that various sensor values and alarm values represent actual physical conditions of different places and/or different equipment and/or different parts of an installation or vessel or other place, e.g., generally local conditions, that are transformed by the system and method described herein to provide a representation of the overall state and/or condition of the installation, vessel or place, e.g. a representation of the complete installation, vessel and/or place. Further, the system and method generates tasks and commands that are executed to transform the installation, vessel or place into a different configuration, i.e. into a different installation, vessel or place, and a representation of that different configuration is provided to human operators. System 100 described herein may include one or more general purpose and/or special purpose computers, or microprocessors or other processors, and the method described herein may be performed in part by one or more general purpose and/or special purpose computers, or microprocessors or other processors.

The Execution and Monitoring Component 110 within the ISM-X™ runtime application 200 also employs a robust controller adapter 110C design which allows seamless integration with a variety of field bus protocols 110C and which enables interfacing with multiple I/O equipment 190-194 types in a single platform 10. This framework allows an ISM-X™ system to utilize various types and kinds of I/O controllers which is expected to result in long-term integration cost savings, e.g., if the system integrator desires different types of I/O equipment 190-194 (e.g., including reusing existing equipment) for system implementation.

The Common Services Component 170 within the ISM-X™ runtime application 200 provides common or shared services to be utilized by any or all of the other applications on any or all of the display and processing nodes. Each component may utilize any one or more of the common service libraries which may include, e.g., services such as Time 171, Station Control 172, Security and Login 173, Data Logging 174, Event Logger 175, Application Health Monitor 176, Alarm Manager 177, Lifecycle Services 178 (system startup/shutdown, health monitoring, and fault tolerance), Data Trending 179, and Communication Services 180. The common service libraries are described below.

Utilizing common services 170 components that act and/or can act to provide functionality to some or all components results in a more efficient system design and operation and enables a greater level of system integration and distribution. Each component will utilize those common services 170 that are necessary and/or useful for that component performing its function, and may not utilize other common services 170. For example, all software entities within an ISM-X™ system 100 may communicate via messaging services provided by the Communications Common Services component 180. Each of the three other Components 110, 130, 150 will use this Common Services Component 170, e.g., in order to communicate and/or operate over the Local Area Network (LAN) 102. This enables entities to be hosted on one-to-many distributed nodes 132 with no modifications to the executable code.

As shown in FIG. 1, the ISM-X™ development kit 300 includes tools that enable software and configuration files to be generated 302 automatically and deployed 304 on a plurality of control modules 132, e.g., ISM-X™ control modules 1 through n. The configuration files define signals that are mapped to the I/O hardware, GUIs that are linked to the signals they are to display, checklists (sometimes referred to as "kill cards") that are loaded and linked to the signals, and system simulations that are linked to the signals, so that all are consistent and operative together. The control modules 132 on which the software is deployed can be easily distributed to various system components, and inherently tend to increase redundancy and survivability. Control module 132 software can be easily reconfigured by utilizing this process.

The ISM-X™ system 100 provides a truly open, integrated, distributable, scalable, control system that is independent of the particular hardware employed (e.g., not limited to any particular hardware and/or equipment) and is capable of monitoring, controlling, and managing a wide range of different systems and equipment.

Figure 4:
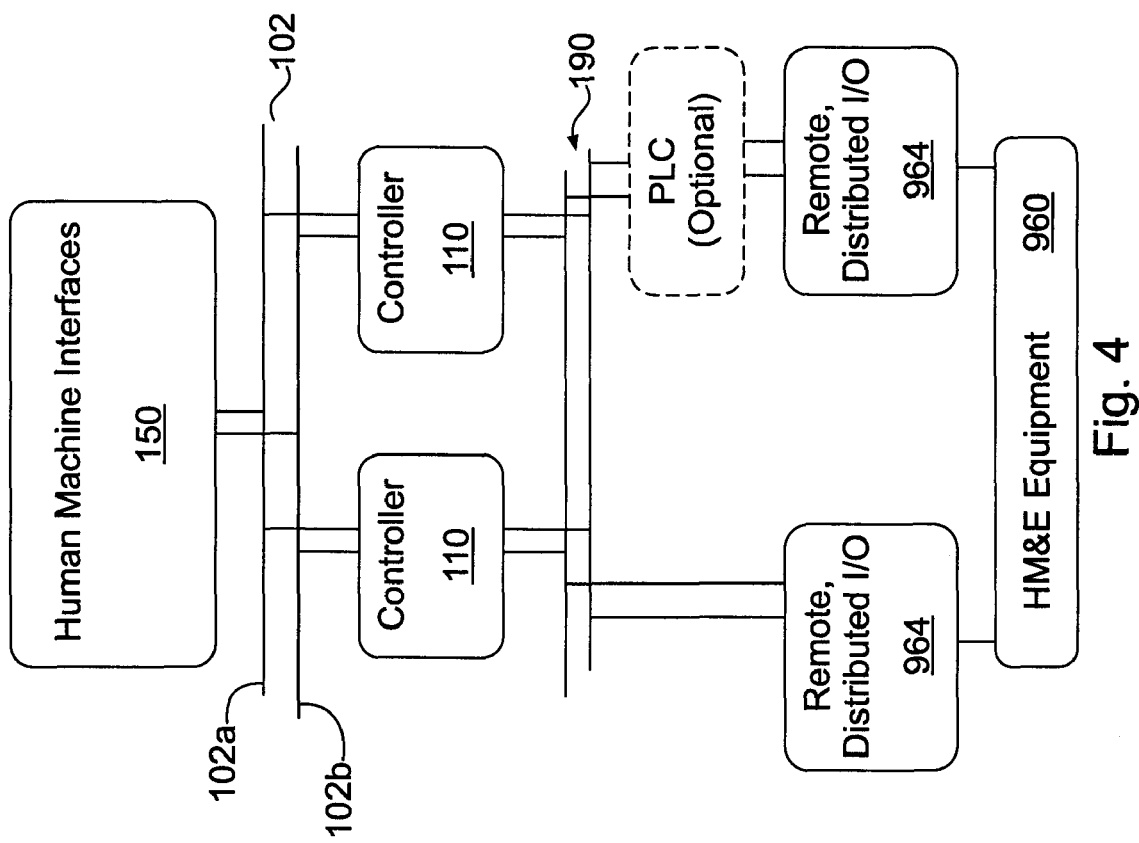
FIG. 4 is a schematic diagram of an example arrangement whereby the example intelligent manager system is independent of particular items of hardware.

The schematic diagram of FIG. 4 includes an example arrangement illustrating how the example intelligent manager system is preferably independent of particular items of hardware. HM&E equipment 960 of various types interface with the ISM-X™ system 100 via plural remote distributed input/output (I/O) devices 964 that communicate with equipment and controllers via standardized communication protocols and are available from several different suppliers located in several different countries. Controllers 110 of the ISM-X™ system 200 are preferably standardized devices, including, e.g., compact PCI controllers, PC 104 controllers, PC controllers, rack mount controllers and VME controllers, which are also available from plural sources. Human machine interfaces (HMI) 160 also preferably include standardized devices 164 that accept input data and provide output data in accordance with standardized protocols, and may include devices 164 such as multi-screen consoles, local operating panels, portable display units, workstations, computer displays, laptop and other portable computers and the like, which are either themselves standardized or include standardized devices.

Communication among the distributed input/output (I/O) devices 964 and HM&E equipment 960 utilizes one or more standardized communication protocols and so is independent of the particular I/O device hardware. Communication may employ discrete wiring and/or optical fibers, and may employ serial communication that adheres to a standard protocol. Communication among the plural I/O devices 964 and one or more controllers 110 within the ISM-X™ system 100 is preferably via one or more standardized field bus protocols 190 which may include e.g., Profinet, Profibus, Modbus Fairnet, and other suitable standard protocols. Communication between controllers 110 and HMI 160 is preferably via a fiber optic communication network 102, and that network preferably includes redundant communication paths 102A, 102B and I/O devices, and also preferably has a suitably high data carrying capacity, e.g., typically exceeding one gigabit per second. ISM-X™ system 100 is capable and/or adaptable to meet the requirements of a large number of different platforms 10.

Development Kit 300:

The ISM-X™ development kit 300 includes the system control intelligent database (SCID) 310 and simplified COTS software applications for GUI development 330, logic development 340, simulation development 350, and data historian/trending development 360. Kit 300 allows the user to more easily develop control system applications for specific control systems through the use of a standardized development kit. The SCID 310 provides a means for configuration management and thorough definition of all control system signals, wherein each signal is uniquely defined in a configuration file 383 which includes the attributes of each signal. This configuration file can be managed, updated and reloaded into the runtime application 200 at any time, which typically results in significant cost savings during development and operation of the control system 100.

The signal attributes contained in the SCID 310 configuration file, e.g., a database, are typically defined by or from data that may be contained in an Interface Control Document (ICD), which ICD may be generated automatically from the signals database 383, thereby to reduce cost and save time, not to mention improving consistency. Such signal attributes may include all or some of the items listed in Table I below:

TABLE I

SCID CONFIGURATION FILE SIGNAL ATTRIBUTES

Electrical characteristics of all sensors and/or actuators related to the signals, e.g., signal type (analog or digital), value range (e.g., voltage, current, number of bits/bytes), units (e.g., volts, amperes, psi) and the like.
Unique signal identification codes.
Identification of the sensor and/or actuator power source(s).
Identification of the machinery and/or system to which the signals relate, including, e.g., installed location and system associations.
Identification of the vessel drawing or machinery reference document from which the ICD information is prepared or obtained.
Identification of the alarm and/or warning limit and/or other alarm criteria.
Identification of the RTU to which each signal is allocated.
Identification of the card and channel to which the signal is allocated.
Any interlock, interconnection, and/or inhibition of any signal with any other signal data.
If a particular signal is the resultant of some function and/or of some logic from other signals, then a brief description of such function with operating information like input data, tables, ranges, and the like.
Whether a signal is internally generated (e.g., by hardware and/or software) or is a field signal.
Whether a particular signal is or represents a warning, an alarm, a state, an operation, a change, an input, an output, a fault, or another indication.
Whether a particular signal is included in or represents an automatic mode, a semi- automatic mode or a manual mode.

Figure 5:
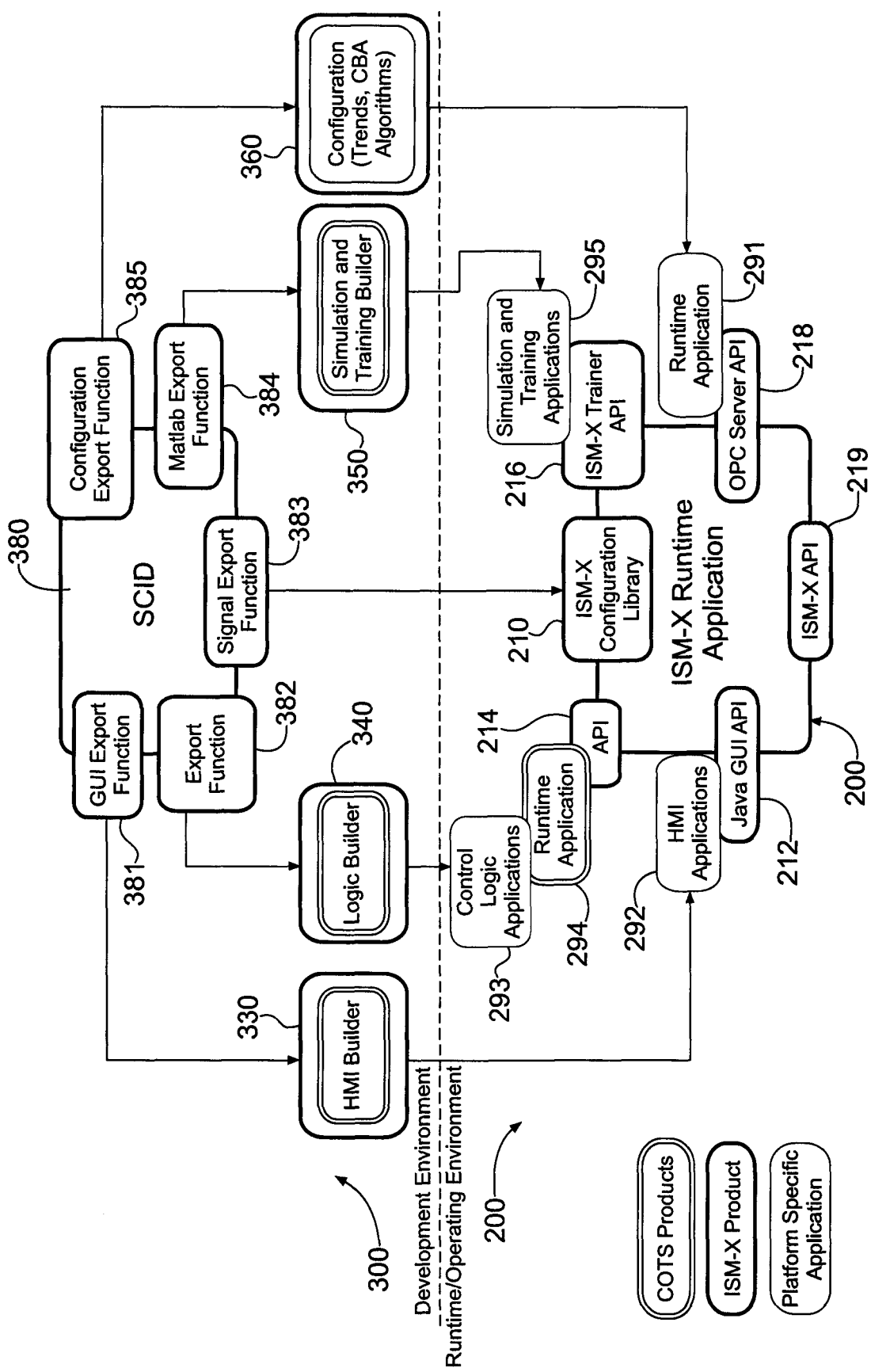
FIG. 5 is a schematic diagram illustrating example relationships between the development and runtime environments for the example intelligent manager system.

The SCID Development Tool 310 also provides the means to integrate the above mentioned COTS software applications within the runtime application 200 by tying them all together via a common signals configuration, e.g., the common configuration illustrated in FIG. 5. The Development Kit 300 significantly simplifies application engineering effort and allows specific platform applications of ISM-X™ system 100 to be adapted and developed independently from the ISM-X™ runtime application 200, and to then be integrated with the ISM-X™ runtime application 200. With the use of this development kit 300, ISM-X™ runtime application 200 may be utilized in many if not most cases with little or no modification.

Advantages Obtainable with the Present Arrangement:

Few existing solutions function across all levels of subsystem management and automation. Many solutions only work at the individual subsystem level or across a small subset of systems, but do not provide integration across all or almost all automation systems. Other solutions are seen as "high cost" to deliver truly integrated plant management systems because their architectures are not truly open and their application development costs are high. Additionally, certain other solutions advertise "open" system design, but in actuality require significant customization and interface development with each new platform design and installation. On the other hand, the ISM-X™ system 100 described herein can provide for monitoring, management and control of all systems utilizing a true open system design and can also provide a comprehensive development kit 300 therefor that provides efficiencies in the design, testing and maintenance of the control system 100.

An "open" system generally refers to a system that either has well defined interfaces so that other systems can communicate with it or that can be adapted easily to communicate with other systems. However, if an "open" system is required to interface with other systems that do not subscribe to the same interface standard, then the claim that the overall system is "open" quickly breaks down.

To avoid, or at least minimize such an unfortunate result, the ISM-X™ system 100 isolates its interfaces into a manageable class called a data port that provides for multiple hardware and software interfaces. Thus, additional interfaces may be generated without modifying the underlying base application.

In addition, the ISM-X™ system 100 utilizes an Operating System Abstraction that allows ISM-X™ to operate (run) in any operating system by keeping the base application separated from the hardware and the drivers. In addition, none of the control logic or control signals are hard coded in the base application, thereby helping to avoid another downfall of other supposedly "open" systems. Because ISM-X™ system 100 isolates the control signals and control logic from the base application, the ISM-X™ system 100 facilitates adapting the control logic and control signals without having to modify any of the runtime (or base) application code. In general, the base application is the executable code that is operating on a target processing node for controlling processes, systems and/or equipment, and the base application mainly includes the ISM-X™ runtime 200 environment and may include a portion of the ISM-X™ Development Kit 300.

Only one known solution even offers a development environment, but the development kit for that solution does not contain adequate COTS development features and does not provide a common signals management tool, and so cannot provide the features provided by the ISM-X™ system 100. On the other hand, the Development Kit 300 associated with the ISM-X™ system 100 provides an SCID 310 within the ISM-X™ Development Kit 300 to tie all of the COTS applications together in the runtime application 200.

Other known systems also require highly skilled software and systems engineers to perform the system application engineering due to the significant modifications required to be made to the runtime application. On the other hand, the ISM-X™ Development Kit 300 can be used by ship builders, systems engineers, and systems designers who are more familiar with the systems and how they operate, rather than specialists with knowledge of the software code that drives the application. As a result, the individuals who will be performing the system installation on a particular platform or site can also perform the systems and applications engineering using the ISM-X™ development kit 300, which is expected to significantly improve integration efficiency and success. Additionally, the ability for system designers to use the ISM-X™ Development Kit 300 to create a control system can tend to foster indigenous development of control systems, e.g., where highly skilled systems and software engineers may not be available.

The ISM-X™ system 100 approach to thin interface components allows for new interfaces to be implemented with the modification of very few lines of software code while leaving the core ISM-X™ application 200 unchanged. Once a particular interface protocol is developed, it will thereafter be available to future applications using the same interface standard, e.g., as part of an interface library or tool set. Additionally, the ISM-X™ system's 100 use of a hardware/operating system abstraction allows ISM-X™ system 100 to run in virtually any computer operating system and hardware platform with minimal modification, or with no modification, to the base runtime application.

Even though the control systems for many applications, e.g., ships, aircraft and other vessels, integrate multiple sub-components, e.g., relating to damage control, auxiliary systems and power management, their conventional solutions are tied to proprietary hardware and software solutions from one or more suppliers. Furthermore, the conventional approach to I/O signals management and usage is to hard code the signal attributes into the Software product, and so the system is inflexible, thus requiring significant cost and effort if signals change, e.g., if the system were to be upgraded or to be used for another platform. This also limits the scalability of these systems and of the other known solutions that do not implement a standard, flexible solution to signal management such as the one provided by the ISM-X™ system 100 described herein.

A summary of the specific features within the scope of this description include:

1. ISM-X™ Runtime 200: Open, distributed, component-based, hardware independent system architecture for a control system including a management component which can provide several key benefits over traditional architectures:

a) Intelligent Decision Support Systems (IDSSs) 130 can be developed in a modular, "plug-and-play" fashion to create a customized solution which meets the specific automation needs of the customer or user. These IDSSs can also be upgraded as technology matures (e.g., where computer processing speed increases allow for the use of resident, real-time calculation engines rather than pre-run rules-based lookup engines).

b) The aforementioned IDSSs architecture can be arranged to interoperate and provide "integrated intelligence." Depending on the functionality required, different levels of integrated intelligence are achievable. The IDSSs can interoperate with one or more companion IDSSs to provide a more integrated, automated solution, as is especially advantageous in large and/or complex systems, but all need not do so. Examples of this functionality pertaining to the ship control system domain are described in the sections below relating to the Entity Description and the Activity Diagrams, e.g., FIGS. 9 and 10.

c) ISM-X™ monitoring and control equipment 110 can be distributed and co-located with the shipboard HM&E (hull, mechanical, and electrical) equipment which it is monitoring/controlling to enhance reliability and survivability of the control system, or may be centralized, or may be partly centralized and partly decentralized, as may be desired and/or required for a particular system.

2. A control protocol "adapter" 110C which provides a library of control interfaces that supports the inclusion of numerous types of I/O hardware devices 194 (thus eliminating reliance upon one particular hardware provider which can reduce the cost of upgrading and/or migrating the ISM-X™ system 100 to new platforms).

3. Service based architecture supports communication with and among command and control systems, navigation systems, and other external devices, and with vessel 900 hull mechanical and electrical (HM&E) systems, across standard interface protocols via common communication schemes to provide a fully integrated vessel or other plant control system.

4. ISM-X™ Development Kit 300:

The ISM-X™ Development Kit 300 provides a highly integrated set of tools to be employed to configure and design specific control systems. The SCID 310 is the part of the development environment that serves as a repository for data for managing all equipment data, a signals database, system configuration deployment mapping and other application specific parameters. This development kit 300 facilitates platform specific control system application development in a simplified fashion independently of the runtime application. Example tools within the Development Kit may include the tools listed in Table II below:

TABLE II

| DEVELOPMENT KIT EXAMPLE TOOLS |
| --- |
| System Control Intelligent Database (SCID) 310. |
| Automated Checklist Manager 320. |
| Logic Development Tool 340. |
| Graphics Development Tool 330. |
| System Simulation Development Tool 350. |
| Data Historian/Trending Development Tool 360. |

The Development Tool Kit 300 provides a simplified integrated development environment for the creation of Human Machine Interfaces (HMI) 350, control logic, system simulations and models, and data trending and historian applications. Because configuration data from the common SCID 310 is utilized by all parts of the Development Tool Kit 300, the entire system 100 is kept synchronized and consistent throughout its development. Detailed descriptions of these tools are provided in the section below relating to the Development Environment.

Figure 2:
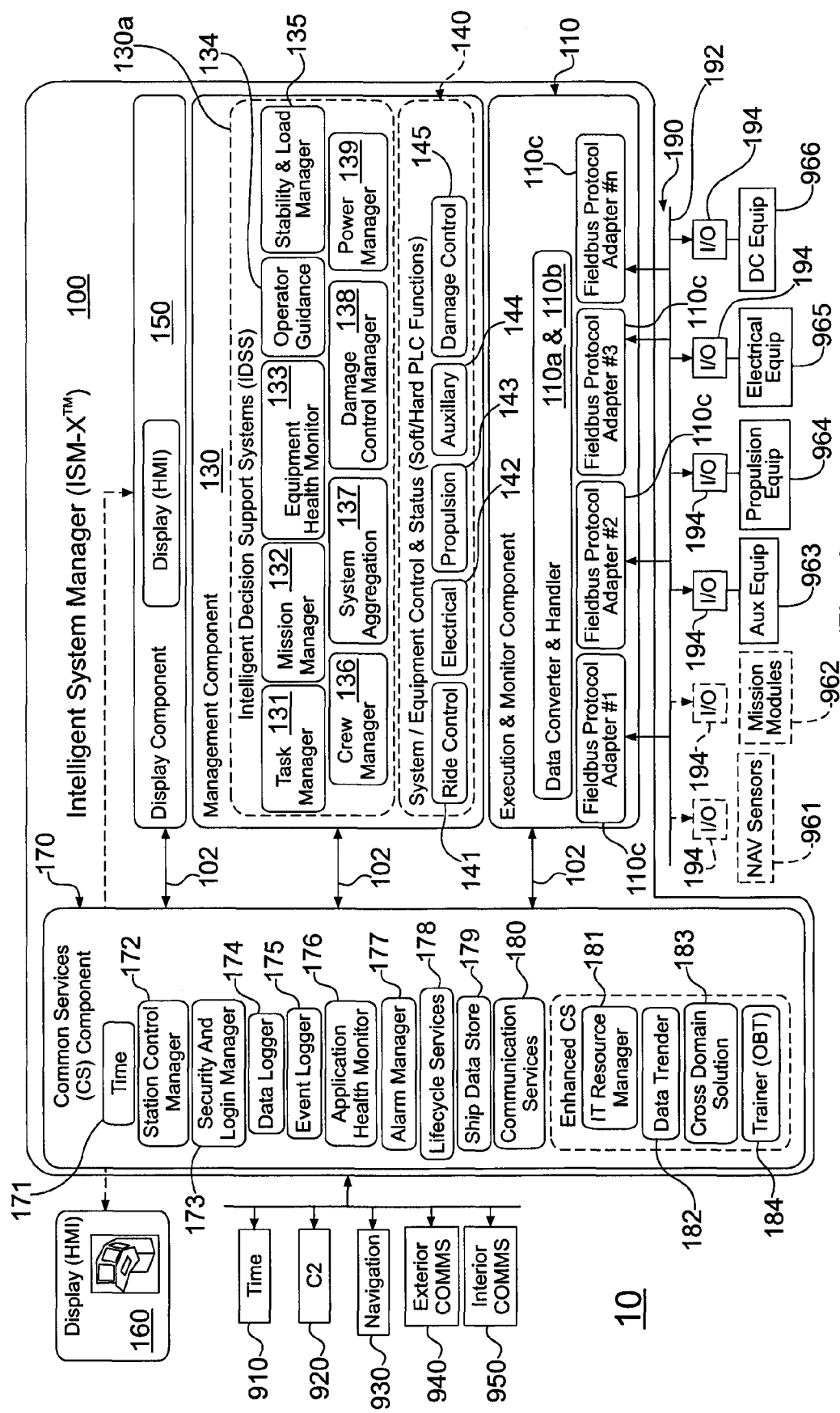
FIG. 2 is a schematic diagram of the example intelligent system manager system illustrating the plural component functional arrangement thereof.

Intelligent System Manager (Ism-X™) Component Functional Architecture:

The ISM-X™ system 100 employs a component based functional architecture comprising four main components, including a Display Component 150, a Management Component 130, an Execution & Monitor Component 110, and a Common Services Component (CS) 170, all as shown in FIG. 2, which also shows ISM-X™ interfaces with example vessel 900 systems, such as HMI 160, bridge 910, C2 (Command & Control) 920, navigation 930, exterior communications 940, and with example equipment 960, such as NAV sensors 961, mission modules 962, auxiliary equipment 963, propulsion equipment 964, electrical equipment 965 and damage control equipment 966.

ISM-X™ Entity Descriptions:

Common Services Component 170

The Common Services (CS) Component 170 provides an array or suite of services that any ISM-X™ application can utilize rather than developing an application-specific function to accomplish the same goal. These services provide core system management services and infrastructure that allow all nodes within the ISM-X™ system 100 to operate together, and are typically located on all display and processing nodes of the system. Thus, these services are common to all components of the ISM-X™ system 100. The use of a common services component embodies open architecture principles and facilitates increased software efficiency, higher degrees of integration, flexibility and scalability of distributed nodes.

Time 171—This entity 171 provides a defined standard time, e.g., the ship's time, to all ISM-X™ system nodes and ensures that each node remains synchronized with all other nodes on a network. Typically, a network time protocol service is utilized as the master clock for this service, and may be consistent with the Universal Time Protocol (UTP).

Station Control Manager 172—This entity 172 manages the transfer of the station in control from one station to another by allowing for the following types of control transfer: take control, request control and offer control. Station-in-control hierarchies and transfer protocols can be customized to conform to platform specific requirements. Other types of transfer may also be provided, such as: replace or transfer automatically due to timeout or unresponsiveness. This service allows crew members to efficiently manage the many systems controlled by ISM-X™ system 100, e.g., by transferring control to a selected operator 162 without that operator having to move to a different workstation 164, by an operator 162 taking control without having to move to another workstation 164, by concentrating and/or distributing control as may be desirable in a given situation.

Security and Login Manager 173—This entity 173 provides a login screen with a means for an operator 162 to enter a user name and password, thereby requiring operators, users and administrators 152 to login with a specific username and password in order to access system management services. System administrators typically have higher privileges than common users and may configure access privileges for each user during runtime. Examples of access privileges may include monitoring only access and monitoring and controlling access, and each may be limited to one or more specific systems, subsystems, components, and/or equipment. If desired, additional functionality can include the ability to lock out users after a designated number of failed attempts to login. This supports flexible role-based access and can be useful, e.g., for operating an integrated plant management system.

Data Logger 174—The Data Logger 174 entity provides the capability for applications to log system data for use in data analysis, data trending and/or equipment health monitoring. This service entity collects all signals, alarms and health and status indications communicated from each node of the system. Data may be stored on various types of storage media and for different lengths of time as may be helpful and useful in any given application. The storage media may be permanently installed or may be removable, and may be portable, such as removable hard drives, RAM drives, thumb drives, and other media drives. Data may be stored for one or more months or years, as may be desired, and data of different types may be stored for different periods of time. Stored data may be used for a variety of applications including monitoring equipment health to predict future equipment failures.

Event Logger 175—The Event Logger 175 entity allows applications to log events for use in event reconstruction and for maintaining engineering logs and, on board ships, bell logs. Each event occurring in an ISM-X™ system 100 is communicated over the communication network and is logged by the data logger 175. Examples of such events may include: controller start up, configuration loading, "heartbeats," commands, errors, alarms, warnings, changes in commands and/or orders, e.g., engine orders, and the like, as may be required and/or desirable in any given application. "Heartbeats" typically comprise status messages communicated amongst software applications that indicate whether that application is operating and may also indicate which operating mode, if any, it is operating in, and may be collected regularly and/or periodically to ensure the applications are deployed and alive.

Application Health Monitor 176—This entity 176 monitors the status of installed software applications and performs the Built In Test (BIT) functions for the system. The communication status of each node is monitored and recorded, as are the applications that each node communicates with. In the event of a failure, this entity updates the display on the HMIs 150 to reflect what has failed and where the failure has occurred. In the event there is a problem communicating with a display console, all other HMI displays 150 are notified and the failure status is indicated on their display screens.

Alarm Manager 177—This entity 177 receives alarms from alarm submitters, routes them to the appropriate display consoles or other HMI workstation 164, filters alarms if appropriate (e.g., to reduce nuisance alarms, and/or alarm flooding, that might lead to cognitive overload for the operator). Alarm filtering criteria may include, e.g., the number of alarms, timing of alarms, relative severity, degree and/or ranking of risk, relatedness of different alarms, and the like. Alarm manager 170 generates audible/visual indications, e.g., based on the type and severity of the alarm. The alarm manager 177 also manages the acknowledgment of alarms, e.g., by suppressing further audio/visual alarms upon acknowledgment of the alarm, e.g., by the station-in-control (SIC), and manages the clearing of alarms, e.g., by removing false alarms and alarms for which the initiating condition has been corrected.

Life Cycle Services 178—This entity 178 starts, terminates, and manages the state of each software application. The function of this service 178 is to ensure that all other services are available at any given time, without the operator having to intervene to do so. In the event that any service ceases to function or functions incorrectly, this service 178 restarts that service so that it may be restored to proper function and availability.

Data Store 179—This entity 179 contains data regarding the configuration of the system including equipment and facility layout geometry, compartment and/or space details, HM&E systems 960 installed and coverage areas, etc. This data is used by IDSSs which require a software representation of the system to perform their operations. The data contained in the Ship Data Store 179 may also include dry loads, liquid loads, consumable loads, and locations of all such loads, crew and/or staff information, routing data, system stability data, maneuver and/or operating restrictions, equipment locations, equipment dependencies (e.g., on other equipment and resources), mission data, and the like.

Communications Services 180—This entity 180 contains any required communication interfaces and controls initialization and protocols required for communication between the nodes of the ISM-X™ system 100 and HMI peripheral devices 164. Quality of service settings may be established and maintained for measuring the quality of network messages, e.g., for transmission time, message delay time, signal levels, noise levels, and the like, for monitoring whether network communication is satisfactory.

IT Resource Manager 181—This entity 181 monitors computer resource utilization within ISM-X™ system 100 nodes, such as processor utilization, memory, and bandwidth. This service 181 makes decisions regarding deployment of applications, and manages the automation of systems by ISM-X™ 100 and any redundant processing, e.g., master/slave and master/back-up, to ensure satisfactory operation of ISM-X™ software applications. In the event that an ISM-X™ node becomes unavailable, this service acts to re-deploy and/or re-direct the signals sent to or through or controlled by the unavailable node to other nodes, preferably in a manner that preserves satisfactory, if not optimal, system operation.

Data Trender 182—This entity 182 performs data trending services which can be used by a variety of IDSSs, such as the Ship Stability and Load Manager, Damage Control Manager and/or Equipment Health Monitor. Data trender 180 may also make trend data available to operator 162 via a GUI and HMI 160.

Cross Domain Solution 183—This entity 183 performs any conversion between the unclassified and classified information domains (e.g., through the use of a High Assurance Guard or a Hazard Assurance Guard or another similar guard for preventing the communication of classified information from the classified domain to the unclassified domain).

Trainer (Onboard Trainer—OBT) 184—The Trainer 184 allows the crew to perform training for operating and maintaining the ISM-X™ system 100. This typically requires the use of an equipment simulator which allows the crew to use the full capability of the system without actually controlling the equipment. The OBT trainer 184 will contain a number of predefined training scenarios and will include a scripting capability to allow the operator to generate different and/or new training scenarios. The trainer 184 should interface with a crew training record residing in the Crew Management IDSS to ensure that crew training logs are updated after each event. This will provide decision makers (e.g., the Damage Control Officer or Assistant) with the ability to assign crew members based on their skill sets and training history.

It is noted that many of the Common Services Component entities may be optional and/or may include optional features, that reflect the environment in which the ISM-X™ system 100 may be applied. For example, the Security and Login Manager 173 might be substantially simplified for an ISM-X™ system 100 employed in a commercial application as compared to that for a military application. Similarly, Cross Domain Solution 183 may be omitted for a commercial application where there are no classified information domains. Other common services that may be optional in certain settings include IT Resource Manager 181 and Data Trender 182. Common services 181-184, and some others, may be referred to as enhanced services, and may or may not be included in many applications, particularly applications on less complex and/or less expensive platforms.

Display Component 150

The Display Component 150 includes ISM-X™ display software that provides a GUI to display to operator 162 via HMI 160 data and information for enabling situational awareness and control authority over automation system 100, including the HM&E equipment 960 and installed IDSSs 131-139 thereof. The display software provides substantially continuous system status and equipment monitoring information to one or more HMI display screens 164. HMI 160 may include displays of various types and kinds, including one or more display screens 164 or multi-screen consoles 164. Operator 162 inputs and commands are routed to the appropriate ISM-X™ system 100 elements for analysis, processing, and distribution to equipment 900 controllers and equipment 960 actuators, e.g., for manual tasks and for automated tasks. Operators 162 may provide inputs for reconfiguring HM&E system 960 and/or various equipment and components via the HMI interface 160. IDSSs 131-139 are also displayed on some or all HMI displays 164 via an interactive GUI that allows operators 162 to interact with the IDSSs 130.

ISM-X™ display software preferably resides on each display device 164 in ISM-X™ system 100. Preferably, each display device 164 is capable of monitoring all systems and is capable of controlling all equipment, subject to the parameters and limitations defined by applicable station control doctrine and procedures and by applicable user 152 privileges, e.g., as may be defined by a security manager and/or a log-on manager. This modular arrangement allows each display device 164 to include one or more display screens, thereby to provide enhanced operator awareness, and flexibility in configuring the HMI 160 of any system 100.

Execution and Monitoring Component 110

The Execution and Monitoring component 110 serves as a bridge or connection between the external I/O signals and the internal ISM-X™ system 100 control logic, algorithms and displays, thereby providing the services that allow the ISM-X™ system 100 software to interface with the equipment 960 being monitored, managed and under its control. Commands that are sent from an HMI display 164 by an operator 162 or that are triggered or initiated from the control logic are communicated to the Execution and Monitoring 110 function which routes them to the appropriate I/O module 964, converted to the specific interface protocol for the system/equipment being commanded, and communicated to the appropriate actuators and/or equipment.

Data Converter and Handler 110A, 110B—This entity 110A, 110B converts raw monitor signals (voltage, current, temperature, pressure, etc) received by Execution and Monitoring function 110 into meaningful predetermined engineering units and alarm thresholds which can be interpreted by consumers of equipment data (e.g., the control logic, the IDSSs 130, and for displays 164).

Fieldbus Protocol Adapters 110C—The Fieldbus Protocol Adapters 110C convert Field Bus protocols (Opto-mux, Profibus, Profinet, ControlNet, Foundation Fieldbus, Canbus, etc.) to a data type that can be distributed via an open architecture compliant data distribution protocol, e.g., Pub-Sub, CORBA, a LAN, Ethernet, Control Net, Device Net, or other network, providing communication among various adapters 110C and various I/O devices 194. This data is then published via Communication Services entity 180 of Common Services component 170 to consumers including ISM-X™ runtime entities, e.g., IDSSs 131-139, displays 164, and the like.

Execution and Monitoring function 110 is separate from the rest of the ISM-X™ runtime 100 software thereby to encapsulate the external interfaces so that the ISM-X™ system 100 can readily accommodate plural field bus protocols with little or no modification to its software. The software provides bi-directional translation and/or transformation to and from any supported field bus protocol and internal format utilized within ISM-X™ system 100. This arrangement enables ISM-X™ system 100 to interface with multiple types and kinds of I/O equipment and field bus protocols in a single control system 100 without changing the underlying control logic thereof. Configuration data stored in SCID 310 is utilized to provide data conversion sensors and/or signals being added to ISM-X™ system 100. As a result, long term maintenance and updating costs are expected to be reduced as different types of I/O equipment are replaced and/or added over the life of the ISM-X™ system 100.

Management Component 130

The Management Component 130 consists of two types of entities, Intelligent Decision Support Systems (IDSSs) 130 and Equipment Controllers 140. This component provides automated monitoring and control capabilities, including remote control, to reduce the cognitive load on the crew and to reduce the tasks assigned to the crew through the use of advanced software techniques such as data fusion, predictive modeling, and the like.

Equipment controllers execute the high level control requests and commands from operator 162 by implementing particular equipment to perform specific actions and sequences. By way of example, an operator request or command to transfer fuel from one tank to another tank is translated by the management component 130 into commands to open and close valves, to activate and deactivate pumps, and to monitor levels in the affected tanks, which are communicated to that equipment via the execution and monitoring component 110.

The IDSS applications utilize the common services 170 and signal values from sensors communicated via the execution and monitoring component 110 to determine whether autonomous action or operator action is required and whether or an indication is displayed to the operator. These actions are expected to reduce stress on operators, crew and staff, to provide a level of autonomy within control system 100, and to provide services in support of decision making to the operator 162.

Because the ISM-X™ system 100 has this open and flexible architecture, IDSSs can be added to the ISM-X™ system 100 configuration or existing IDSSs can be upgraded and/or modified, over the life of the ship or other vessel to increase the level of automation and decision support, e.g., as new technologies become available. Among the benefits can be to reduce operating personnel, increase performance, and reduce the total cost of ownership.

In Management Component 110, the Intelligent Decision Support Systems (IDSS) tier 130A includes a variety of applications that can be provided and/or installed in a modular fashion to facilitate supervisory control and intelligent decision making. IDSSs support reduced crew and staff requirements, as well as the potential for future advancements in Artificial Neural Networks and the like. As described below, some IDSSs can communicate with one another to provide integrated awareness and intelligent control of ISM-X™ system 100, and may communicate with external interfaces. Some examples of IDSSs are now described, e.g., in the example context of a shipboard application.

Task Manager 131—The Task Manager IDSS 131 receives tasks from tasking entities, including other IDSSs and external actors like an operator 162, an integrated bridge system 910 or a shipboard Command and Control (C2) system 920, and employs a deconfliction and prioritization scheme to determine the appropriate tasking of HM&E equipment 960 and the crew consistent with actual conditions. De-confliction includes resolving conflicts between or among different tasks and/or reconciling different tasks. Task Manager 131 de-conflicts tasks and requests against the current mission plan, provided by the Mission Manager 131, and the system status report, provided by System Aggregation 137. IDSS 131 ensures integrated ship control when there are multiple systems under the purview of ISM-X™ (e.g., human operators 152, IDSSs 130A, external C2 systems 920) using the same equipment resources to perform various tasks, e.g., tasks related to their own needs. Tasks are routed to the appropriate HMI screen 164 (for manual tasks) and HM&E equipment controllers (for automated tasks). Once in the queue, a task may be cancelled or stopped or may require operator approval prior to execution (depending on the level of automation). Task Manager 131 provides tasking notifications to the HMI 160, to the tasking entity and to the equipment controllers to notify them of task commencement and progress. Upon task completion the Task Manager 131 distributes task execution messages to inform the various entities that a task has been completed. Tasking generally refers to one or more tasks and/or series or sequences of tasks requested by and/or to be executed by some entity or entities.

Mission Manager 132—Upon requests from an external actor such as the Operator 162, C2 920 or the Integrated Bridge 910, the Mission Manager IDSS 132 determines the readiness of the vessel to perform various missions and provides the current mission plan and the available missions to the requester. Once analyzed externally, requests for new missions or for changes to the current mission plan are handled by the Mission Manager IDSS. Using the reports provided by the System Aggregation 137, Operator Guidance 134 and Power Manager 139 IDSSs, the Mission Manager 132 determines the feasibility of the request. If a conflict exists, the deconfliction of the mission plan is determined by the external source and fed back to Mission Manager 132 for updates to the mission plan. Mission tasking is fed to the Task Manager 131 which submits the actual tasks to the equipment controllers. The current mission plan is also provided to the Task Manager 131 to use as a deconfliction aid, to ensure that any IDSS or Operator generated tasking is de-conflicted against, i.e. is not in conflict with, the current mission plan.

Equipment Health Monitor 133—The Equipment Health Monitor (EHM) IDSS 133 examines the feedback signals, e.g., monitoring signals, from HM&E equipment 960 and applies Condition-Based Maintenance (CBM) algorithms to determine when equipment is or will be in need of maintenance or replacement. As an advanced capability, the EHM IDSS 133 will provide remote monitoring capability to allow shore-based or other remote monitoring of the on-board HM&E systems 960. This functionality enables reduced manning and provides a means to monitor equipment health of the entire fleet from an on-shore or other station using SMEs for each type of equipment. This remote monitoring capability is expected to provide enhanced lifecycle cost savings by enabling more efficient fleet maintenance, e.g., fleet-wide maintenance coordination.

Operator Guidance 134—The Operator Guidance IDSS 134 determines if hazardous situations exist based on wave and other environment data coupled with vessel load data and vessel stability characteristics. If the current situation is assessed to be hazardous, the Operator Guidance IDSS 134 provides steering and speed restrictions to consumers which include the Mission Manager 132, Stability and Load Manager 135 IDSSs and the Integrated Bridge 910. In addition, the steering and speed restrictions are provided to the Display Component 150 which will generate a polar plot indicating to ISM operators 152 what headings and speeds are safe and which would be dangerous. One approach for obtaining the operator guidance data is that the IDSS 134 can utilize a database approach where a simulation tool is used to generate scenarios off-line based on a set of conditions. The database is then queried based on current environmental and ship stability conditions to extract the appropriate plot of heading and speed restrictions. Alternatively, a real-time approach may be taken in which the simulation software is hosted resident to the installed IDSS 134 and is executed in the run-time environment to generate the plots of heading and speed restrictions.

Stability and Load Manager 135—The Stability and Load Manager (SLM) IDSS 135 provides two major vessel functions. The first function is a Load Management tool which provides operators 152 the ability to input new load plans to the SLM 135 which analyzes the new requested load plan to determine its feasibility and provides the acceptable limits back to the operator via the Display Component 150. The second function of the SLM 135 is to analyze the vessel's current stability and monitor load sensors to autonomously and continuously provide assessments of ship stability that are displayed on the HMI 160 via the Display Component 150. When necessary, the SLM will calculate corrective actions to improve vessel stability and/or to re-stabilize the vessel by providing optimal liquid and dry load distributions, e.g., by ballast and/or fuel transfer. Once calculated, these tasks are submitted to the Task Manager 131 for de-confliction and prioritization.

Crew Manager 136—The Crew manager IDSS 136 provides a means for the operator 162 to coordinate and seek optimum use of crew resources through crew member profiles stored within the ISM-X™ system 100. A crew member profile may contain data relating to crew training, skills, experience, work history, tasks assigned, tasks completed, location, time on duty, rest time, illness and injury, and the like. This IDSS 136 utilizes crew casualty data from the Damage Control Manager 138 and crew tasks from the Task Manager 131 to assess crew availability. When crew resources are assessed to be at lower than desired levels, warnings and alarms are sent to the Display 160. Also, as task data comes into the operator 162 who is monitoring the crew and crew tasking, the operator 162 will be able to see all manual tasking and all available crew members who can be assigned to the new tasks. IDSS 136 will provide recommendations to operator 162 for crew tasking assignments and, if the operator 162 so chooses, he may "filter" through the available crew member profiles to determine and designate a particular crew member to a particular task. This may be done by filtering the data representing crew member availability to determine the crew member who is most available, most trained and closest in proximity to a location where a task need be executed, so that such crew member can be identified and assigned to a task. Additionally, as crew members complete tasks and/or training, or move from one location to another, their work history is updated and stored in a crew member profile which is viewable upon request at the ISM-X™ display 160. These capabilities will support reduced manning situations, particularly with regard to damage control manning, through effective and efficient crew resource utilization.

System Aggregation 137—The System Aggregation IDSS 137 will monitor all equipment sensor data and use HM&E Equipment Reports from the EHM IDSS 133 to determine the health, operational state and activation status of the various equipment installed on the vessel. Using vessel compartment, system and mission data from the Data Store common service 179, these assessments are aggregated into a local system operational and activation status on a compartment by compartment basis. These assessments are then aggregated to form an overall HM&E system report which is then provided to the Display Component 160 and to the IDSSs 130A which require situational awareness of HM&E equipment.

Damage Control Manager 138—The Damage Control Manager IDSS 138 provides situational assessment and strategy formulation for addressing hazards on board the vessel. Situation assessment functions include: damage/hazard assessment summary (e.g., aggregating and analyzing sensor data to indicate hazard type and severity on a compartment-by-compartment basis), crew casualty assessments, route generation for DC crew to access/egress damage areas and to perform de-smoking and other operations. When an assessment has been made indicating that a hazardous situation exists, the strategy formulation function of Damage Control Manager 138 generates the tasks to be performed to address the hazards, such as fire, smoke, flood, and other hazards, and allows the operator to select the task execution mode (e.g., whether or not operator approval is required before a task is ordered), and submits the tasks and mode selections to the Task Manager 131 for de-confliction (e.g., resolution and/or reconciliation of conflicts) and prioritization.

Power Manager 139—The Power Manager IDSS 139 utilizes complex decision making algorithms to determine the required use and distribution of power based on system usage, mission priorities, and fault conditions. Based on the current power loads and the state of power generation, the Power Management IDSS 139 may elect to shed loads or to bring on additional power generation capabilities.

In Management Component 130, System/Equipment Control & Status tier 140 includes several libraries of control logic which can be applied to generate discrete equipment control commands. For example, the Stability and Load Management IDSS 135 could send a task to the Auxiliary controller 144 which breaks the task down into discrete commands, and various sensors could then be monitored to determine if and when the desired operation is completed. For example, a stability restoration task may typically be broken down into discrete valve alignment and pump commands to pump liquid out of a tank, e.g., pump water out of a ballast tank. The liquid level in the tank would then be monitored by checking a tank level sensor to determine if and when the desired amount of liquid had been pumped out of the tank. This entity 140 could reside in either a traditional "hard PLC" or a software-based "soft PLC". Logic libraries could include C++ logic statements, XML strings, Ladder Logic, or Functional Block Diagrams related to Ride Control 141, Electrical 142, Propulsion 143, Auxiliary 144, Damage Control 145, and the like.

ISM-X™ External Interfaces:

External interfaces are outside the ISM-X™ system 100 boundary and are illustrated, e.g., in FIGS. 1 and 2. While these items are generally outside the scope of a potential ISM-X™ platform implementation, they would usually be provided by the system designer or the system integrator, e.g., a shipyard or a subcontractor. External systems 910-960 are capable of communicating with ISM-X™ system 100 if they are provided in a form and format that is compatible with the defined external communication protocols of the ISM-X™ system 100.

In a ship-board HM&E 960 application, ISM-X™ system 100 may interface with any or all of the example items listed in Table III below:

TABLE III

EXTERNAL COMMUNICATION

Equipment including, but not limited to: auxiliary equipment, propulsion equipment, electrical equipment, damage control equipment, valves, pumps, motor controllers, temperature sensors, pressure transducers, liquid sensors, tank level indicators, strainers, dumpers, sprinklers, fire sensors, smoke sensors, chemical sensors, motion sensors, tilt sensors, audio and other acoustic sensors, imagers and other video sensors, and the like.
Mission Modules.
Bridge (generally integrated with the bridge system) 910.
Command & Control 920.
Navigation System 930 and/or Navigation Equipment (generally integrated with the navigation system) 930.
Exterior (or external) Communications 940.
Interior (or internal) Communications 950.

ISM-X™ Integrated Development and Runtime Environment

FIG. 5 is a schematic diagram illustrating example relationships between the development environment 300 and runtime/operating environment 200 for the example intelligent manager system 100. Therein, various ISM-X™ system components are indicated by boxes drawn with a relatively broad line, COTS products are indicated by boxes drawn with double lines, and platform specific products are indicated by boxes drawn with relatively thin lines. As can be seen, ISM-X™ SCID 310 is the database that supports all of the development kit 300 functions 330-360 and so all of the data and information included in ISM-X™ runtime application 200 is based upon the same source data from SCID 310, thereby to ensure that all of the functions of ISM-X™ runtime application are built with common and consistent data.

SCID 310 of ISM-X™ system 100 includes various export functions. Signals and signal attributes stored in SCID 310 are exported for use in control logic development tool 340, simulation and training development tool 350 and the Oculus configuration function 360. Export functions include but are not limited to a GUI export function 381 coupled to HMI development tool 330, a control logic export function 382, e.g., using ISaGRAF or other suitable software, coupled to logic development tool 340, a signal export function 383 coupled to the ISM-X™ configuration library 210 of ISM-X™ runtime application 200, a simulation and training export function coupled to a simulation and training development tool 350, e.g., using MATLAB or other suitable software, and an Oculus configuration export function 385 coupled to an Oculus configuration function 360 which provides trends and CBA algorithm definitions and functions to an Oculus runtime application 291 which is specific to the particular platform to which ISM-X™ system 100 is applied.

The runtime/operating environment 200 includes ISM-X™ runtime application 200 and certain COTS products and certain platform specific products. HMI development tool 330 includes COTS software and is coupled to platform specific HMI applications which couple to runtime application

200 via a Java GUI application programming interface (API) 212. The COTS control logic development tool 340 allows engineers to develop and test control logic applications 293 which may be compiled into a control logic runtime application 294 which interfaces to ISM-X™ runtime system 200 via control logic application programming interface (API) 214. Logic development tool 340 includes COTS software and is coupled to platform specific ISaGRAF control logic applications which couple to an ISaGRAF runtime application 294 and to runtime application 200 via an ISaGRAF API 214. A COTS software simulation and training development tool 350 is used to generate platform specific simulation and training application 295 that is coupled to ISM-X™ runtime application via ISM-X™ trainer API 216. The Oculus configuration tool 360 is utilized to generate platform specific Oculus runtime applications 291 which couples to ISM-X™ runtime application 200 via an ISM-X™ OCI server API 218.

Intelligent System Manager (ISM-X™) Development Kit: Purpose and Introduction:

The Intelligent System Manager (ISM-X™) product 100 provides a distributed, open architecture integrated control system operating environment. To support rapid, efficient and cost effective development of platform specific applications, a suite of development tools in an integrated development environment called the ISM-X™ Development Kit 300 is provided. This Development Kit 300 is well suited to support development activities for varied platforms that require full integration of complex systems, such as those found on modern front line naval ships, commercial and other ships, military, commercial and other aircraft, offshore oil rigs, other vessels, factory automation, industrial automation, and other integrated production systems, whether fixed or mobile, and the like. Likewise, the ISM-X™ system 100 may be utilized for and/or on any or all of such platforms and systems.

Figure 3:
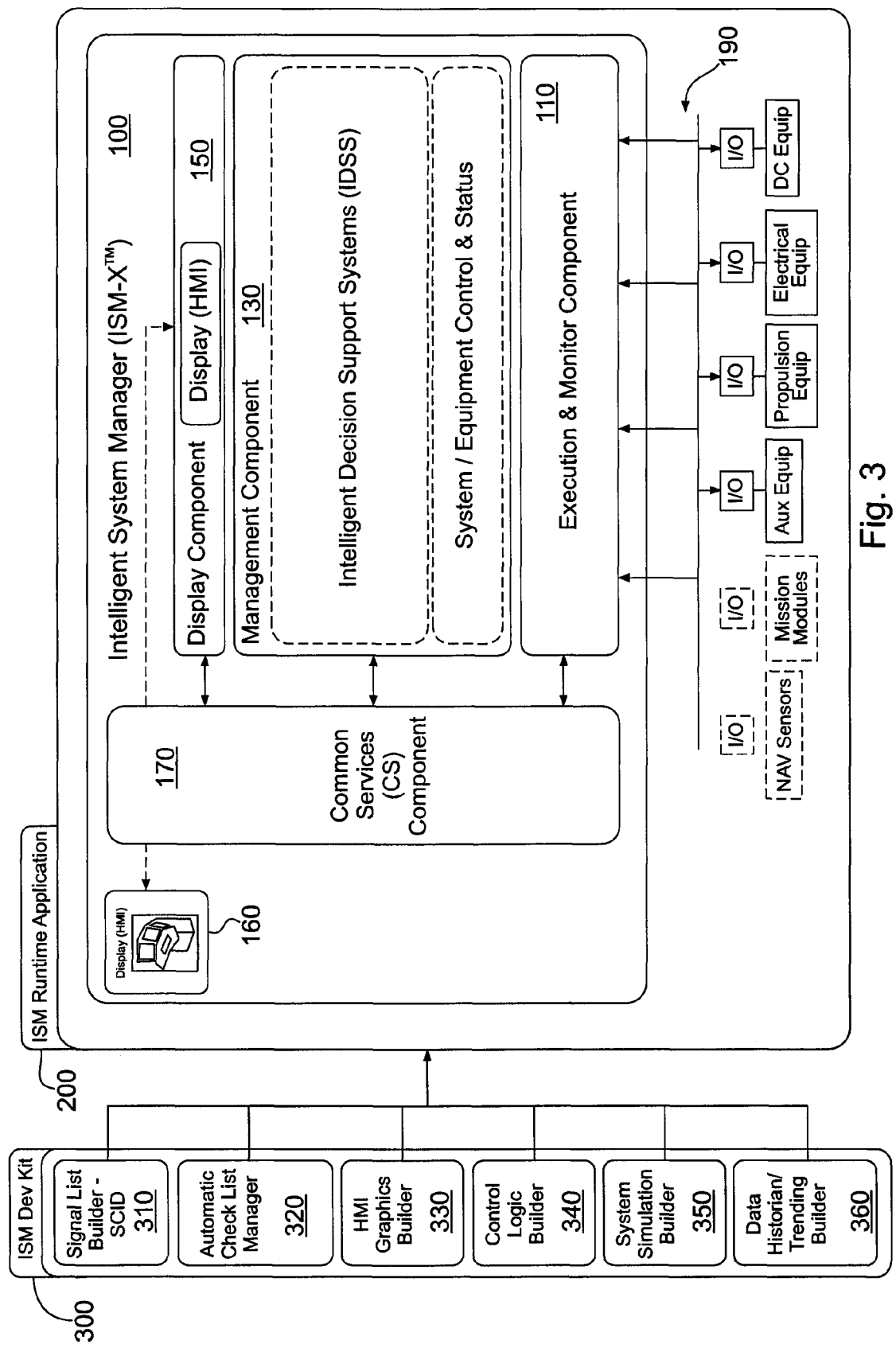
FIG. 3 is a schematic diagram of an example development kit for the example intelligent system manager system.

This section describes the ISM-X™ Development Kit 300 which provides designers and engineers with a tool kit or tool suite that includes: a signals list development tool SCID 310, an automated checklist development tool 320, a graphics and/or GUI and/or HMI development tool 330, a logic development tool 340, a system simulation development tool 350, and a data historian and trending development tool 360, all of which are shown with the ISM-X™ runtime application 200 in FIG. 3. A summary of each development tool of the tool suite is provided in the following sections. A development tool may also be referred to as a "builder."

Development Kit 300 is expected to enable the designers/engineers to complete design activities in a more efficient manner, thereby enabling the design process to be more cost effective and thus more competitive in future development and business acquisition. This can allow designers/engineers of relatively lesser skill and experience to be involved as developers for system level platform-specific application development. Additionally, development kit 300 could be licensed to engineering, government and other entities to enable them to develop platform-specific applications, upgrades and/or maintenance. This option allows the ISM-X™ system 100 to be employed for programs that require indigenous platform-specific application software development.

ISM-V" Development Kit 300 Tools:

The ISM-X™ development kit 300 provides a relatively simple to use suite of tools for generating human machine interfaces (HMI) 160, control logic, automated checklists, system simulations and/or models and data historian/trending applications. Each of these features is described in more detail below. It is noted that the term "tool" as used herein may refer to one tool or to more than one tool, e.g., plural tools.

Figure 6:
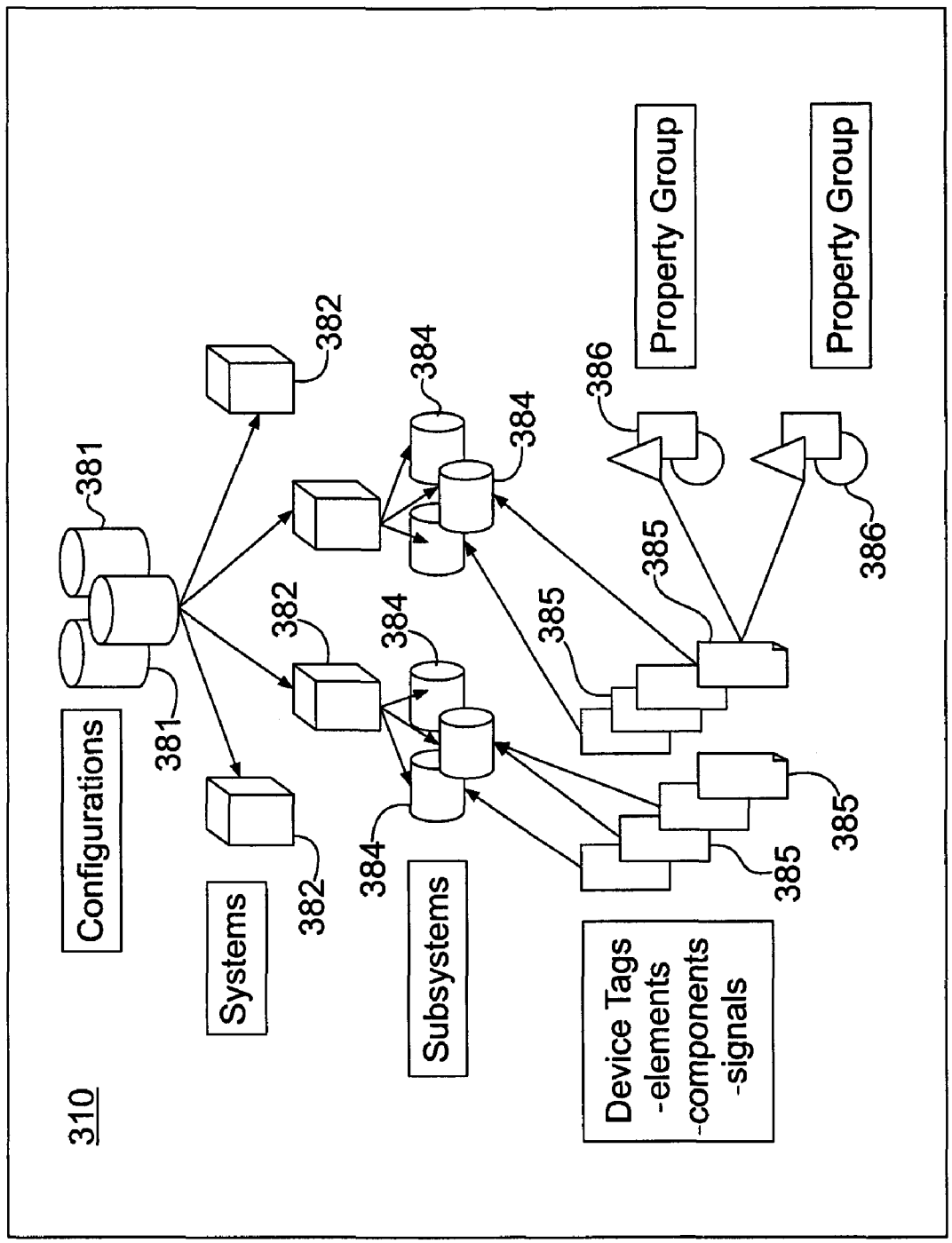
FIG. 6 is a schematic diagram of an example database arrangement for the example intelligent system manager system.
Figure 8:
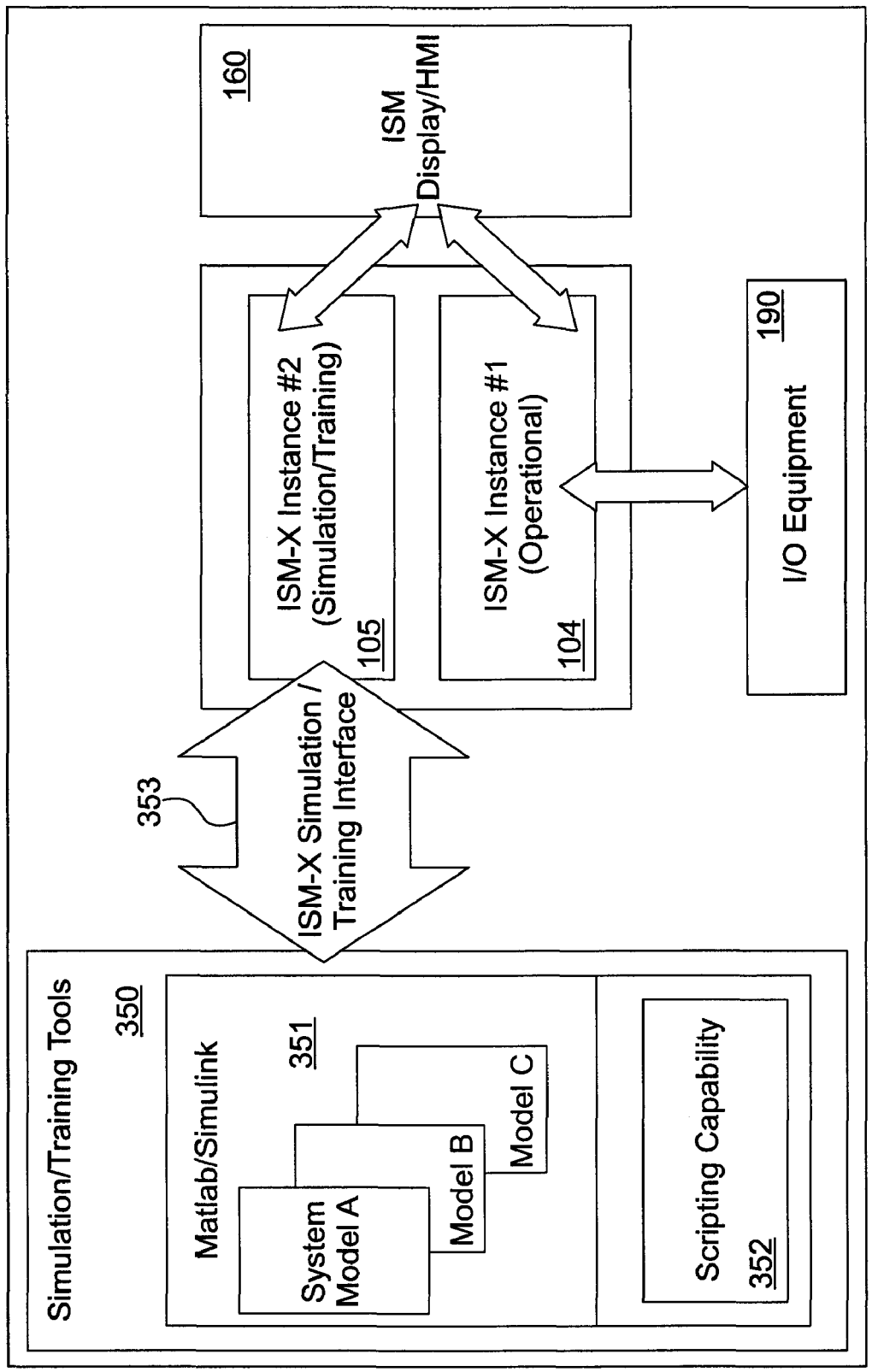
FIG. 8 is a schematic block diagram illustrating an example runtime simulation and/or training methodology of the example intelligent system manager system.

System Control Intelligent Database (SCID) 310:

The ISM-X™ Signals Management Tool is the System Control Intelligent Database (SCID) 310, a web-based application that is used to develop and manage all signals and signal attributes within complex control systems. Preferably, the SCID database 310 is organized in a three tiered structure, such as the example illustrated in FIG. 6.

A configuration is created for each project, i.e. for the overall platform configuration 381 at its highest level. A project 381 is divided into multiple systems 382 and any or all of those systems 382 are divided into plural or multiple subsystems 384. Within each of the various subsystems 384, device tags 385 are developed for elements, components and signals, as may be required, and may be further subdivided into one or more property groups 386.

For example, in the case of an Integrated Platform Management System (IPMS), the IPMS would be considered a configuration 381. The IPMS 381 is broken down into multiple subsystems 384 which may include an Auxiliary Control System (ACS), a Damage Control System (DCS), an Integrated Machinery Control System (IMCS) and an Automated Power Management System (APMS). The ACS, for example, comprised a number of elements 385 including, e.g., a fresh water system element and a bilge system element. Both the fresh water system element and the bilge system element have various components 386, e.g., pumps, valves and level sensors, and these components have various signals associated with them (e.g., on, off, standby, level, etc). Where the platform is, e.g., a ship, the IPMS may be referred to as a shipboard machinery system (MCS).

All of the information related to each signal for each element 385 and component 386 thereof is defined and managed via standardized database attributes. Relevant signal attributes may include, but are not limited to, all or some of those listed in Table IV below:

TABLE IV

RELEVANT SIGNAL ATTRIBUTES

Electrical characteristics of all sensors and/or actuators related to the signals, e.g., signal type (analog or digital), value range (e.g., voltage, current, number of bits/bytes), units (e.g., volts, amperes, psi) and the like.
Unique signal identification codes.
Identification of the sensor and/or actuator power source(s).
Identification of the machinery and/or system to which the signals relate, including, e.g., installed location and system associations.
Identification of the vessel drawing or machinery reference document from which the ICD information is prepared or obtained.
Identification of the alarm and/or warning limit and/or other alarm criteria.
Identification of the RTU to which each signal is allocated.
Identification of the card and channel to which the signal is allocated.
Any interlock, interconnection, and/or inhibition of any signal with any other signal data.
If a particular signal is the resultant of some function and/or of some logic from other signals, then a brief description of such function with operating information like input data, tables, ranges, and the like.
Whether a signal is internally generated (e.g., by hardware and/or software) or is a field signal.
Whether a particular signal is or represents a warning, an alarm, a state, an operation, a change, an input, an output, a fault, or another indication.
Whether a particular signal is included in or represents an automatic mode, a semi automatic mode or a manual mode.

System Control Intelligent Database Tool 310:

The System Control Intelligent Database (SCID) 310 provides a means for the user to input relevant attributes for each signal, including, e.g., controlling or monitoring, analog/ digital, input/output, I/O box (RTU), compartment, system, subsystem, equipment type, and the like. Based on this information the SCID tool 310 automatically generates a unique tag ID for each signal utilizing a standardized format. FIG. 7 shows an example "screen shot" 389 or snapshot of information from the SCID web-based database 310 illustrating an example of a notional database entry for an example analog monitoring signal. In screen display 389, the equipment identification is displayed in the top horizontal bar near the top of the screen 389, types of general information relating thereto is displayed in a column at the left and the value and/or state thereof is displayed to the right of the respective general entry generally in the middle area of screen 389, and the location and/or connection information is similarly displayed in left and right columns near the bottom of screen 389.

When all signal information is defined and recorded, including RTU allocation, the SCID tool 310 is able to export the list of signal tags to be compiled into the ISM-X™ runtime 200 software application. The signals list is automatically read into the ISM-X™ runtime 200 software thus eliminating the possibility of human error that often occurs when transferring or hard coding signals into executable code as is common practice with other systems. Additionally, the same signals list created within the SCID tool 310 is exported for use within the Automated Checklist Manager Development Tool, Logic Development Tool, GUI Development Tool, Simulation Development Tool, and Data Historian/Trending Development Tool, thus ensuring consistency and accuracy of signal definitions across all control system functions.

The SCID tool 310 coupled with the run-time configuration file for the control system 100 enables significant efficiencies during development and maintenance throughout the entire product life cycle, thereby reducing cost. Using the ISM-X™ Development Kit 300, a signals list can be quickly configured and then utilized for control logic development, and may thereafter be updated throughout the operational life of the control system 100, e.g., as sensors, actuators and other components are added and/or replaced, whether with the identical or a different component. Accordingly, when new equipment is to be introduced, SCID 310 is updated to reflect the new equipment and its characteristics, and development tools 320-360 then automatically update from the revised data in SCID 310 to provide an updated runtime application 200 for utilizing the new equipment in the platform manager system. An example of this deployment is described below.

Thus, SCID 310 enables significant cost reductions to be realized during the entire product life cycle, as well as during migration of systems and elements to new and/or different platforms. The use of a common signals list allows remote monitoring software (e.g., front-end and back-end) to be developed using the same signal structure, thus resulting in efficiencies and cost benefits. Front end and back end are typically used to refer to the user interface, e.g., HMI, GUI, and the base application (e.g., mainly the runtime environment 200), respectively.

Because the SCID database 310 when completed for a platform contains most of the information that is required to configure the platform, and the systems, elements and components thereof, it contains most of the information required within a standard Interface Control Document (ICD) and similar documentation and specifications, and so an automatic documentation generation utility may be employed in conjunction with the SCID 310 to substantially reduce the time and cost required to generate such Interface Control Documents (ICDs) and other documents.

HMI-Graphics Development Tool 330:

The HMI or Graphics or GUI Development Tool 330 uses the SCID tool 310 to define HMI specific attributes for each control and monitoring signal and then to export a pre-configured file of such signals and attributes that can be read into a COTS HMI application, e.g., to produce a desired display thereon.

The HMI Development Tool 330 will allow application engineers to create a complete set of display screens specific to a particular platform using a simplified COTS HMI software package and then to link those display screens to the ISM-X™ runtime 200 application through the SCID 310 generated signals configuration file to provide a representation of the system and/or of any part thereof. For example: Platform unique piping and wiring diagrams can be overlaid within and/or on the system and/or compartment arrangements and layouts. Damage control symbols and equipment and system mimics, e.g., systems layout diagrams and/or schematic diagrams, can be created and placed within the displays of the relevant compartments. The graphical representations of controllable equipment would then be linked to the appropriate signals within SCID 310 and a detail/zoom level display can be defined for each graphic. Once the graphical layout is complete, the graphics files may be compiled into the ISM-X™ runtime software environment 200. As a result, an operator/user 162 is provided displays that are representative of the physical configuration of the platform 900 and that reflect the status of the systems, subsystems and equipment thereof as well as the status of any or all of such systems, subsystems and equipment, and/or displays that are representative of the systems, subsystems and equipment thereof as well as the status of any or all of those systems, subsystems and equipment.

Control Logic Development Tool 340:

The ISM-X™ Control Logic Development Tool 340 utilizes commercially available COTS software tools to generate and manage executable control logic functions. This Control Logic Development Tool 340 allows for control logic development and debugging, and provides resource and network configuration utilities. Control logic can be developed using language editors within the tool for C, Flow Charts and IEC-61131 and 61499 standards, which may include various formats such as ladder logic, structured text, functional block diagrams, and sequential function charts. An example COTS software tool might include, e.g., the ISaGRAF tool available from ICS Triplex or the STEP7 tool available from Siemens.

Pre-configured and formatted Auxiliary, Propulsion, Damage Control, Power, and other control and monitoring signals, are exported from the SCID tool 310 and imported into the data repository of Control Logic Development Tool 340. Signals are then associated with the appropriate ladder logic rungs and contacts or function blocks. Individual logic routines can be compiled and debugged prior to downloading to the targeted resource. Once debugged, signals are allocated to the proper I/O points and then the control logic programs are compiled into the ISM-X™ runtime software 200 and deployed on the target resource.

Automated Checklist Manager 320:

An extension of SCID 310 may be employed as the Automated Checklist Manager 320. SCID tool 310 is capable of being extended to provide a means for the control system engineer to build automated checklists unique to a particular platform 900. Automated checklists 320 preferably include all or selected equipment associated with a particular compartment and/or system that would need to be stopped, closed, tripped, disabled or shut off, and all procedures associated with the particular equipment, compartment and/or system that would need to be executed, in order to respond to a hazard or event as may be appropriate and/or required in a given situation. An example of such response may include, e.g., isolating a compartment and/or system both mechanically and electrically in response to a hazard or event that should be contained within such compartment and/or system and/or area.

Automated checklists may also include other information relating to a compartment or system, such as which, if any, flammable, explosive, toxic, poisonous, or other hazardous material might be associated therewith and/or present therein. When fully populated with information for a specific platform and configuration, the SCID tool 310 preferably contains information relating to all equipment on board the vessel or other platform that is capable of being monitored and controlled by the ISM-X™ control system 100.

Typically, however, automated response checklists require more information than just the identity and characteristics of the sensors and actuators and other equipment being monitored and/or controlled in a given compartment and/or system. Such additional information may include, e.g., the locations of firefighting and other emergency equipment, the locations of medical equipment and/or facilities, the locations where hazardous materials are stored and/or used, the locations where hazardous or dangerous processes are or may be performed, communication means available at specific locations, and response procedures (e.g., de-smoking, de-watering, and/or isolation procedures) for the specific compartment and/or system and preferably for its neighboring, nearby and/or related compartments and/or systems.

Optionally, the information accumulated in the SCID tool database 310 may be sorted, modified and/or expanded to include system and/or compartment specific equipment and data items in addition to the existing HM&E equipment 960 already defined for the platform 900. During system development, e.g., the control system engineer, battle damage control system engineer, or other system engineer, can easily generate automated checklists for each compartment and/or system. Control signals for equipment and/or other items capable of being remotely controlled can be automatically linked to the corresponding item on the checklist via linkage with the SCID 310 control signal list. Checklists may include data that is stored in the SOD 310 that is sorted by compartment and/or system, rather than by another sorting criteria, so as to be in a form useful for isolating a particular compartment and/or system if and when that action may become necessary or may be desired.

SCID 310 exports the automated response checklists and compiles them into the ISM-X™ runtime environment 200. During operation, these checklists are dynamically available on the operator HMI consoles and displays 160 to help the operator 162 successfully and timely implement and complete the actions as defined by the checklists. Checklist actions that relate to the remote control of equipment preferably can be controlled by the operator 162 through the use of "hot buttons" on the HMI 160 that operate via the link that was established between the checklist and the control logic signals prior to compilation.

Simulation Development Tool 350:

The ISM-X™ Simulation Development Tool 350 provides a means for scripting system test and training scenarios for HM&E system 960 models preferably developed using COTS software. An example development tool 350 includes the COTS Mat Lab/Simulink modeling software package which is utilized to model HM&E systems 960 behaviors while the scripting capability allows testers and/or instructors to inject simulation data to be run through the HM&E equipment models to simulate operational situations and environments. Testers may utilize the scripting capability to ensure that the control logic of IDSSs 130, 131-139 respond properly. Instructors may utilize this to test students and/or to train personnel for taking proper action when responding to test and/or training scenarios. A block diagram illustrating and summarizing how the ISM-X™ simulator may be employed is provided in FIG. 9.

The simulation/training tools 350, e.g., incorporating system models generated by COTS Mat Lab/Simulink software, includes one or more system models 351 and scripting capability 352 that may communicate with ISM-X™ system 100 via a training interface 353 developed, e.g., in Java or in C++, with configurations set up using the SCID tool 310. ISM-X™ system 100 provides: (1) an operational instance 104 that operates with the HMI/display 160 and I/O equipment 110C for actually controlling system 100, and (2) a simulation and training instance 105 that mimics operation of system 100 and provides displays imported from the scripts and system models of simulated conditions of system 100 on HMI/display 160, but is not coupled to I/O 110C or any other actual operating equipment.

During simulation and/or test, the training tools 350 may communicate with a simulation instance 105 of ISM-X™. While operational, a separate training instance 104 of ISM-X™ can be "instantiated" to facilitate training, e.g., plural copies of the same software may be run simultaneously on the same computer resources, e.g., one for operating the control system 100 and another for operator training. In the arrangement, the training tools 350 can communicate via the training interface 353 using the system models as the sensor inputs rather than using the actual I/O device signals. Simultaneously the operational instance 104 of ISM-X™ would be running, so the actual system 100 controls would also be functioning. Both training and operational modes of the ISM-X™ system 100 may be running at the same time and may be accessible from any or all system HMIs 160.

Data Historian/Trending Development Tool 360:

ISM-X™ Data Historian/Trending Development Tool 360 preferably includes an Oculus data historian and trending system that is available from Lockheed Martin Corporation located in Baltimore, Md. The Oculus tool provides a means for data logging, for archiving and for determining trending of sensor data and other data over time. This tool 360 provides a mechanism to develop trending data, screens and data monitoring screens that operators and/or system 100 can utilize, e.g., to analyze equipment health to determine if maintenance activities are required.

Additionally, the Oculus system provides external communications, e.g., a means to transmit data off-board the vessel, so equipment can be monitored remotely, e.g., from one or more remotely located command centers. The Oculus system provides a means to build operator screens for display via ship console, e.g., HMI 160, or remotely via web browser, for current status and trend monitoring. The SCID Tool 360 will be used to export a pre-configured, formatted signal file that can be read into the Oculus system to significantly improve development efficiency and the linking of Oculus tags to standard common signals.

Activity Diagrams:

Operation of the ISM-X™ system 100 is described in terms of a series or sets of activity diagrams, such as those included in FIGS. 9A-9C, 10A-10J and 11A-11B. Each figure, e.g., FIG. 9A, FIG. 9B, and so forth, comprises a schematic flow chart activity diagram of a process that is performed by the ISM-X™ system 100. The following notation is employed in each of these activity diagrams:

In each activity diagram, the flow is entered at a blackened circle ("•") with an arrow exiting therefrom (in some instances also having a shaded text box) generally located near the top of the activity diagram, and the flow is exited at one or more target symbols ("⊙"), generally but not necessarily located near the bottom of the activity diagram. The term "XYZ System" is generally used to refer to an arbitrary example system that is configured in and is operating in the ISM-X™ runtime application 200. Each of the headings across the top of the activity diagrams relates to the respective "column" it heads and identifies the ISM-X™ component and/or the system or entity external to the ISM-X™ system 100 on which the operations illustrated in that "column" are performed; however, it is noted that "columns" may not be uniform in size or in width as is generally the case in a table. Because only the components and systems in which an operation is performed are shown in any activity diagram, the number of columns and the position of any particular column will differ from diagram to diagram.

In addition, certain ones of the activity diagrams contain one or more sets of ovals each encircling an alphabetic character, wherein one or more ovals of each set has an arrow pointing towards it and the other oval or ovals of the set has/have an arrow pointing away to indicate a signal or data or process flow path from oval to oval. The flow path follows the arrows into an oval marked "A" and exits the one or more other ovals marked "A" having arrows pointing away from the oval; another flow path follows the arrows into an oval marked "B" and exits the one or more other ovals marked "B" having arrows pointing away from the oval; and so forth. All ovals having the same character therein in the same activity diagram are the same path, and a diagram may have sets of ovals identified as "A" and "B" and "C" and so forth, as may be appropriate to a given diagram. Ovals marked "A" or "B" in one activity diagram represent different flow paths and are unrelated to ovals having the same letter designations in a different activity diagram.

Figure 9A:
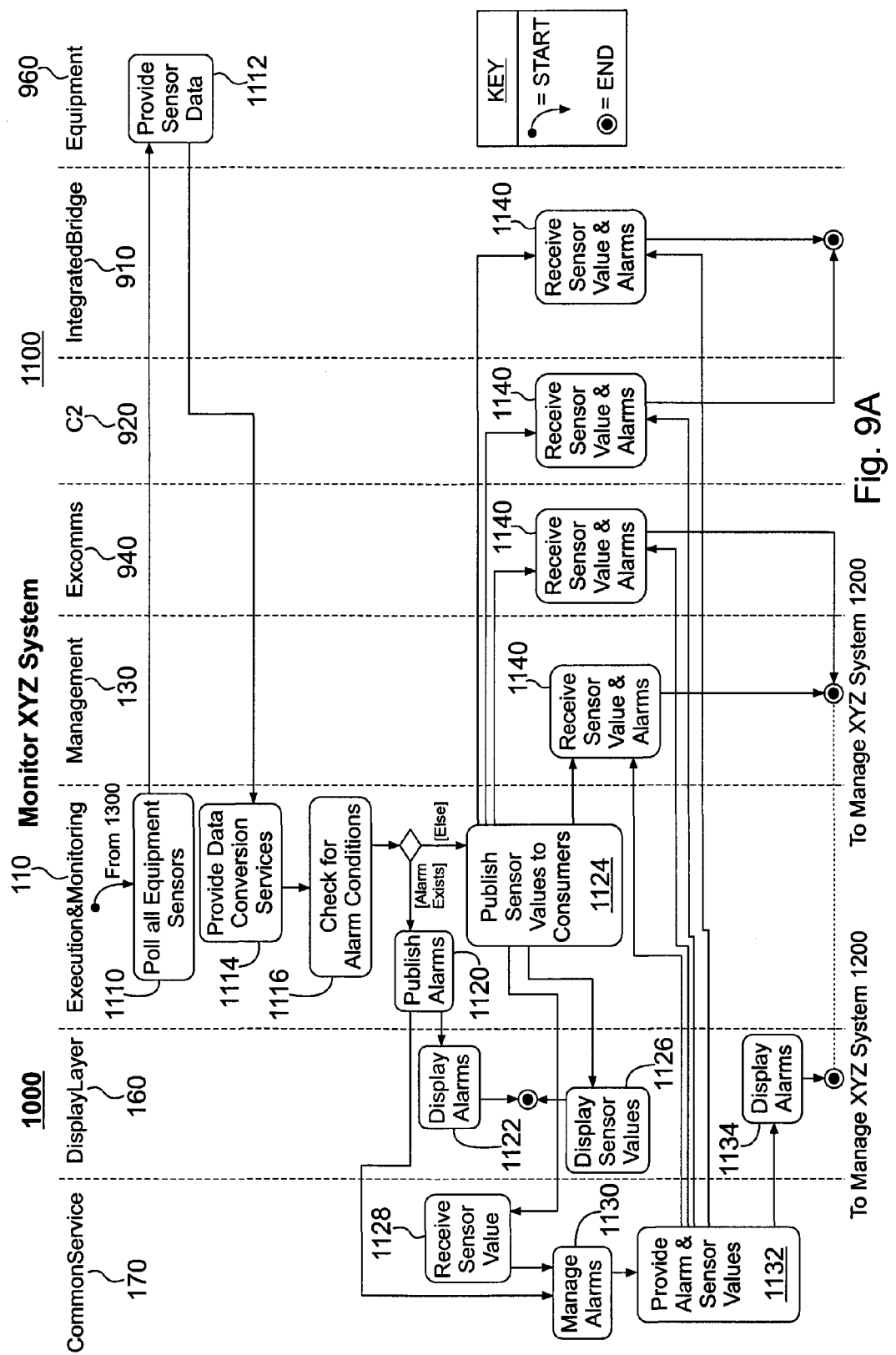
FIG. 9 comprises FIGS. 9A-9C which are schematic flow diagrams of three processes relating to the system level of an example intelligent system manager system.

FIG. 9 includes three activity diagrams relating to process 1000 which includes processes 1100, 1200, 1300 which are system level processes of ISM-X™ system 100. FIG. 9A is a schematic diagram of an ISM-X™ system level monitoring operation or process 1100 wherein the four columns at the left illustrate operations performed in four of the components 110, 130, 160, 170 of the ISM-X™ system 100 and the three columns at the right thereof are for operations performed by systems 910, 920, 940, 960 external to the ISM-X™ system 100. The process 1100 of this activity diagram is entered at system start up of ISM-X system 100 and also after process 1300 described below. All alarm information determined in the monitoring diagram is utilized by the IDSSs 130-145 within management component 130 to assess individual and overall system 100 status. Assessments are provided to consumers, e.g., operators 162 and components of ISM-X™ system 100, and automatic responses will generally be submitted to task manager 131 for deconfliction. Tasks may be for manual commands, e.g., crew implemented commands, and/or commands sent to remotely controllable equipment. If required, task manager 131 may relay the suggested automatically generated tasks to the operator 162 for approval/permission prior to task execution. Process 1100 is intended to monitor the status and operation of the various systems, elements, components, including sensors and alarms, of the platform 900 for which ISM-X™ system 100 is utilized. Monitoring process 1100 is entered from control process 1300 described below.

Monitoring process 1100, e.g., polls 1110 one or more equipment sensors which provide 1112 sensor data that is converted 1114 by data conversion services and checked 1116 for the existence of any alarm conditions. If an alarm exists, the alarm is published 1120 and displayed 1122 for various operators 162, and is also managed 1130 so as to provide 1132 appropriate alarms to be displayed 1134 and to be communicated to various components 130-960, after which process 1100 exits to management process 1200. Manage alarms 1130 may include the following functions: If there is no alarm, then sensor values are published 1124 to various consumers who require and/or desire such values. Alarms and sensor values are communicated 1124, 1132 and received 1140 at various components and functions, e.g., 130, 910, 920, 940, 960, after which process 1100 exits to process 1200.

Communication 1124, 1132 of alarms and sensor values that are received 1140 by external communication function 940 permits the equipment, sensor values and alarms to be remotely monitored, e.g., from a nearby vessel and/or facility or from one in any location. Monitoring 1100 also manages alarms 1130 which may include, e.g., the assignment of alarms, acknowledgment of alarms such as by checking against a table of alarms to determine whether and/or which alarms need to be sent to an operator, and then sending 1132 alarms and sensor values to the appropriate operator(s), filtering of alarm and sensor information, and distribution thereof. Exiting from the targets along the bottom of this diagram provides entry into the next diagram FIG. 9B for system management 1200 wherein the available information is analyzed and an appropriate response is determined.

Figure 9B:
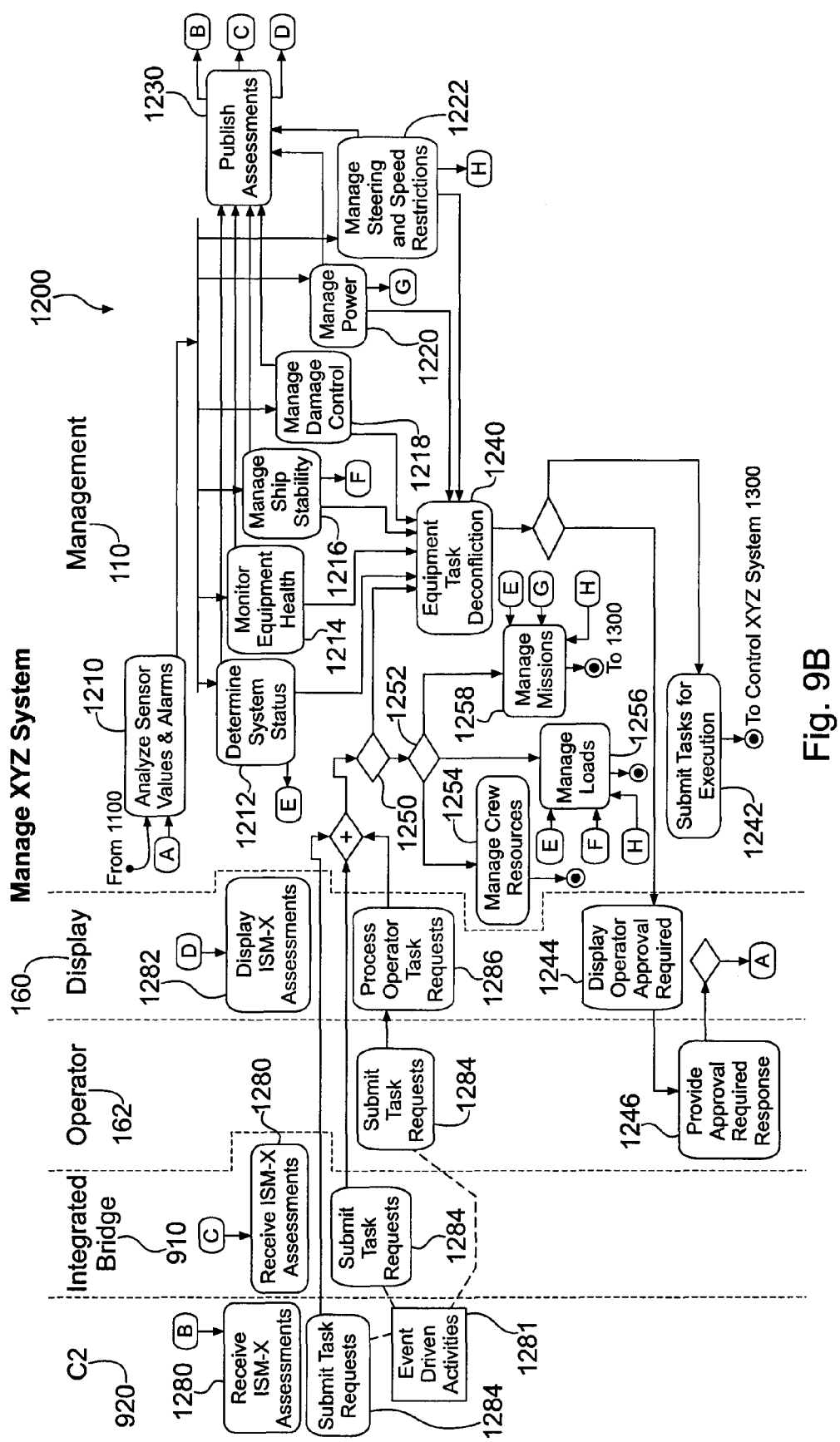

FIG. 9B is a schematic diagram of an ISM-X™ system level management operation 1200 wherein the two columns at the right illustrate operations performed in two of the four components 110, 160 of the ISM-X™ system 100 and the three columns at the left thereof are for operations performed by systems 910, 920, 162 external to the ISM-X™ system. These activities may be entered from the monitoring operation or process 1100 above and provide for the processing and analyzing 1210 of alarm information and sensor values for determining and assessing system status 1212, e.g., for available systems, for determining assessments and generating tasks 1214-1222, e.g., by monitoring and/or managing various equipment, e.g., equipment health 1214, stability 1216, damage control 1218, power 1220, steering and speed restrictions 1222, for responding to the determined assessment. The foregoing functions are performed by various ones of IDSSs 131-139, e.g., by equipment health IDSS 133, operator guidance IDSS 134, stability and load manager IDSS 135, system aggregation IDSS 137, damage control IDSS 138 and power manager IDSS 139. Using the status provided by process 1100, monitoring and managing 1214-1222 makes decisions upon which action is to be taken. Actions are submitted as equipment tasks which preferably include hierarchical task packages which include both summary system level tasks and/or lower level equipment tasks that include tasks associated with particular equipment, e.g., HM&E 960.

Assessments generated 1212-1222 based upon the sensor values and alarm data 1210 are published 1230 and distributed to be displayed 1282 by HMI displays 160 and received 1280 by the bridge 910 and C2 920 functions, e.g., for situational awareness and/or for action, if desired.

Tasks are deconflicted 1240 and prioritized, e.g., by task manager IDSS 131, and are submitted for execution 1242 if approval is not required, after which process 1200 exits to process 1300. If approval is required the tasks are displayed 1244 via HMI 160 for operator 162 to review and provide an approval or other response 1246, and if approved are submitted 1242 for execution by process 1300. Exiting from the targets of this diagram provides entry into the next diagram for system control 1300 wherein the tasks are submitted for execution. If not approved by the operator 1246, then the process 1200 begins again to analyze 1210 the sensor values and alarms.

The bridge 910 and/or C2 operation 920 and/or operator 162 may submit 1284 tasks, e.g., in response to task assessments received 1280 or task assessments displayed 1282, which are known as event driven activities 1281. Tasks may be for manual execution, e.g., by one or more crew or staff, or for automated execution, and generally include a hierarchy of tasks, e.g., tasks at the system, element, component and/or equipment levels. Operator requested tasks 1284 are typically processed 1286 via the display component 150 which resides on HMI 160. Equipment tasks are provided 1250 for deconfliction 1240 as above and service tasks are sent 1252 to the appropriate functions as requests to manage crew resources 1254, to manage loads 1256 or to manage mission 1258.

For managing crew resources 1254, tasks for operators will be provided via a HMI display 160 as described in relation to control process 1300. Load management 1256 receives requests and/or data from operators 1284-1287 via 1250, 1252, from system status 1212, from stability management 1216 and from steering and speed restrictions 1222 to provide control commands to control process 1300. Mission management 1258 receives information and data from operator requests 1284-1287 via 1250, 1252, from system status 1212, from power management 1220 and from steering and speed restrictions 1222 to provide control commands to control process 1300. Each of manage functions 1254, 1256, 1258 are tools that require significant operator 162 interaction as is evident from the communication and display of information and data to operators 162 and to other functions, such as bridge 910 and C2 920.

It is noted that operator(s) 162 and other external actors (whether human or machine) may be capable of submitting high level system directives, e.g., "pump ballast tank X" or "transfer Y gallons of fuel from tank A to tank B," as well as and/or in addition to discrete equipment tasks. Further, external actors may be capable of utilizing ISM-X™ system 100 services, e.g., crew or manpower functions, load management and/or mission management. Certain of the operations involve tools and may require significant operator 162 interaction with the ISM-X™ system 100 through its displays HMI 160. Exiting from the targets of this diagram provides entry into the next diagram for system control 1300 wherein the tasks are submitted for execution.

Figure 9C:
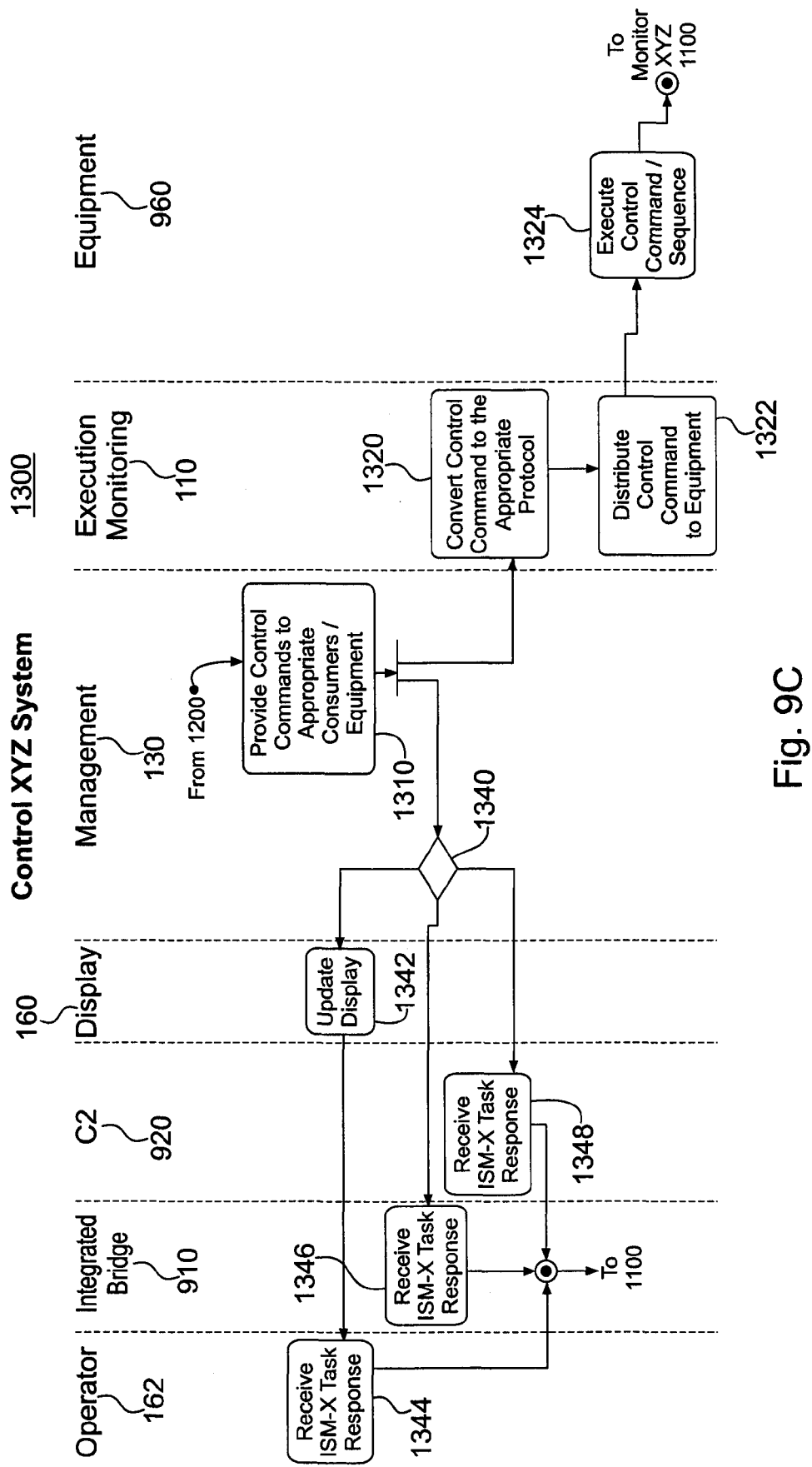

FIG. 9C is a schematic diagram of an ISM-X™ system level control operation 1300 wherein the three columns near the center illustrate operations performed in three of the four components of the ISM-X™ system 100 and the columns at the left and right thereof are for operations performed by systems 900-960 external to the ISM-X™ system. These activities are entered from the managing operation or process 1200 above and provide for the execution of the tasks generated in the management process 1200. Equipment tasks are converted 1310 into appropriate control commands that are provided 1310 to and can be executed, e.g., by various equipment 960, e.g., via execution and monitoring 110. Task responses are generated 1310 and sent to tasking entities 162, 910, 920. Exiting from the targets of this diagram provides entry returning to the diagram for system monitoring 1100 above, thereby providing for a complete and repetitive functioning of ISM-X™ system 100 through monitoring process 1100, managing process 1200 and controlling 1300 process.

Equipment tasks converted 1310 to control commands are provided 1310 to execution and monitoring component 110 wherein they are formatted 1320 into an appropriate protocol to be distributed 1322 to the affected equipment 960 wherein the command or command sequence is executed 1324, whereupon process 1300 exits to return to process 1100.

Tasks for consumers/operators 162, 910, 920 are distributed 1340 appropriately for display 1342 via display 160 for consumer/operator 162 receipt and response 1344, and/or for bridge 910 receipt and response 1346 and/or for c2 receipt and response 1348, whereupon process 1300 exits to return to process 1100.

FIG. 10 includes ten activity diagrams of FIGS. 10A-10J relating to processes performed at the Management Component 130 level in the operation of the ISM-X™ system 100, e.g., in the management component 130 as described above and in FIG. 2. Where an IDSS receives sensor and alarm values, such values are received from the Execution and Monitoring 110 function and/or the Alarm Manager 177 function via the Communication Services 180 function of the Common Services Component 170 as may be provided by the process 3100 shown in FIG. 11A. Where a task is monitored for effectiveness, such monitoring may be provided by the process 3200 shown in FIG. 11B. Process 3200 may be included in the one or ones of the IDSSs that monitor their own processes.

Figure 10A:
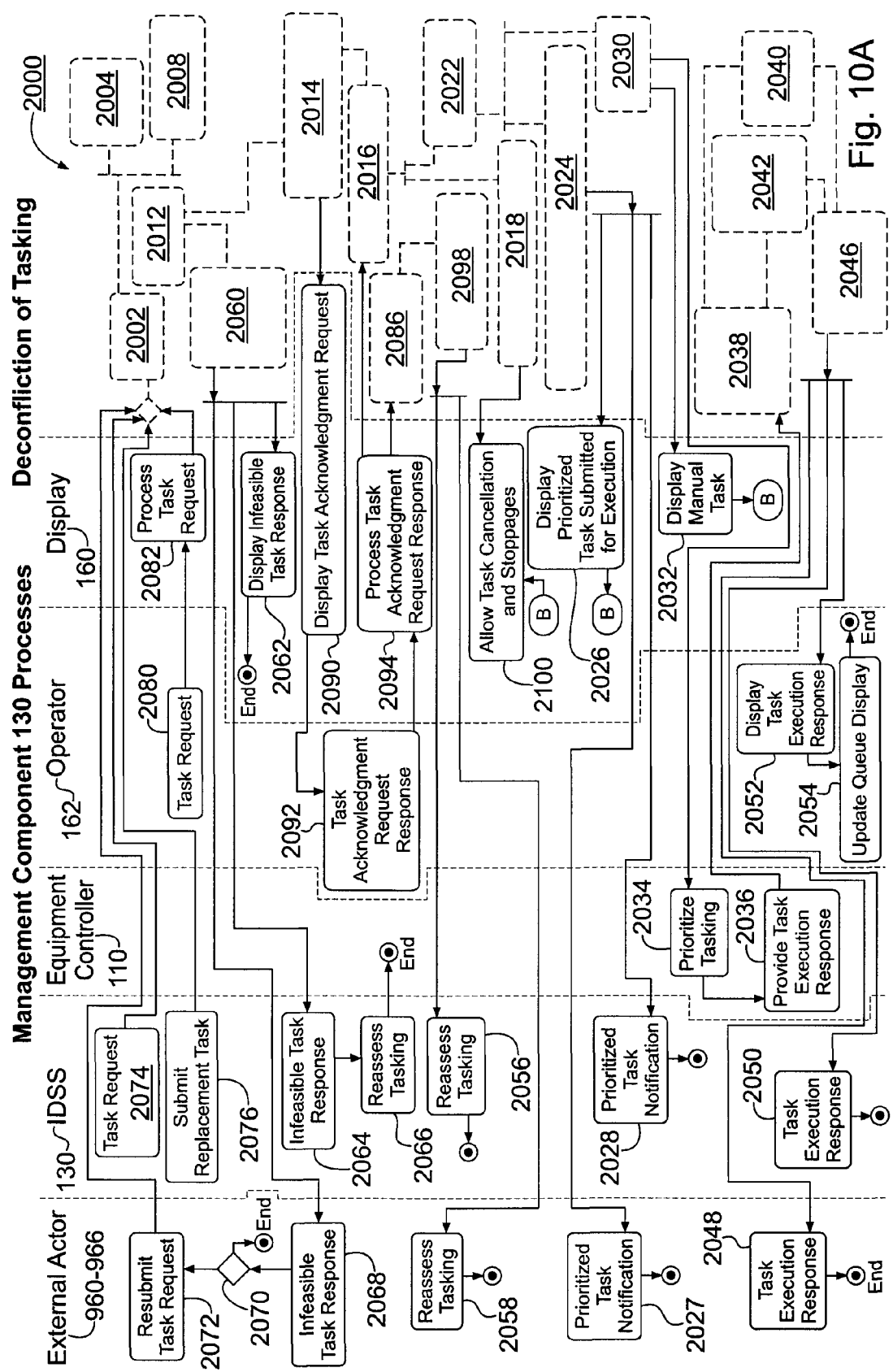
FIG. 10 comprises FIGS. 10A-10J which are schematic flow diagrams of ten processes relating to the management component of the example intelligent system manager system.
Figure 10A:
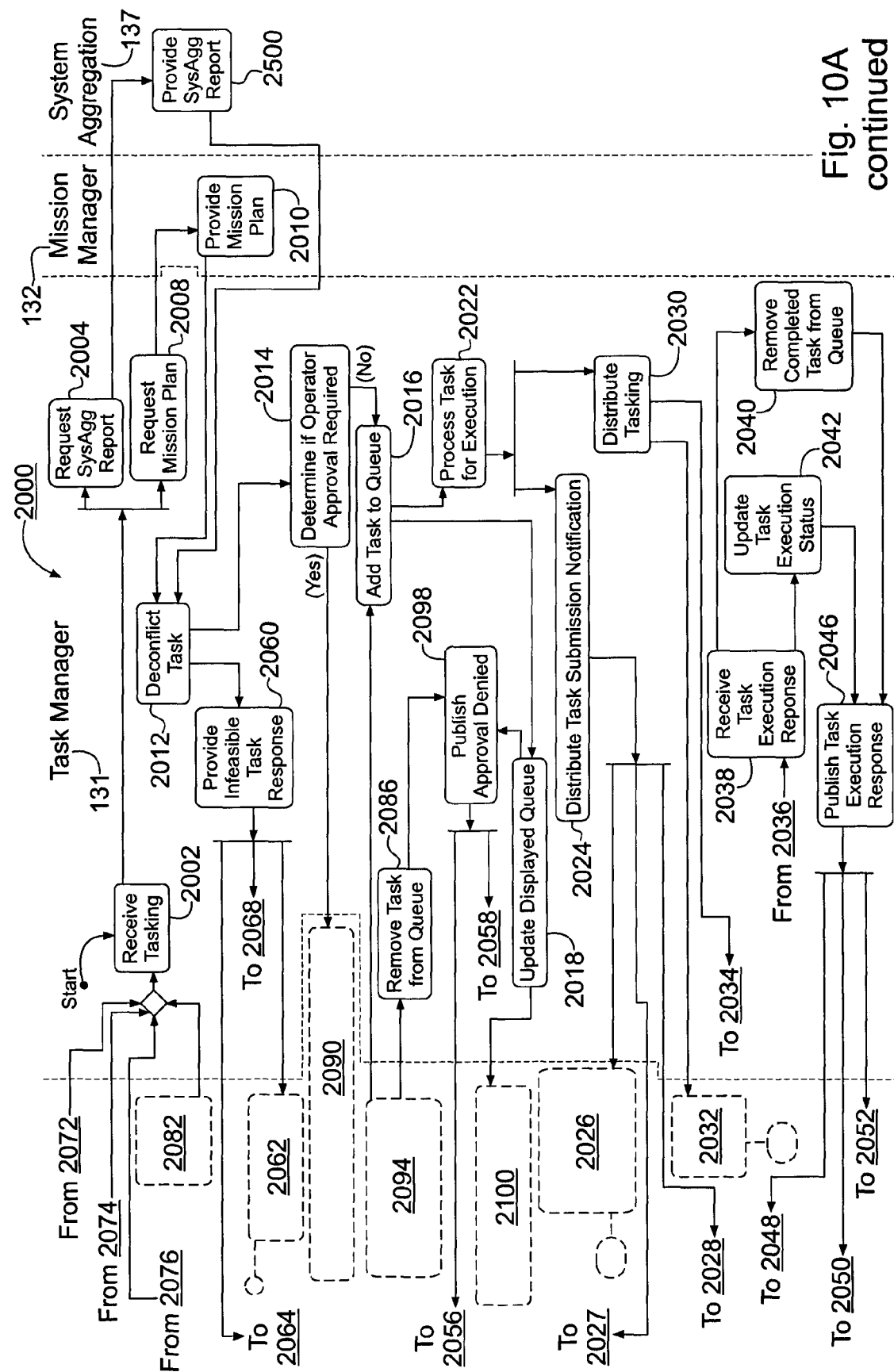

FIG. 10A is a schematic diagram of an ISM-X™ Management Component process for de-conflicting tasks received by the Task Manager 131, e.g., as shown in FIG. 2. Task manager 131 receives tasks and/or task requests from the bridge 910, C2 920, operator 162, other IDSSs 132-145, external sources 940 or other entities internal or external to system 100. Task de-confliction 2000 may include, e.g., identifying tasks that conflict in effect, outcome, timing, and the like, and notifying the requesting entity of task conflicts; the requesting entity may then providing one or more replacement tasks and/or task requests where appropriate which are then processed for de-confliction 2000. Tasks may be prioritized on a first-in-first-out (FIFO), weighted FIFO, earliest deadline first, or another basis. The status of tasks is monitored and reported, e.g., complete, in process, delayed, pending, and the like, and completed tasks are removed from the task queue.

In general, IDSSs 132-145 and other actors like the Operator 162, Bridge 910 or C2 920 may submit tasking to the Task Manager 131. Upon receipt of task requests the Task Manager 131 will use the current mission plan and system aggregation report, provided by the Mission Manager IDSS 132 and System Aggregation IDSS 137, respectively, to deconflict the current tasking. This deconfliction process 2000 ensures that the new task request adheres to the current mission plan and that its execution is feasible given the current equipment/system status. If a conflict exists, the entity requesting the tasking (tasking entity) is informed with an infeasible (Not Feasible) task response. That entity may choose to re-evaluate and re-submit a similar or alternate task to attempt to achieve its original goal. If the task has no conflicts the task manager 131 will evaluate the task received to determine if operator approval is required before the task can be executed. Operator approval is not likely required for tasking generated by an operator 162, however, operator 162 approval may be required and/or desired when the task originated from an IDSS 131-139. This will allow for a "human-in-the-loop" in the decision/task execution process if required by the platform.

If the Task Manager 131 determines that operator 162 acknowledgment is required, the Task Manager 131 will publish this requirement to the Display component 160 and wait for a response from the operator 162. If the request is denied by the operator 162 the Task Manager 131 will publish the request denied notification back to the tasking entity (e.g., IDSS 132-139, Bridge 910 or C2 920). If the tasking is approved, or the task did not require operator approval, the task is added to a Queue for execution. The tasks currently being processed, which are stored in this Queue while awaiting execution, are displayed to the operator 162 via HMI 160. Tasks are distributed to the appropriate destination by the Task Manager 131 for execution.

At a high level, there are two types of tasks. The first is a Manual task, which would be displayed to the operator 162 on the HMI 160 and executed by a system operator 162. The second type of tasks are remote equipment tasks which are distributed by the Task Manager 131 to the appropriate equipment controller 140, e.g. in the context of a ship application Ride Control 141, Electrical 142, Propulsion 143, Auxiliary 144, Damage Control 145, etc. Equipment controllers 140 distribute the commands to the equipment 960-966 and provide progress via task execution responses. These responses or statuses are published to the display 160 and tasking entities. Should a task complete, it is removed from the queue and the display 160 is updated accordingly.

Once tasks have been entered in the Queue, the Operator 162 will have an opportunity to cancel and/or stop any or all of the tasks that are currently in the queue awaiting execution. This functionality is available as soon as a task (an equipment or manual task) is entered in the queue, and is further described in the Figures following.

Specifically, the deconfliction process 2000 of FIG. 10A starts as tasking is received 2002 by task manager 131, e.g., by submission 2072 of a task request from an external actor 960-960, by submission 2074 of a new task request or submission 2076 of a replacement task from an IDSS 132-139, or by submission 2080 of a task request from an operator 162 using the processing 2082 of display component 160. Usually, but not necessarily, tasking submitted by external actor 960-966 or by an operator are submitted in response to an event and so may be called "event driven." Tasking submitted by an IDSS 132-139 are based upon analysis of the current sensor data and alarm values by the IDSS given its decision making capabilities. The received 2002 tasking is used to request 2004 a system aggregation report which is provided 2500 by system aggregation IDSS 137 and to request 2008 a mission plan which is provided 2010 by mission manager 132.

Tasking is deconflicted 2012 as received, e.g., the newest or most recently received task is tested to determine whether it adheres to the current mission plan and is supported by the then current system and equipment status, as reflected by the system aggregation report, consistent with supporting the operations then being conducted. Following deconfliction 2012, one path (Conflict) is followed if a conflict exists and another path (Else) is followed if there is no conflict.

If no conflict exists, it is determined 2014 whether approval by an operator 162 is required. If an operator 162 is required to approve or acknowledge a task, the task is displayed 2090 for such approval/acknowledgment via display 160. The operator's response 2092 of approval or acknowledgment is processed 2094 via display 160 and, if the task is approved and/or acknowledged, it is added 2016 to a queue of tasks awaiting execution maintained by task manager 131. Alternatively, if no conflict exists and it is determined 2014 that approval by an operator 162 is not required, the task is added 2016 to the queue of tasks awaiting execution. If the response 2092, 2094 of operator 162 is to deny approval of the task, the task is removed 2096 from the queue of tasks awaiting execution, the denial is published 2098 by task manager 131. The denial is communicated 2056, 2058 to the entity that requested the task for reassessment, e.g., to the IDSS 132-139 for reassessment 2056 of the tasking it requested or to the external actor 960-966 for reassessment 2058 of the tasking it requested, after which process 2000 ends. It is noted that either or both of IDSS 132-139 and external actor 960-966 may resubmit replacement tasks or other tasks that are then processed as described herein, so any "end" of deconfliction process 2000 is not the end of the processing of tasks by system 100.

The display of tasks in the queue is updated 2018 by task manager 131 as tasks are added to the queue and as tasks are removed from the queue, either by completion or by being removed for another reason, and the tasks in the queue are displayed by HMI 160 so as to allow their being cancelled 2100 before execution and/or stopped 2100 if execution has started. Tasks in the queue are processed 2022 for execution by task manager 131. Task manager 131 notifies (distributes) 2024 the tasking entities of task submissions via submission notifications and may also notify other entities and components, e.g., ones that have a need to know such information, have requested such information and/or have an interest in such information, for display 2026 as prioritized tasks submitted for execution. Distributed 2024 task submission notifications are communicated 2028 to IDSS 130, are communicated 2027 to operator 162 and/or are communicated 2027 to external actor 960-966, as prioritized task notifications Processing 2022 also causes tasks to be distributed 2030 as tasking either via a display 160 displayed 2032 as a manual task for manual (human) execution or distributed via equipment controller 110 as prioritized 2034 tasking. Displayed 2026, 2032 tasks, and task status, are communicated to process 2100 so as to allow their being cancelled and/or stopped.

Prioritized tasks and their status are communicated 2036 by equipment controller 110 and received 2038 by task manager 131. If received 2038 as a task completed, the task is removed 2042 from the queue and that removal is published 2046 by task manager 131, e.g., to indicate whether the task status is complete, in-progress, delayed, or pending. If received 2038 as other than a completed task, the task execution response and status is updated 2042 and is published 2046 by task manager 131. Published 2046 task execution responses, e.g., status information and changes, are communicated 2048 to the external actor 960-966, communicated 2050 to the IDSSs 130, and are displayed 2052 and update 2054 the queue display of display 160. Process 2000 ends after steps 2048, 2050 and 2054.

Where deconfliction 2012 determines that a conflict exists, task manager 131 provides 2060 a response to the requesting IDSS 132-139 or entity indicating that the tasking is infeasible (not feasible) and cannot be executed. In response to this infeasible task notification 2064 the tasking entity 132-139 may reassess 2066 to determine if there is a back up or alternative task that can be initiated as a replacement for the current infeasible task. While tasks it submitted are in the queue, the requesting IDSS 132-139 monitors the current tasks in the queue in task manager 131 and compares them to the back up tasks, if any, that were generated. If the IDSS 132-139 determines that the back up task or an alternative task would be more effective than the task in the queue or the task currently executing, then it will submit a replacement task to task manager 131. The response indicating that the task is infeasible (not feasible) to be executed is provided to update display 160 to display 2062 its status as an infeasible task, e.g., as an update for operator 162, after which process 2000 ends. Task manager 131 may in some instances assign equal priority to two or more tasks, in which instances an operator 162 is called upon, e.g., via display 160, to decide and to indicate the deconfliction of the tasks having equal priority and/or of the deconfliction of the priority thereof.

Figure 10B:
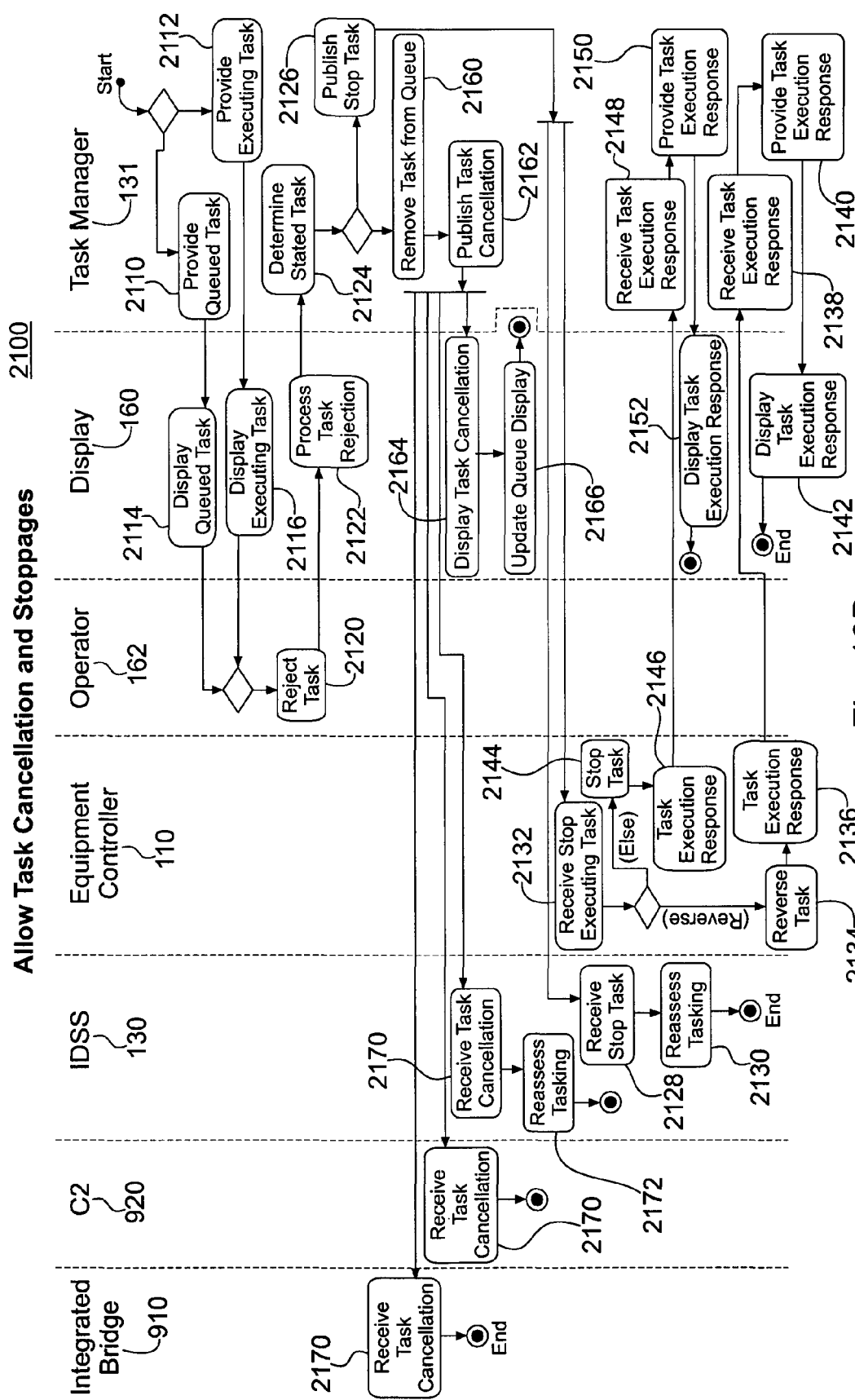

FIG. 10B is a schematic diagram of an ISM-X™ Management Component process 2100 for allowing tasks to be cancelled and/or stopped, e.g., where an operator rejects a task generated by the ISM-X™ system 100, utilizing the Task Manager IDSS 131 in FIG. 2. Rejected tasks are cancelled, removed from the queue and the status is published to interested functions. In some instances, an equipment controller may not just stop a task, but may reverse a task, and the actual status is indicated in the status display.

Task manager 131 provides queued tasks 2110 or provides executing tasks 2112 which are respectively displayed 2114, 2116 by HMI 160 for an operator 162. If rejected 2120 by operator 162, display 160 processes 2122 that input to task manager 131 which determines the task status 2124. If the rejected task is executing, a stop task notice is published 2126 and received 2128, 2132 by IDSSs 130 and equipment controller 110. The involved IDSSs 130-145 respond thereto by reassessing 2130 the tasking, and process 2100 then exits. Equipment controller 110 determines whether or not the task is reversible and if it is, the task is reversed 2134 and an execution indication is provided 2136 to confirm the reversal of the task which indication is received 2138 by task manager 131 and provided 2140 to HMI 160 for display 2142, and process 2100 exits to the process from which it started. If the task is not reversible, the task is stopped 2144 and an execution indication is provided 2146 to confirm the stoppage of the task which indication is received 2148 by task manager 131 and provided 2150 to HMI 160 for display 2152, and process 2100 then exits.

If the task is determined 2124 to be in a queue, then it is removed 2160 from the queue and the task cancellation is published 2162 to be displayed 2166 by HMI 160, and process 2100 exits to the process from which it started. Published 2162 cancellations are also received 1270 by bridge 910 and C2 functions 920, and process 2100 exits to the process from which it started. Published 2162 task cancellations received 2170 by IDSSs 130 are reassessed 2172 by the involved IDSSs, and process 2100 then exits.

Figure 10C:
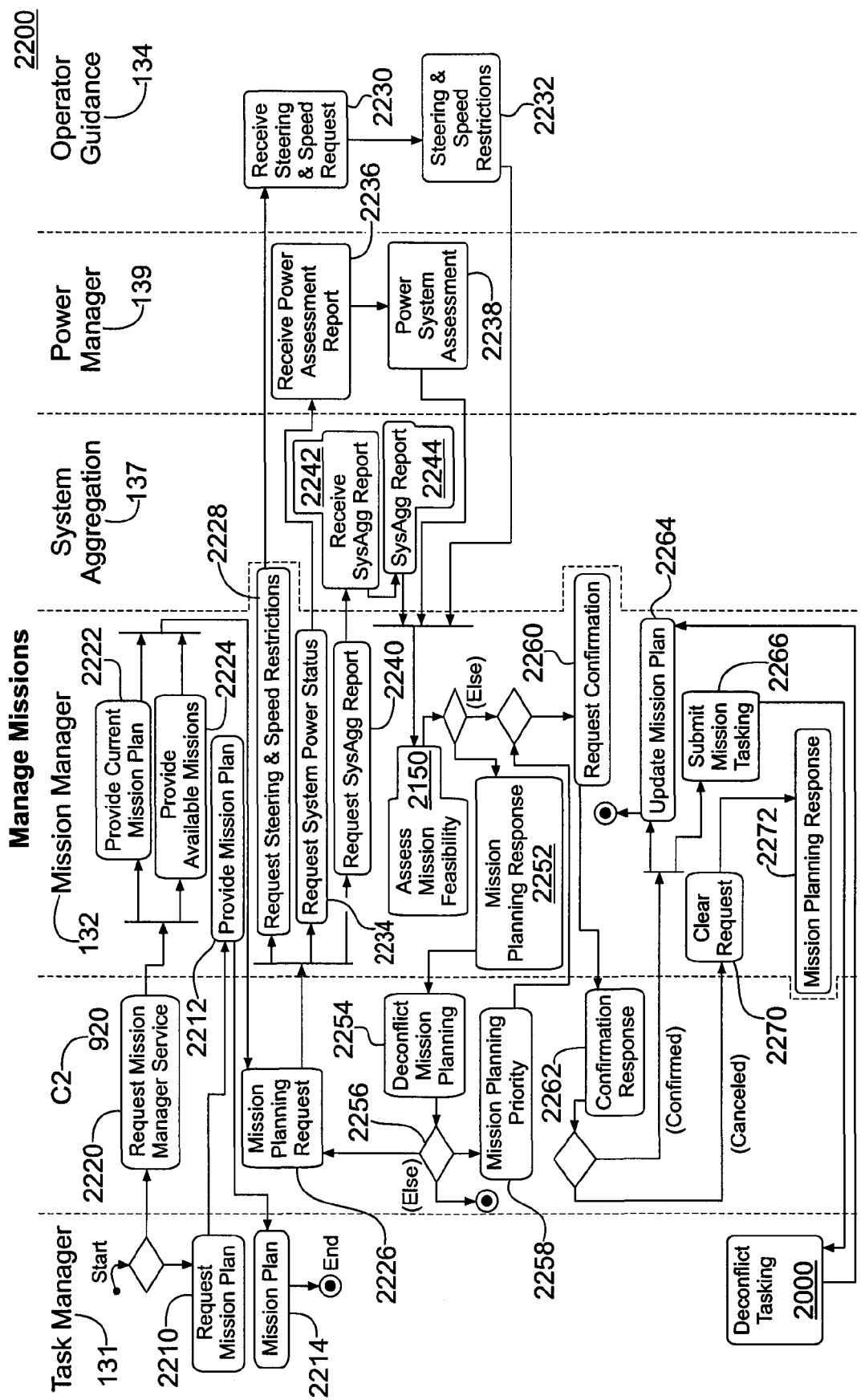

FIG. 10C is a schematic diagram of an ISM-X™ Management Component process 2200 for managing missions utilizing the Mission Manager IDSS 132 in FIG. 2. A selected mission plan or part thereof is inputted from C2 920 and available resources are queried as to status, availability, limitations and the like, and this information is processed to confirm whether the mission is feasible and whether it may or may not be undertaken. Changes to mission plans may also be provided and/or implemented as a result of this process.

Task manager 131 or C2 920 may request 2210 an existing mission plan which is then provided 2212 by mission manager 132 to task manager 131 as a mission plan 2214. C2 920 may request 2212 a mission plan which request is responded to by mission manager 132 by providing a current mission plan 2222 and/or any available missions 2224. Using this current mission data, C2 920 may create mission planning requests 2226. If mission manager 132 identifies the C2 request as a request for steering and/or speed restrictions 2228, the request is communicated to and received 2230 by operator guidance IDSS 134 which returns 2232 steering and/or speed restrictions. If mission manager 132 identifies the C2 request as a request relating to power status 2234, the request is communicated to and received 2236 by power manager IDSS 139 as a request for a power assessment and a power assessment is returned 2238. If mission manager 132 identifies the C2 request as a request for a systems aggregation report 2240, the request is communicated to and received 2242 by system aggregation IDSS 137 which returns 2244 a systems aggregation report. From each of the foregoing an assessment 2150 of mission feasibility is undertaken.

If a conflict exists that is provided 2252 to the C2 function 920 as a mission planning response indicating that there is a scheduling conflict or equipment availability conflict or other conflict so that deconfliction 2254 may be done by the C2 function 920. C2 may re-plan in which instance a revised or new request is provided 2226 or may elect to override the conflicting condition providing 2258 a higher mission planning priority. If C2 does not elect to re-plan or prioritize, then process 2200 exits until a new request is received.

If there is no conflict 2150 or if C2 920 has prioritized 2258 the mission, mission manager 132 requests 2262 confirmation thereof from C2. If confirmed by C2, mission manager 132 updates 2264 the mission plan and submits 2266 the mission tasking to task manager 131 for use in deconfliction 2000 following which the mission plan is updated 2264 with the prioritized task, after which process 2200 exits. If canceled by C2, mission manager 132 clears 2270 the request and the mission planning response is deleted 2272.

Figure 10D:
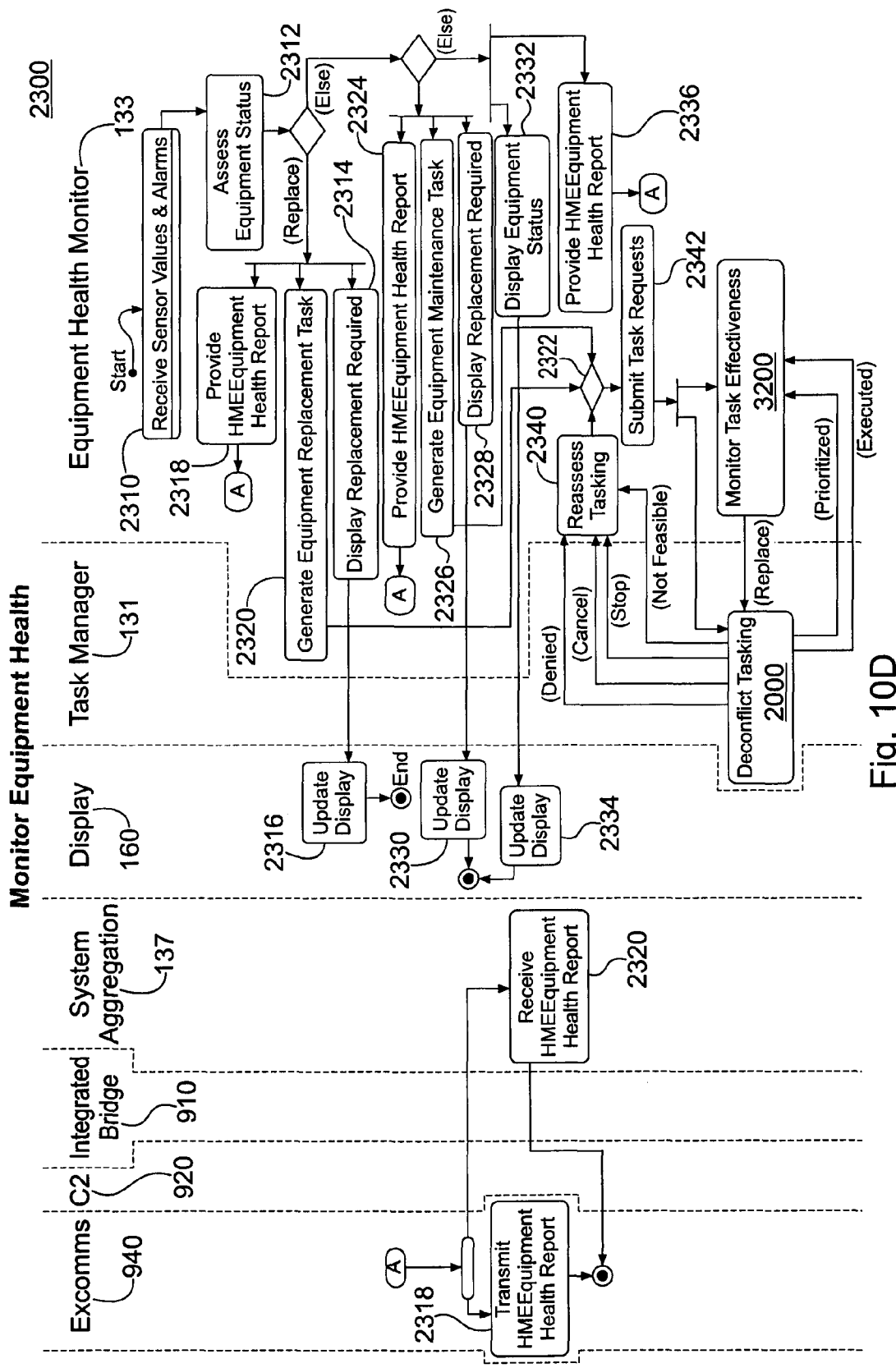

FIG. 10D is a schematic diagram of an ISM-X™ Management Component process 2300 for monitoring equipment health utilizing the Equipment Health Monitor IDSS 133 in FIG. 2. Health monitoring includes receiving sensor and alarm values and assessing therefrom the "health" (e.g., on/off/standby status, operating mode, operating condition, and the like) of various equipment, e.g., HM&E, and to report thereon, including recommending need for maintenance and/or replacement. Maintenance tasks are generated and displayed, are prioritized and de-conflicted, and are monitored and displayed while pending, being executed, and when completed.

Equipment health values and alarms are received 2310 by equipment health monitor IDSS 133 and are utilized to assess 2312 equipment status. If the assessment 2312 indicates that equipment replacement is required, that data is provided 2314 to display 160 to update 2316 the display of equipment health/status, e.g., available to an operator, and may be provided 2318 via exterior communication 940 to transmit an equipment health report, e.g., to a remote location for planning and/or action and/or record keeping, as the case may be, after which steps process 2300 exits. The equipment health report transmitted 2318 is also received 2320 by system aggregation IDSS 137 for use therein (see below), after which process 2300 exits. Further, an equipment replacement task is generated 2320 which is merged 2322 with maintenance tasks and submitted 2342 for deconfliction 2000 and monitoring 3200.

If the assessment 2312 indicates that equipment maintenance is required, that data is provided 2328 to display 160 to update 2330 the display of equipment health/status, e.g., available to an operator, and may be provided 2324 via exterior communication 940 to transmit 2318 an equipment health report, after which steps process 2300 exits to the process from which it started. The equipment health report transmitted 2318 is also received 2320 by system aggregation IDSS 137 for use therein (see below), after which process 2300 exits. Further, an equipment maintenance task is generated 2326 which is combined 2322 with maintenance tasks and task reassessments 2340 for further processing.

If neither equipment replacement or equipment maintenance is required, than that equipment status is displayed 2332 to update 2334 the display 160, after which process 2300 exits. That equipment status is also provided 2336 as an equipment health report via exterior communications 940 to be transmitted 2318 and received 2320 as an equipment health report, after which process 2300 exits to the process from which it started.

Equipment maintenance and replacement tasks 2320 are submitted 2342 as task requests to task manager 131 for deconfliction 2000 and are monitored 3200 by equipment health monitor 133 for task effectiveness. If process 3200 of equipment health monitor 133 determines that a task is no longer effective, a replacement task (if applicable) is provided from monitor 3200 to deconfliction 2000. After deconfliction 2000, the tasks that are prioritized tasks or executed tasks are returned to monitoring function 3200 accessed by equipment health monitor 133 for monitoring 3200 task effectiveness (see below). Also after deconfliction 2000 (see above), tasks for which approval is denied or which are cancelled or stopped (see process 2200), or which are not feasible, are returned to equipment health monitor 133 for reassessment 2340. It is noted that monitoring process 3200 provides an exit from the 2340, 2342, 2344, 2346 loop, e.g., after task manager 131 provides a notification that a task has been executed, i.e. completed.

Figure 10E:
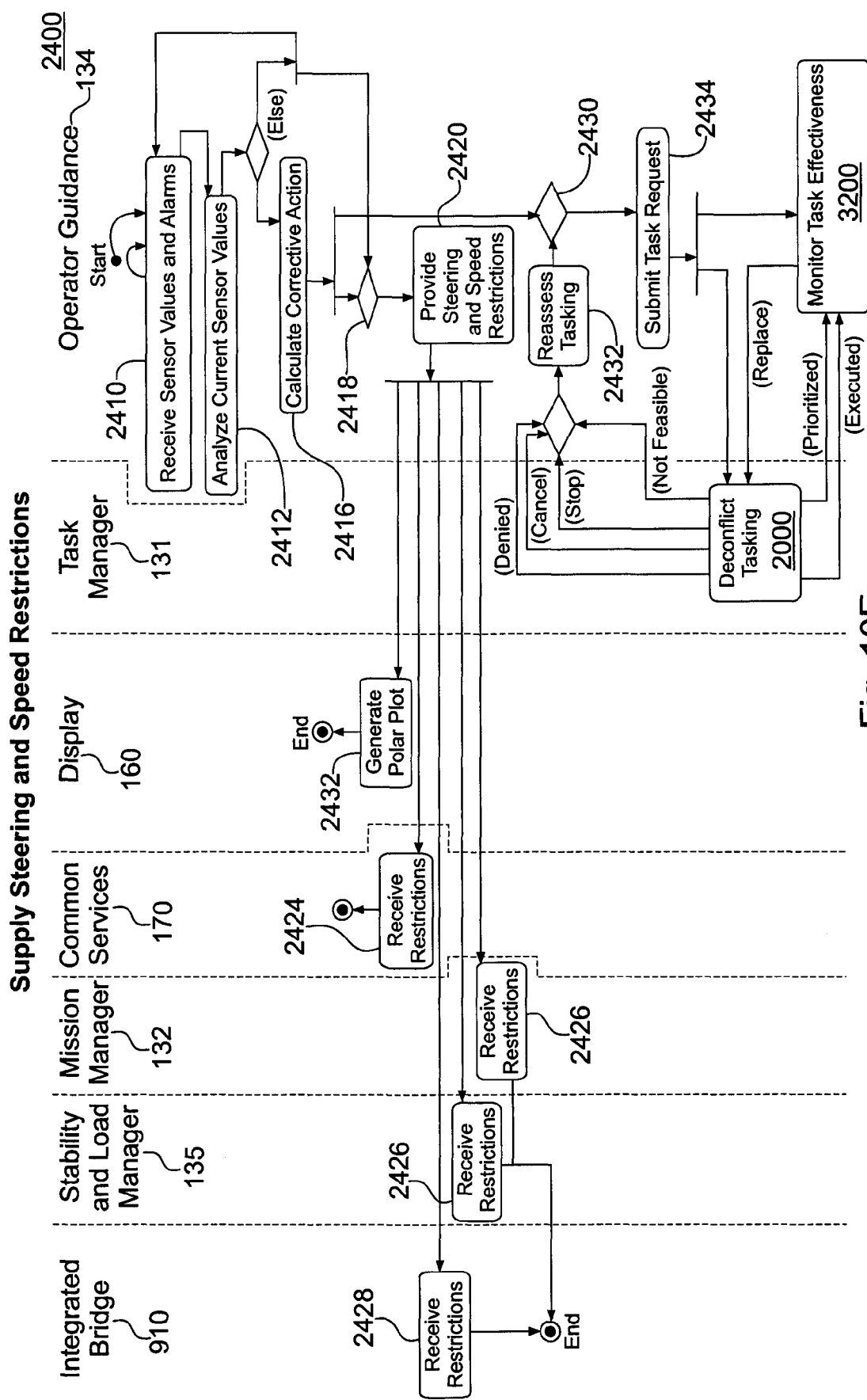

FIG. 10E is a schematic diagram of an ISM-X™ Management Component process 2400 for supplying steering and speed restrictions utilizing the Operator Guidance IDSS 134 in FIG. 2. This IDSS 134 receives alarm and sensor values as well as wave environment and sea state data, stability and load data, and propulsion system data including current speed and heading, all of which is processed using e.g., a stability model for determining the limits and/or boundaries between safe operation and a hazardous condition. From this, steering and speed restrictions are produced and sent to the bridge 910, the stability manager 135, mission manager 132 and to the Display component 160. Tasks generated are prioritized and de-conflicted, and where necessary may be reassessed or stopped, if necessary to maintain safe operation.

At the start, sensor values and alarms are received 2410 and are analyzed 2412, and if not presenting a hazardous situation 2414, the receiving 2410 and analyzing 2412 steps continue to repeat. A hazardous situation may be determined, e.g., by assessing 2414 a predefined set of sensor values and variables against the current conditions, e.g., conditions relating to wave environment, sea state, wind speed and direction, vessel stability and load data, and propulsion system data such as speed and heading. If the situation is assessed 2414 to be hazardous, then operator guidance IDSS 134 calculates 2416 a corrective action which is combined 2418 with the analyzed sensor values and utilized for providing 2420 steering and speed restrictions.

The provided 2420 steering and speed restrictions are received by display component 160 to generate 2422 a polar plot representing allowable and not allowable speed and steering conditions, are received 2424 by common services component 170, are received 2426 by mission manager IDSS 132, are received by stability and load manager 135 and are received 2428 by bridge 910, for their respective uses, after which process 2400 exits.

In parallel, the calculated 2416 corrective action is merged 2430 with reassessed 2432 tasking (if any) for submission 2434 of a task request to task manager IDSS 131 for deconfliction 2000 and to operator guidance IDSS 134 which monitors 3200 task effectiveness. After deconfliction 2000, the tasks that are prioritized tasks or executed tasks are returned to monitoring function 3200 accessed by operator guidance IDSS 134 for monitoring 3200 task effectiveness (see below). Also after deconfliction 2000 (see above), tasks for which approval is denied or which are cancelled or stopped (see process 2200), or which are not feasible, are returned to operator guidance IDSS 134 for reassessment 2340. It is noted that monitoring process 3200 provides an exit from the 2340, 2342, 2344, 2346 loop, e.g., after task manager 131 provides a notification that a task has been executed, i.e. completed.

Figure 10F:
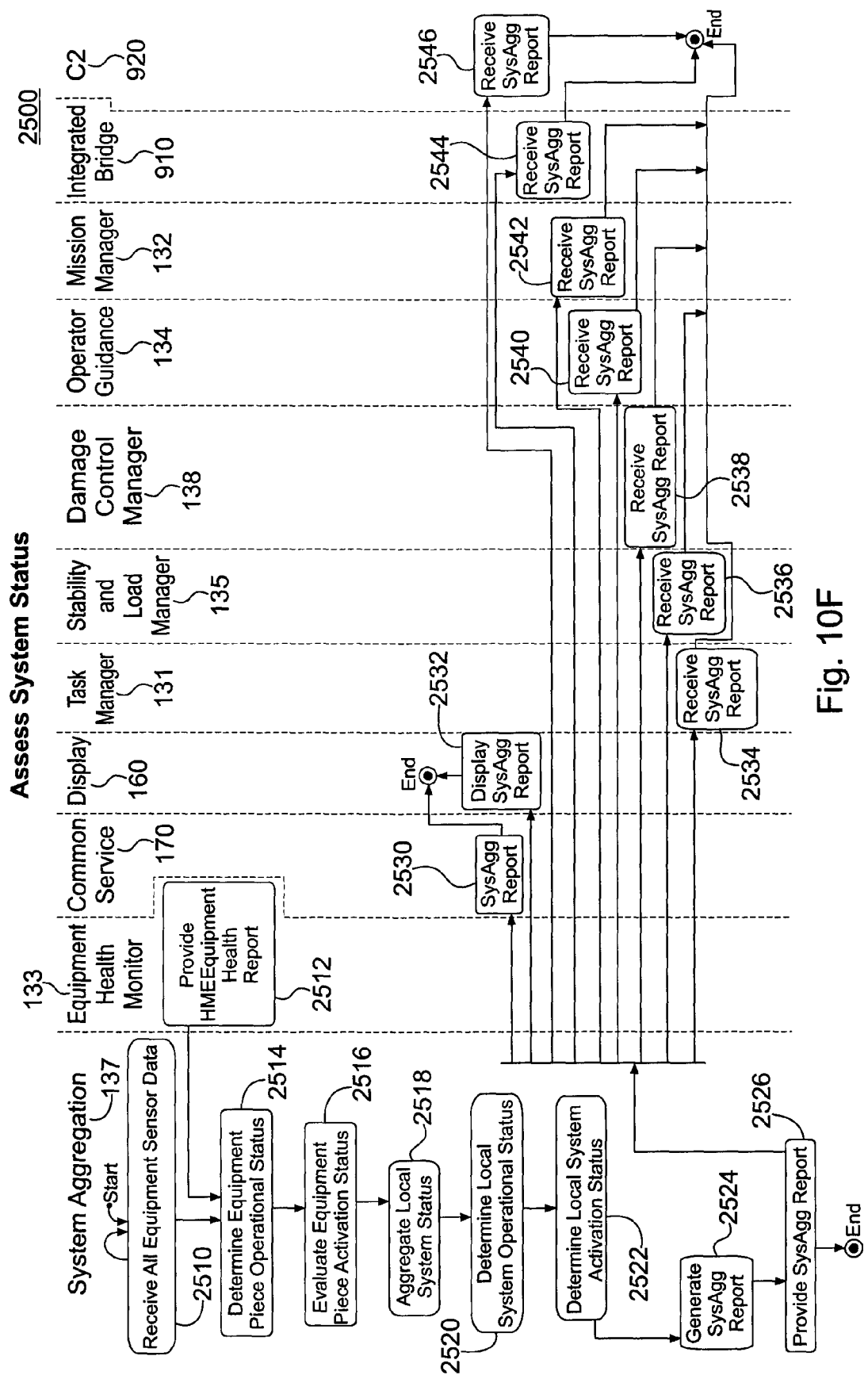

FIG. 10F is a schematic diagram of an ISM-X™ Management Component process 2500 for assessing the system status utilizing the System Aggregation IDSS 137 in FIG. 2. For each system under the purview of ISM-X™ system 100, sensor data for the equipment thereof is received and organized, e.g., aggregated, in accordance with data for the layout of each system and the equipment it depends upon. From the assessed status of the various systems, an overall system status is generated and is reported to various IDSSs 130-145 and other parts of ISM-X™ system 100 as well as to subsystems and/or functions of the vessel 900 that are outside of ISM-X™ system 100.

Equipment sensor values and data are received 2510 by system aggregation IDSS 137 and HM&E equipment health reports, which are in large part driven by events, are provided 2512 by equipment health monitor 133, and the operational and activation status of each piece of equipment under the control and/or monitoring of ISM-X™ system 100 is determined 2514, 2516, respectively, therefrom. The status of all local systems is aggregated 2518, e.g., considering data regarding the layout of each system and its dependency upon specific pieces of equipment, for every local system under the control and/or monitoring of ISM-X™ system 100, for determining 2520 the operational status and determining 2522 the activation status of each local system. Once the operational and activation status of the local systems is determined 2520, 2522, that data is combined and utilized to generate 2524 a systems aggregation report for the overall system 100.

The system aggregation report representing the operational and activation status of the entire system based upon the status of the subsystems and equipment thereof thus generated 2524 is then provided 2526 to various entities, e.g., including provision 2530 to common services component 170, for display 2532 by HMI display 160, for receipt 2534, 2536, 2538, 2540, 2542, 2544, 2546 by task manager IDSS 131, stability and load manager IDSS 135, damage control manager IDSS 138, operator guidance IDSS 134, mission manager IDSS 132, integrated bridge 910 and C2 920, respectively, after which process 2500 exits to the process from which it started.

Figure 10G:
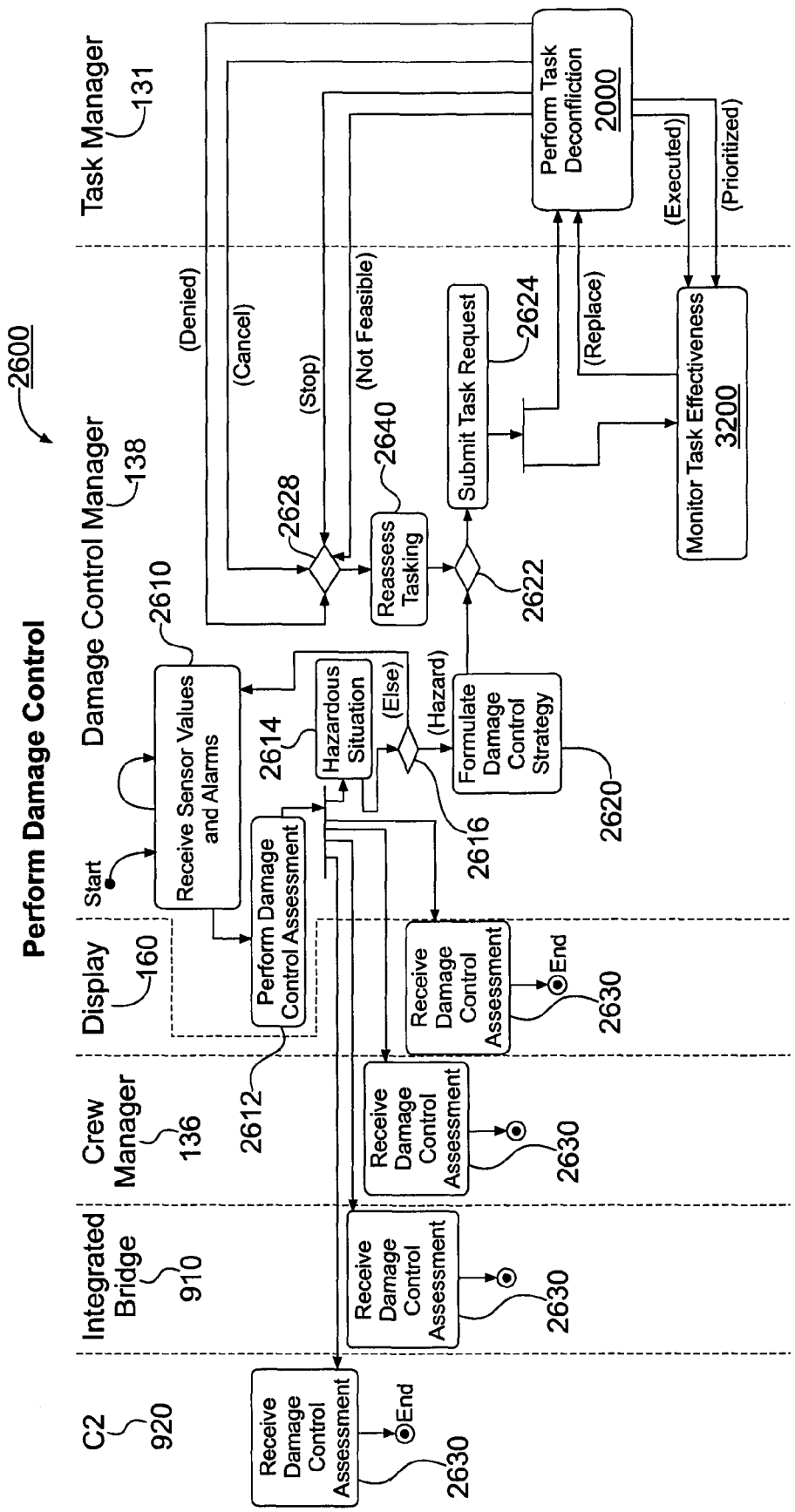

FIG. 10G is a schematic diagram of an ISM-X™ Management Component process 2600 for managing damage control utilizing the Damage Control Manager IDSS 138 in FIG. 2. From received sensor and alarm values, this IDSS 138 performs and reports a damage assessment and, if a hazardous situation is found, formulates a damage control strategy including corrective action having certain response tasks. The response tasks are prioritized and are de-conflicted by the Task Manager 131, and dangerous tasks may be eliminated and/or replaced by other tasks, until a safe set of tasks are constructed, and the de-conflicted tasks are then communicated for execution. An embodiment of an example damage control manager arrangement is described in U.S. patent application Ser. No. 11/970,147 entitled "INTEGRATED SMART HAZARD ASSESSMENT AND RESPONSE PLANNING (SHARP) SYSTEM FOR A VESSEL" which was filed on Jan. 7, 2008, and which is hereby incorporated herein by reference in its entirety.

Process 2600 receives 2610 sensor values and alarms and performs 2612 a damage control assessment based thereon, and determines 2614, 2616 therefrom whether a hazardous situation exists. That determination 2614, 2616 is preferably made by comparing sensor values and alarm values to one or more predefined sets of values for determining, e.g., whether one or more predefined thresholds are exceeded. If a hazardous situation does not exist, process 2600 returns to receiving 2612 sensor values and alarms. If a hazardous situation is determined 2614, 2616 to exist, then a damage control strategy is formulated 2620, e.g., to address the conditions indicated by the sensor values and alarms received 2610.

The damage control strategy includes a set of tasks calculated to reverse and/or mitigate the effects that led to or caused the hazardous situation, and those tasks are submitted 2624 as requests to task manager 131 for deconfliction 2000 and monitoring 3200 for effectiveness. If ineffective 3200, replacement tasks are provided for deconfliction 2000. Deconfliction 2000 provides task priority notifications and task executed notifications to task effectiveness process 3200 and also provides denials of approvals, task cancellations, task stop requests and indications of non-feasible tasks which are combined 2628 for reassessing 2440 the tasking requests. It is noted that monitoring process 3200 provides an exit from the 2340, 2342, 2344, 2346 loop, e.g., after task manager 131 provides a notification that a task has been executed, i.e. completed.

In addition, the result of performing 2612 the damage control assessment is received 2330 for display by HMI 160 and by crew manager 136, bridge 910 and C2 920, after which process 2600 exits to return to the process from which it was entered.

Figure 10H:
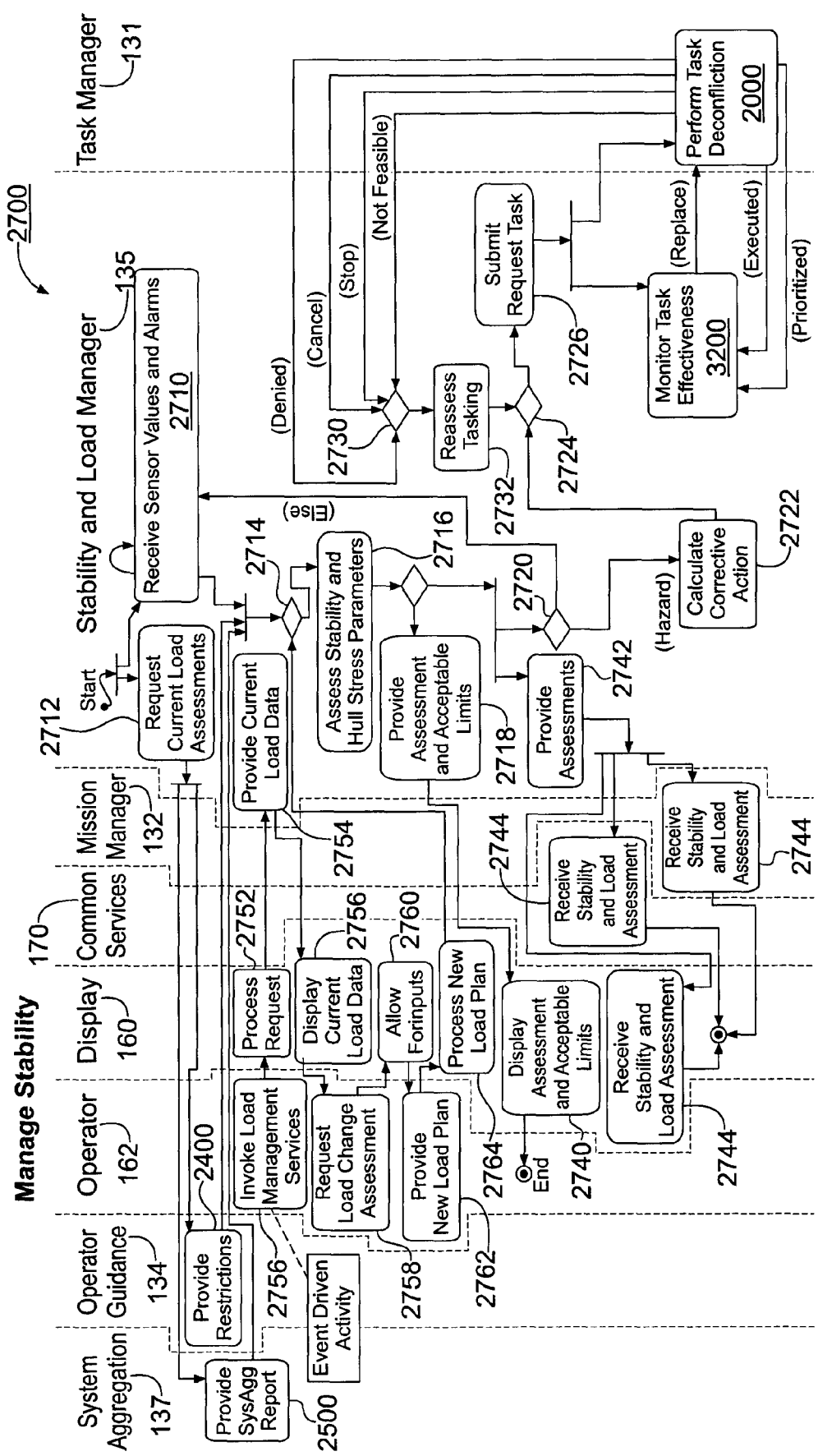

FIG. 10H is a schematic diagram of an ISM-X™ Management Component process 2700 for managing vessel (e.g., ship) stability utilizing the Stability and Load Manager IDSS 135 in FIG. 2. This IDSS 135 provides a planning capability for the operator 162 to develop a future load plan manage wet loads, dry loads, or both. In addition to this planning capability, this IDSS 135 receives sensor and alarm values, system aggregation status, speed and steering restrictions to assess and report vessel (ship) stability, load and hull stress parameters, and if a hazardous condition exists, the IDSS 135 generates corrective action including response tasks. Task requests may reflect vessel and external conditions as well as the effectiveness and modes of this IDSS 135. Tasks are prioritized and are de-conflicted 2000 by the Task Manager 131.

Process 2700 receives 2710 sensor and alarm values and requests 2712 at least current assessments from operator guidance IDSS 134 and system aggregation IDSS 137. Process 2400 of operator guidance IDSS 134 provides a report of operating restrictions, e.g., maneuverability restrictions and other possible operating restrictions, and process 2500 of system aggregation IDSS 137 provides a report of the system and equipment operational and activation status. This status report may be combined 2714 with a system load plan, e.g., provided by an operator via HMI display 160, and may be utilized as the basis for assessing 2716 stability and hull stress parameters of the vessel. The assessment is provided to an operator 162 via HMI display 160. If the assessment is a real-time assessment and the condition is not hazardous, then process 2700 returns to receiving 2710 sensor and alarm values.

Operator 162 may invoke 2750 load management services by entering a request via HMI display 160 which processes 2752 the request to stability manager 135 which provides 2754 current load data for display 2756 by HMI 160 to operator 162. Operator 162 may then request an assessment of a load change via HMI 160 which allows 2760 for load inputs for operator 162 to provide 2762 a new load plan which is processed 2764 by HMI 160 and communicated to stability manager 135 for being combined 2714 with the received 2710 sensor and alarm values.

If, however, the assessment 2716 indicates a hazardous stability or stress condition, or a possibly hazardous stability or stress condition, e.g., by assessing received sensor and alarm values against predefined sensor and alarm values, then corrective actions are calculated 2722 which includes tasks to eliminate or mitigate the hazardous condition. Corrective action tasks are submitted 2726 and processed by task manager 131 for deconfliction 2000 and monitored 3200 by stability manager 135 for effectiveness in similar manner to that described above in relation to other IDSS processes. Tasks submitted 2726 may include tasks within an effectiveness window (e.g., range) and a method of execution that is based upon the states and modes of the stability and load manager IDSS 135, e.g., tasks selected and prioritized based upon actual conditions as then existing on the vessel and its environment.

Tasks amenable to operator requests are provided 2718 to operator 162 and displayed 2740 via HMI display 160 as assessments and acceptable limits for operator guidance and use, e.g., for controlling the vessel. After receiving this information and data from stability manager 135, the operator may invoke ISM-X™ services for load management and may generate tasking requests for changing and/or shifting the various loads, e.g., dry loads and wet loads, that are inputted to the task manager 131 via HMI 160.

Stability and load assessments are provided 2742 to and are received 2744 by mission manager IDSS 132, by common services 170, and by display 160, after which process 2700 exits to the process from which it was started.

Figure 10I:
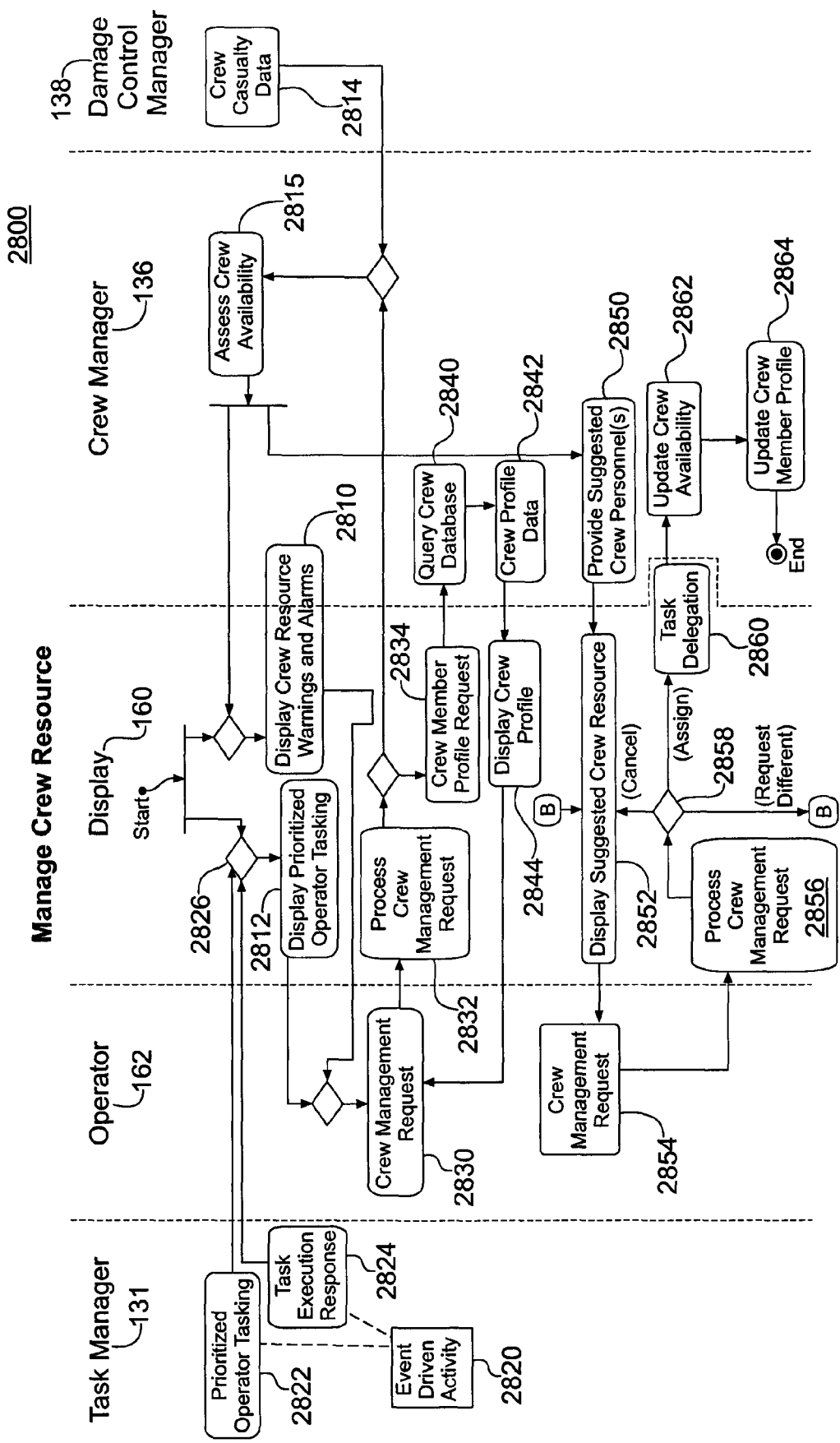

FIG. 10I is a schematic diagram of an ISM-X™ Management Component process 2800 for managing crew resources utilizing the Crew Manager IDSS 136 in FIG. 2. Crew Manager 136 always provides data for display 160 on operator tasking and crew casualties, and on other crew data as requested, e.g., crew availability, skills, rest and the like. Crew task assignments are generally recommended to the operator 162 based upon crew profiles which may consider availability, as well as the experience and training profiles stored in the crew database. Information from the crew database and suggested crew assignments may be available for display on the HMI 160. Once an operator 162 selects from the displayed suggestions, or cancels one or more requests, task delegation is performed to assign crew members to tasks and the crew profile is updated to reflect such assignments.

HMI display 160 includes a crew manager GUI that displays 2810 at least crew resource data and warnings, e.g., preferably including crew casualty data, and displays 2812 operator tasking data and related prioritization thereof essentially on a continuous basis, at least to the extent an operator 162 allows such data to be displayed. Certain events 2820, such as mission needs, loading and unloading operations, maintenance, and the like may result in task manager 131 receiving operator tasks that are to be prioritized 2822 and producing 2824 task execution responses that are combined 2826 to be displayed 2812 for the operator 162 by HMI 160.

Certain crew resource data is obtained 2814, e.g., from a crew casualty database maintained in damage control manager 138 and updated as events affecting personnel occur. Data and information therefrom is utilized by crew resource manager 136 in assessing 2816 crew availability which is provided to HMI 160 for display 2810. Crew availability is assessed 2816 by evaluating a combination of data including, e.g., current crew utilization, crew work history, experience, training, readiness, proximity to the task site, and other factors affecting availability.

The displayed 2810, 2812 data presented to operator 162 may be utilized by the operator in formulating 2830 a crew management request, e.g., a request for crew to address a particular task or condition, a request for a particular crew member or members, or a request for crew having certain qualifications and/or abilities. HMI display 160 processes 2832 that operator request to transmit it to crew manager 136 for assessing 2816 crew availability and to query 2834 crew manager 136 which queries 2840 its crew member database for one or more crew member profiles responsive to the operator request. The crew manager 136 database produces 2842 crew profile data that is displayed 2844 by HMI 160 in relation to the request 2830 of operator 162. Operator 162 may accept the profile or may make a different or modified crew management request.

Further to the foregoing, the assessment 2816 of crew availability is also utilized to provide 2850 a suggestion of crew and/or personnel to HMI 160 for display 2852 as a suggested crew resource relative to the request of operator 162. Suggestions 2850 of crew that is available may be obtained by evaluating a combination of data including, e.g., current crew utilization, crew work history, experience, training, readiness, proximity to the task site, and other factors affecting availability and suitability. Operator 162 may 2854 accept the suggestion, may cancel the request, may request another suggestion, or may make a new, different or modified crew management request, which is processed 2856 by HMI 160. If operator 162 utilizes HMI 160 to assign 2860 crew members to the task, that information is transmitted 2858 to crew manager 136 and is utilized to update 2862 the crew availability, e.g., in its crew database, and to update 2864 the crew member profiles, e.g., also in its crew database. If operator 162 cancels the request, that is processed 2856 and forwarded 2858 to cancel the display of the list of suggested crew 2852. If operator 162 requests a different crew member from the one or ones suggested and displayed 2852, that is transmitted 2858 (via ovals "B") to the display of the list of suggested crew 2852 so that a different suggestion can be considered. After the selecting sequence 2852-2858 is completed or canceled, process 2800 exits.

Figure 10J:
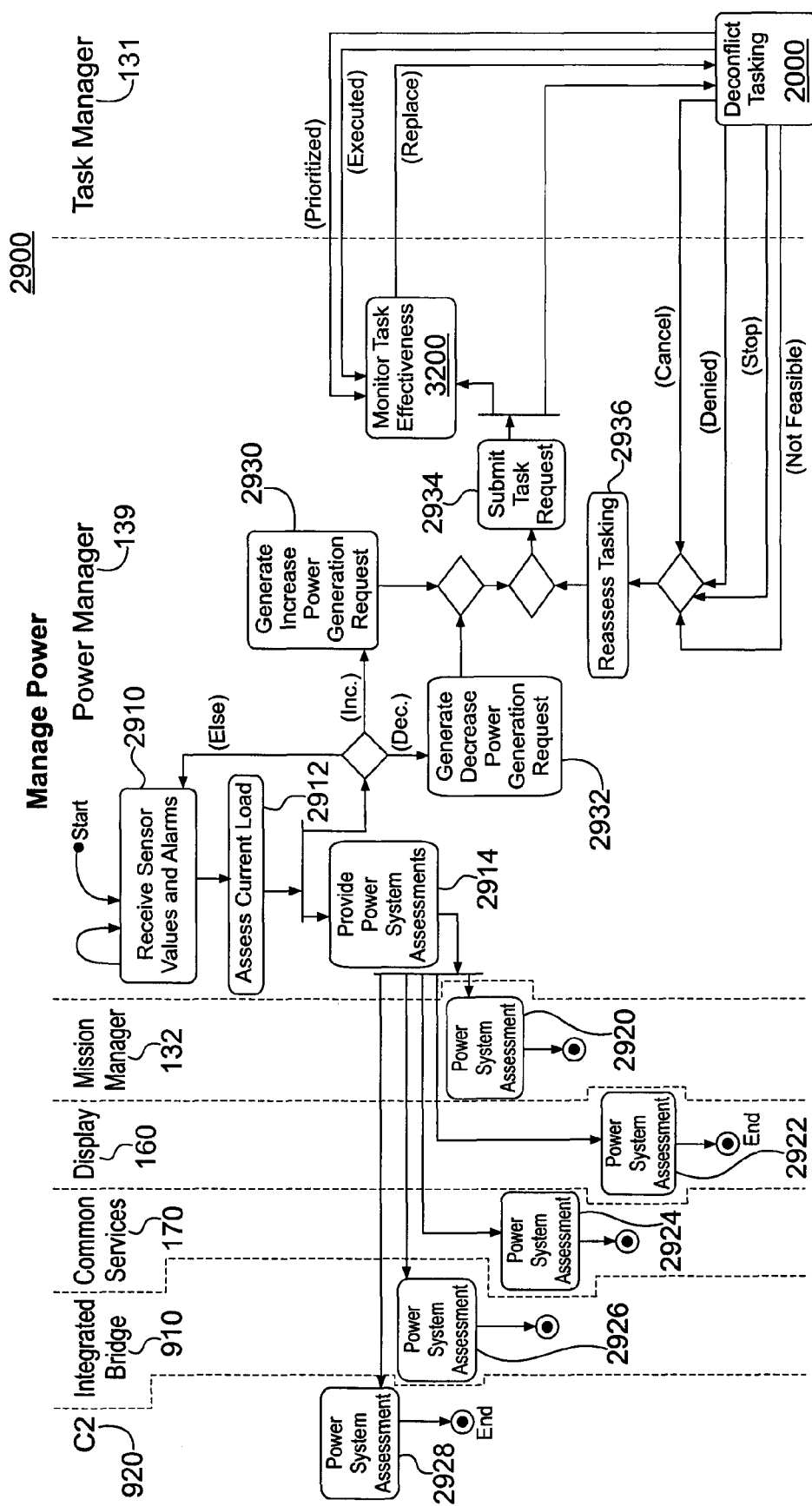

FIG. 10J is a schematic diagram of an ISM-X™ Management Component process 2900 for managing electrical power and power resources utilizing the Power Manager IDSS 139 in FIG. 2. In response to received 2910 sensor and alarm values, the current electrical load is assessed 2912 and a power system assessment is provided 2914 to various elements of ISM-X™ system 100 and the vessel, e.g., for display 2922 on the HMI 160, for use by mission manager 132 and by common services component 170, as well as to the bridge 910 and the C2 920 functions. After actions 2920-2928, process 2900 exits and returns to the process from which it started. In the principal embodiment, the load is the electrical load, however, in other embodiments other loads, e.g., hydraulic system loads, could be processed.

Depending upon the current (electrical) load, the assessment 2912 may include an indication that the power generated should be increased or decreased. The assessment 2912 is utilized by power manager 139 to generate 2930 a request to increase the level of power generated or to generate 2932 a request to decrease the level of power generated, which in turn causes tasks to be generated and submitted 2934. The submitted tasks are then are prioritized and are de-conflicted 2000 by the Task Manager 131, and monitored 3200 for effectiveness in like manner to that described above. Tasks may be reassessed 2936 as a result of deconfliction 2000 providing a stop task, cancel task, infeasible task or approval denied indication as may be appropriate, e.g., until any out of balance condition between the power load and the power generated is resolved.

Figures 11, 11A:
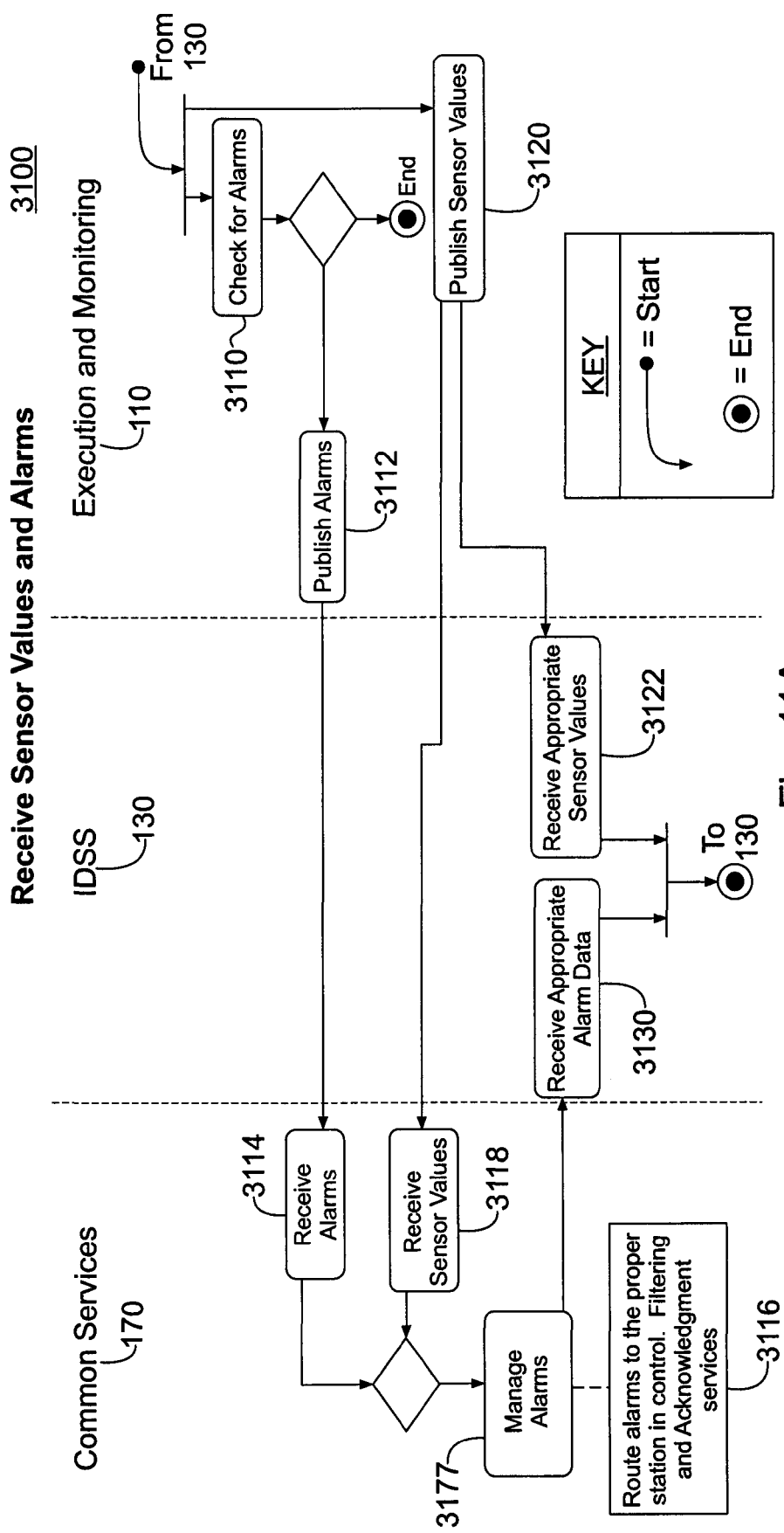
FIG. 11 comprises FIGS. 11A-11B which are schematic flow diagrams of two processes common to different elements of the management component of the example intelligent system manager system.

FIG. 11 includes two activity diagrams relating to common processes 3000 including common sub-processes 3100, 3200, performed in various ones of the management component processes in the operation of the ISM-X™ system 100. These processes 3000 are examples of the common processes provided by the Common Services Component 170 illustrated in FIG. 2. Typically one of the common services process 3100, 3200 is generally entered from one of the IDSSs 131-145 of management component 130 and after completing the common processing, generally returns to the same IDSS 131-145 of management component 130 from which it entered common process 3100, 3200.

FIG. 11A is a schematic diagram of an ISM-X™ common process 3100 for receiving and acting on sensor values and alarms received from the Execution and Monitoring Component 110 and then routing the sensor values and alarms to the appropriate one of the IDSSs in accordance with the respective IDSS functions. Inputs to the execution and monitoring component 110 are first checked for alarms 3110 and the process exits is no alarm is present. This check 3110 includes alarms provided from smart devices and alarms generated from ISM-X™ system 100 based upon signal values and predefined alarm thresholds. If an alarm is present 3112, the alarm is published 3112 to the common services component 170 wherein it is received and communicated to the alarm manager 3177 from whence it may be routed 3116 to the proper station in control, and filtering and acknowledgment services may also e provided. the alarm manager 3177 may receive sensor smart alarms, IDSS generated alarms, manual hazard and/or stability assessments, collision imminent indications, e.g., from an operator 162, or other alarm indications.

Whether or not check 3110 determines that alarms are present, sensor values are provided and published 3120 to the IDSSs 130 which receive 3122 appropriate sensor values, thereafter to exit process 3100. It is noted that each IDSS "subscribes" only to the appropriate sensor data, i.e. the sensor data that pertains to its function. Similarly, manage alarms function 3177 provides appropriate alarm data that is received 3130 by IDSS 130 to the extent the alarm data is relevant to the particular IDSS function, and process 3100 thereafter exits process 3100. Examples of sensor values that may be received 3122 from EMC 110 may include sensor values relating to valve position/status, a pressure transducer reading and/or temperature transducer reading. Alarms received 3130 from CSC 170 may include, e.g., a high tank level and/or a high pressure level. Alarm manager may also provide sensor values and alarms that it did not generate, such as system aggregation alarms, equipment health monitoring alarms, equipment health monitoring alarms, operator guidance alarms, stability and load management alarms, damage control management alarms and power management alarms.

Figure 11B:
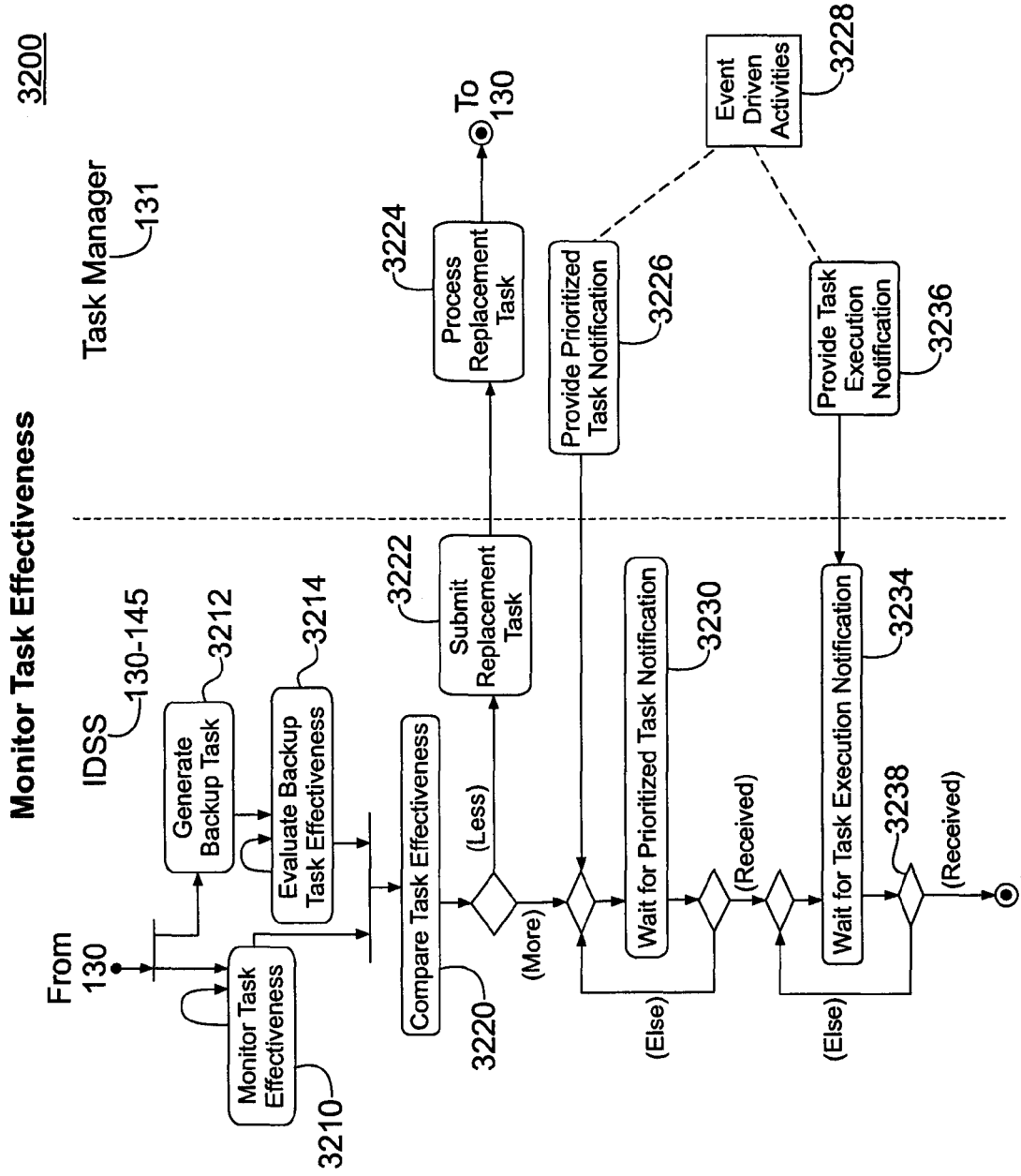

FIG. 11B is a schematic diagram of an ISM-X™ common process 3200 for monitoring task effectiveness, e.g., by comparing the effectiveness of an original task with that of a backup task, and if better performance is achievable from the backup task, then providing a replacement task for appropriate ones of the IDSSs 130-145 in accordance with the respective IDSS functions. One example of such IDSS is the Mission Manager 132.

Upon submitting a task to Task Manager 131, the IDSS 130-145 monitors 3210 the submitted task to assess the effectiveness of the implementation of that task. Upon submitting the task to Task Manager 131, the IDSS 130-145 will also generate 3212 one or more back up tasks that will attempt to achieve the same or a similar result, e.g., a task that could be utilized in place of the task being performed, which is evaluated 3214 to provide an indication of the effectiveness of the implementation of that back up task if the back up task were to be implemented. The indications of effectiveness of the task being performed and of the back up task are compared 3220 and the result of that comparison 3220 may be utilized to change from the original task to the backup task. E.g., if the effectiveness of the backup task would be superior to the performance of the task being performed, then the back up task is submitted 3222 to task manager 131 as a replacement for the task being performed, and is processed 3224 to be a replacement task upon return of process 3200 to IDSS 130. If, however, the effectiveness of the task being performed is greater than the effectiveness of the proposed back up task, then process 3200 awaits 3230 an event driven priority task.

The foregoing evaluation is preferably performed substantially continuously so that there is always available a relatively recent evaluation of relative effectiveness derived from comparing the task being performed and the back up task. Further, the evaluation, which includes estimates of effectiveness that are comparisons for substantially the same time or time period, e.g., the evaluations of effectiveness are substantially synchronized in time, so as to be estimates corresponding to the same points in time.

Should an event or other occurrence arise 3228 that might change the task or the need for the task, or that might indicate that another task should be undertaken on a priority basis, then a notification thereof is provided 3226 by task manager 131 to IDSS 130-145 and when such notification priority task is received 3230, 3232, IDSS 130-145 then waits 3234 for a notification provided 3236 from task manager 131 that the priority task has been executed. When the priority task executed notification is received 3238, process 3200 ends, and operation returns to IDSS 130.

The present arrangement can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, an optical scanner, as well as machines for reading the storage media mentioned above.

If anything is stated as being "optimum" or "deemed optimum," that may or not be a true optimum condition, but is the condition deemed to be "optimum" by virtue of its being selected in accordance with the decision rules and/or criteria defined by the applicable controlling function, e.g., the "optimum" prioritized set of tasks may not be the true optimum way for responding to a particular event or condition because de-confliction or another requirement, e.g., a mission plan, may cause certain tasks to be removed, replaced and/or lowered in priority.

An intelligent system manager system 100 for managing and controlling a platform 10 may comprise: a management component 130 for providing intelligent decision support and for managing platform 10 functions, wherein management component 130 is responsive to data representative of the platform 10 and equipment 960 thereof and is responsive to data representative of a current condition thereof; an execution and monitor component 110 for causing execution of commands from the management component 130 for controlling the platform 10 and equipment 960 thereof, and for monitoring the execution of the commands and the status of platform sensors 910-960 and platform equipment 960 for providing the data representative of a current condition thereof; a display component 160 for providing information representative of the current state of the platform 10 from the management component 130 and from the execution and monitor component 110 for display, e.g., to a human, and for receiving input, e.g., from a human; and a common services component 170 for providing processing services to the management component 130, to the execution and monitor component 110 and to the display component 160. As a result, the data representative of the platform 10 and equipment 960 thereof and the data representative of a current condition thereof are transformed to provide the information representative of the current state of the platform 10 and the equipment 960 thereof. Management component 130 may include an intelligent decision support system 130a and a control and status function 140 for the system 100 and equipment 960 of the platform 10. The intelligent decision support system 130a may include some or all of a task manager 131, a mission manager 132, an equipment health monitor 133, an operator guidance function 134, a stability and load manager 135, a crew manager 136, a system aggregation function 137, a damage control manager 138 and a power manager 139. The control and status function 140 may include some or all of a ride control function 141, an electrical function 142, a propulsion function 143, an auxiliary function 144, and a damage control function 145. Execution and monitor component 110 may include a data converter 110a, 110b and plural communication protocol adapters 110c for communicating data to and from the system manager system 100. The common services component 170 may include some or all of a time function 171, a station control manager 172, a security and login manager 173, a data logger 174, an event logger 175, an application health monitor 176, an alarm manager 177, a life cycle services function 178, a platform data store 179, a communication services function 180, an IT resource manager 181, a data trender 182, a cross domain solution function 183, and a trainer function 184. Management component 130 may analyze sensor values and alarms to determine system status, monitor equipment health, manage stability, manage damage control, manage power, and/or manage restrictions; may deconflict and prioritize commands and tasks prior to execution; may approve tasks, deny tasks, stop tasks, cancel tasks, remove tasks, and/or indicate non-feasible tasks; may monitor task effectiveness and submit replacement tasks if more effective; may maintain a queue of tasks to be executed and add to, remove, and reorder the tasks in the queue; may provide data for display via a human-interface component; or may provide control commands for equipment; or any combination of the foregoing. Execution and monitor component 130: may monitor equipment sensors and check for alarm conditions; may convert, scale and/or filter sensor data; may provide sensor values and alarm values; or may convert control commands to a predetermined protocol and distribute control commands in the predetermined protocol; or any combination of the foregoing. System manager system 100 may further comprise a development kit 300 for providing a suite of tools 310-360 for developing platform-specific applications 200 that employ the intelligent system manager system 100. The suite of tools of development kit 300 may contain some or all of a system control database development tool 310, an automated checklist manager development tool 320, a graphics development tool 330, a logic development tool 340, a system simulation development tool 350, and a data history and/or trending development tool 360. The system control database 310 may include data representative of the equipment, the location of the equipment, the characteristics of signals received and/or produced by the equipment, and alarm thresholds, if any, of the equipment, and: the data included in the system control database 310 may be employed by some or all of the automated checklist manager development tool 320, the graphics development tool 330, the logic development tool 340, the system simulation development tool 350, and the data history and/or trending development tool 360; or the data included in the system control database 310 may be employed for generating documentation representative of the platform and of the equipment thereof; or the data included in the system control database 310 may be employed by some or all of the automated checklist manager development tool 320, the graphics development tool 330, the logic development tool 340, the system simulation development tool 350, and the data history and/or trending development tool 350 and may be employed for generating documentation representative of the platform and of the equipment thereof. Platform 10 may include a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

A method 1000, 2000, 3000 for intelligently managing and controlling a platform 10 may comprise: providing intelligent decision support and managing platform functions 130-145 for providing tasks and/or commands for controlling a platform 10 and equipment 960 thereof, in a management component 130; causing execution of the tasks and/or commands, in an execution and monitor component 110; monitoring 1100 the execution of the commands and the status of platform sensors and platform equipment 960, in the execution and monitor component 110; providing 1100, 1200 information representative of the current state of the platform 10 and equipment 960 thereof from the management component 130 and from the execution and monitor component 110 for displaying, e.g., to a human via a display component 160; receiving input for controlling the platform 10 and/or equipment 960 thereof, e.g., from a human via the display component 160; and providing processing services to the management component, to the execution and monitor component, and to the display component, by a common services component 170. As a result, the data representative of the platform 10 and equipment 960 thereof and the data representative of a current condition thereof are transformed to provide the information representative of the current state of the platform 10 and the equipment thereof 960. Providing intelligent decision support and managing platform functions 130-145 may include some or all of managing tasks 1200, 2000, managing mission 2200, monitoring equipment health 2300, providing operator guidance 2400, managing stability and load 2700, managing crew 2800, managing system aggregation 2500, managing damage control 2600, and managing power 2900. Providing intelligent decision support and managing platform functions 1200, 1300 may include some or all of controlling ride, controlling an electrical function, controlling a propulsion function, controlling an auxiliary function, and controlling damage. Monitoring 1100 the execution of the commands and the status of platform sensors and platform equipment may include converting data, adapting communication protocol, and communicating data to and from the platform system. Providing processing services 170 may include some or all of providing time, managing station control, managing security and login, logging data, logging events, monitoring application health, managing alarms, providing life cycle services, a providing a platform data store, providing communication services, managing IT resources, providing data trending, providing cross domain solutions, and providing training. Providing intelligent decision support and managing platform functions 1000, 2000 may include some or all of: analyzing sensor values and alarms to determine system status, monitor equipment health, manage stability, manage damage control, manage power, and/or manage restrictions; deconflicting and prioritizing commands and tasks prior to execution; approving tasks, denying tasks, stopping tasks, canceling tasks, removing tasks, and/or indicating non-feasible tasks; monitoring task effectiveness and submitting replacement tasks if more effective; maintaining a queue of tasks to be executed and adding to, removing, and reordering the tasks in the queue; or providing control commands for equipment; providing data for display via a human-machine interface component 160, or any combination of the foregoing. Monitoring the execution of the commands and the status of platform sensors and platform equipment 1000, 2000 may include: monitoring equipment sensors and checking for alarm conditions; converting, scaling and/or filtering sensor data, providing sensor values and alarm values; or converting control commands to a predetermined protocol and distributing control commands in the predetermined protocol; or any combination of the foregoing. The method may further comprise: providing a suite of tools 300-360 for developing a platform-specific application 200 that employs the method for intelligently managing and controlling a platform system 10. Providing a suite of tools may include some or all of providing a system control database development tool, providing an automated checklist manager development tool, providing a graphics development tool, providing a logic development tool, providing a system simulation development tool, and providing a data history and/or trending development tool. System control database development tool 310 may provides a system control database 310 that includes data representative of the equipment, the location of the equipment, the characteristics of signals received and/or produced by the equipment, and alarm thresholds, if any, of the equipment, and: the data included in the system control database 310 may be employed by some or all of the automated checklist manager development tool 320, the graphics development tool 330, the logic development tool 340, the system simulation development tool 350, and the data history and/or trending development tool 360; or the data included in the system control database 310 may be employed for generating documentation representative of the platform 10 and of the equipment 960 thereof; or the data included in the system control database 310 may be employed by some or all of the automated checklist manager development tool 320, the graphics development tool 330, the logic development tool 340, the system simulation development tool 350, and the data history and/or trending development tool 360 and may be employed for generating documentation representative of the platform 10 and of the equipment 960 thereof. Before or after or before and after equipment 960 is added, removed and/or replaced, the method may further comprise: updating the system control database 310 to include equipment added, removed and/or replaced, and the characteristics thereof, and employing the suite of tools 300 to automatically update from the updated data in the system control database 310 to provide an updated platform-specific application 200 for utilizing the method for intelligently managing and controlling a platform 10 with the added, removed and/or replaced equipment 960. Platform 10 may include a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

While the present invention has been described in terms of the foregoing example embodiments, variations within the scope and spirit of the present invention as defined by the claims following will be apparent to those skilled in the art. For example, each of the processes performed by system 100 as described herein are shown generally as sequences of operations, the order in which those operations are performed may in general be the same as or be different from that illustrated and described.

Further, the number and types of components of a system 100 may be different from that illustrated and described, as may be the number and types of IDSSs of management component 130 or the services of common services component 170. For example, while a mission manager 132 and/or a damage control manager 138 is appropriate for a military vessel or a military installation, either or both may not be needed in a system 100 for a commercial vessel, e.g., a cruise ship or a civilian airliner, and a cross domain service 184 for interfacing between classified and unclassified domains would likely not be needed in a non military and/or non-government embodiment. Similarly, neither a stability and load manager IDSS 135 nor a ride control IDSS 141 nor a propulsion IDSS 143 would be needed for a system 100 for a fixed installation, although the load manager aspect of IDSS 135 may be utilized.

While power manager 139 principally manages electrical power generation, it could also monitor and control the generation of other kinds of power, such as hydraulic power, water power, propulsion power, nuclear power, wind power, and the like.

Where system 100 is embodied in a computer-readable storage medium, the computer instructions for intelligently managing and controlling a platform may be on plural physical computer-readable storage media for being executed on plural processing nodes, and some or all of the plural processing nodes: may be in the same location or in different locations, and/or may be of the same type or are of different types.

All of the U.S. Provisional Applications, U.S. patent applications, and/or U.S. patents identified herein are hereby incorporated herein by reference in their entireties.

In general, a dimension, size, formulation, parameter, shape or other quantity or characteristic is "about" or "approximate" whether or not expressly stated to be such. It is noted that embodiments of very different sizes, shapes and dimensions may employ the described arrangements.

Finally, numerical values stated are typical or example values, are not limiting values, and do not preclude substantially larger and/or substantially smaller values. Values in any given embodiment may be substantially larger and/or may be substantially smaller than the example or typical values stated.

| GLOSSARY OF TERMS AND ACRONYMS | |
|---|---|
| ACS | Auxiliary Control System |
| API | Application Programming Interface |
| APMS | Automated Power Management System |
| BIT | Built In Test |
| C2 or C² | Command and Control systems |
| CBM | Condition-Based Maintenance |
| COTS | Commercial Off The Shelf (e.g., software) |
| CS | Common Services (e.g., Component) |
| CSC | Common Services Component |
| DC | Damage Control |
| DCS | Damage Control System |
| EHM | Equipment Health Monitor |
| EMC | Execution and Monitoring Component |
| EXCOMMS | External Communications Systems |
| GUI | Graphical User Interface |
| HM&E | Hull, Mechanical & Electrical (e.g., equipment) |
| HMI | Human Machine Interface |
| IBS | Integrated Bridge Systems |
| ICD | Interface Control Document |
| IDSS | Intelligent Decision Support Systems |
| IEC | International Electrotechnical Commission (a standards organization) |
| IMCS | Integrated Machinery Control System |
| I/O | Input/Output (e.g., equipment) |
| IT | Information Technology |
| IPMS | Integrated Platform Management System |
| ISM-X | Intelligent System Manager |
| LAN | Local Area Network |
| NAV | Navigation (e.g., systems) |
| NS | Navigation Systems |
| OBT | Onboard Trainer |
| PLC | Programmable Logic Controllers |
| RTU | Remote Terminal Unit |
| SCID | System Control Intelligent Database |
| SIC | Station in Control |
| SLM | Stability and Load Manager |
| SME | Subject Matter Expert |
| UTP | Universal Time Protocol |

What is claimed is:

1. An intelligent system manager system for managing and controlling a platform comprising:
    a management component for providing intelligent decision support and for managing platform functions, wherein said management component is responsive to data representative of the platform and equipment thereof and is responsive to data representative of a current condition thereof, wherein the management component includes an intelligent decision support system and a control and status function for the system and equipment of the platform;
    an execution and monitor component for causing execution of commands from the management component for controlling the platform and equipment thereof, and for monitoring the execution of the commands and the status of platform sensors and platform equipment for providing the data representative of a current condition thereof;
    a display component for providing information representative of the current state of the platform and the equipment thereof from the management component and from the execution and monitor component for display and for receiving input; and
    a common services component for providing processing services to the management component, to the execution and monitor component, and to the display component,
    whereby the data representative of the platform and equipment thereof and the data representative of a current condition thereof are transformed to provide the information representative of the current state of the platform and the equipment thereof.

2. The system manager system of claim 1 wherein the intelligent decision support system includes some or all of a task manager, a mission manager, an equipment health monitor, an operator guidance function, a stability and load manager, a crew manager, a system aggregation function, a damage control manager and a power manager.

3. The system manager system of claim 1 wherein the control and status function includes some or all of a ride control function, an electrical function, a propulsion function, an auxiliary function, and a damage control function.

4. The system manager system of claim 1 wherein the execution and monitor component includes a data converter and plural communication protocol adapters for communicating data to and from the system manager system.

5. The system manager system of claim 1 wherein the common services component includes some or all of a time function, a station control manager, a security and login manager, a data logger, an event logger, an application health monitor, an alarm manager, a life cycle services function, a platform data store, a communication services function, an IT resource manager, a data trender, a cross domain solution function, and a trainer function.

6. The system manager system of claim 1 wherein said management component:
    analyzes sensor values and alarms to determine system status, monitor equipment health, manage stability, manage damage control, manage power, and/or manage restrictions;
    deconflicts and prioritizes commands and tasks prior to execution;
    approves tasks, denies tasks, stops tasks, cancels tasks, removes tasks, and/or indicates non-feasible tasks;
    monitors task effectiveness and submits replacement tasks if more effective;
    maintains a queue of tasks to be executed and adds to, removes, and reorders the tasks in the queue; or
    provides control commands for equipment;
    provides data for display via a human interface component; or
    any combination of the foregoing.

7. The system manager system of claim 1 wherein said execution and monitor component:
    monitors equipment sensors and checks for alarm conditions;
    converts, scales and filters sensor data;
    provides sensor values and alarm values; or
    converts control commands to a predetermined protocol and distributes control commands in the predetermined protocol; or
    any combination of the foregoing.

8. The system manager system of claim 1 further comprising:
    a development kit for providing a suite of tools for developing of platform-specific applications that employ the intelligent system manager system.

9. The system manager system of claim 8 wherein the development kit contains some or all of a system control database development tool, an automated checklist manager development tool, a graphics development tool, a logic development tool, a system simulation development tool, and a data history and/or trending development tool.

10. The system manager system of claim 9 wherein the system control database includes data representative of the equipment, the location of the equipment, the characteristics of signals received and/or produced by the equipment, and alarm thresholds, if any, of the equipment, and:
    wherein the data included in the system control database is employed by some or all of the automated checklist manager development tool, the graphics development tool, the logic development tool, the system simulation development tool, and the data history and/or trending development tool; or
    wherein the data included in the system control database is employed for generating documentation representative of the platform and of the equipment thereof; or
    wherein the data included in the system control database is employed by some or all of the automated checklist manager development tool, the graphics development tool, the logic development tool, the system simulation development tool, and the data history and/or trending development tool and is employed for generating documentation representative of the platform and of the equipment thereof.

11. The system manager system of claim 1 wherein the platform includes a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

12. A method for intelligently managing and controlling a platform, the method comprising:
    providing intelligent decision support and managing platform functions for providing tasks and/or commands for controlling a platform and equipment thereof, in a management component responsive to data representative of the platform and equipment thereof and to data representative of a current condition thereof, wherein the management component includes an intelligent decision support system and a control and status function for the system and equipment of the platform;

causing execution of the tasks and/or commands, in an execution and monitor component;

monitoring the execution of the commands and the status of platform sensors and platform equipment, in the execution and monitor component;

providing information representative of the current state of the platform and equipment thereof from the management component and from the execution and monitor component to a display component for display;

receiving input for controlling the platform and/or equipment thereof from a human via the display component; and providing processing services to the management component, to the execution and monitor component, and to the display component, by a common services component, whereby the data representative of the platform and equipment thereof and the data representative of a current condition thereof are transformed to provide the information representative of the current state of the platform and equipment thereof.

13. The method of claim 12 wherein said providing intelligent decision support and managing platform functions includes some or all of managing tasks, managing mission, monitoring equipment health, providing operator guidance, managing stability and load, managing crew, managing system aggregation, managing damage control, and managing power.

14. The method of claim 12 wherein said providing intelligent decision support and managing platform functions includes some or all of controlling ride, controlling an electrical function, controlling a propulsion function, controlling an auxiliary function, and controlling damage.

15. The method of claim 12 wherein said monitoring the execution of the commands and the status of platform sensors and platform equipment includes converting data, adapting communication protocol, and communicating data to and from the platform system.

16. The method of claim 12 wherein said providing processing services includes some or all of providing time, managing station control, managing security and login, logging data, logging events, monitoring application health, managing alarms, providing life cycle services, a providing a platform data store, providing communication services, managing IT resources, providing data trending, providing cross domain solutions, and providing training.

17. The method of claim 12 wherein said providing intelligent decision support and managing platform functions includes some or all of:

analyzing sensor values and alarms to determine system status, monitor equipment health, manage stability, manage damage control, manage power, and/or manage restrictions;

deconflicting and prioritizing commands and tasks prior to execution;

approving tasks, denying tasks, stopping tasks, canceling tasks, removing tasks, and/or indicating non-feasible tasks;

monitoring task effectiveness and submitting replacement tasks if more effective;

maintaining a queue of tasks to be executed and adding to, removing, and reordering the tasks in the queue;

providing control commands for equipment; or providing data for display via a human-interface component; or any combination of the foregoing.

18. The method of claim 12 wherein said monitoring the execution of the commands and the status of platform sensors and platform equipment includes:

monitoring equipment sensors and checking for alarm conditions;

converting, scaling and filtering alarm data;

providing sensor values and alarm values; or converting control commands to a predetermined protocol and distributing control commands in the predetermined protocol; or any combination of the foregoing.

19. The method of claim 12 further comprising:

providing a suite of tools for developing a platform-specific application that employs the method for intelligently managing and controlling a platform system.

20. The method of claim 19 wherein said providing a suite of tools includes some or all of providing a system control database development tool, providing an automated checklist manager development tool, providing a graphics development tool, providing a logic development tool, providing a system simulation development tool, and providing a data history and/or trending development tool.

21. The method of claim 20 wherein the system control database development tool provides a system control database that includes data representative of the equipment, the location of the equipment, the characteristics of signals received and/or produced by the equipment, and alarm thresholds, if any, of the equipment, and:

wherein the data included in the system control database is employed by some or all of the automated checklist manager development tool, the graphics development tool, the logic development tool, the system simulation development tool, and the data history and/or trending development tool; or wherein the data included in the system control database is employed for generating documentation representative of the platform and of the equipment thereof; or wherein the data included in the system control database is employed by some or all of the automated checklist manager development tool, the graphics development tool, the logic development tool, the system simulation development tool, and the data history and/or trending development tool and is employed for generating documentation representative of the platform and of the equipment thereof.

22. The method of claim 20, before or after or before and after equipment is added, removed and/or replaced, further comprising:

updating the system control database to include equipment added, removed and/or replaced, and the characteristics thereof, and employing the suite of tools to automatically update from the updated data in the system control database to provide an updated platform-specific application for utilizing the method for intelligently managing and controlling a platform with the added, removed and/or replaced equipment.

23. The method of claim 12 wherein the platform includes a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

24. A system for intelligently managing and controlling a platform comprising:
- means for providing intelligent decision support and managing platform functions for providing tasks and/or commands for controlling a platform and equipment thereof, in a management component responsive to data representative of the platform and equipment thereof and to data representative of a current condition thereof;
- means for causing execution of the tasks and/or commands, in an execution and monitor component;
- means for monitoring the execution of the commands and the status of platform sensors and platform equipment, in the execution and monitor component;
- means for providing information representative of the current state of the platform and equipment thereof from the management component and from the execution and monitor component to a display component for display;
- means for receiving input for controlling the platform and/or equipment thereof from a human via the display component; and
- means for providing processing services to the management component, to the execution and monitor component, and to the display component, by a common services component,
- whereby the data representative of the platform and equipment thereof and the data representative of a current condition thereof are transformed to provide the information representative of the current state of the platform and equipment thereof.

25. The system managing system of claim 24 wherein the management component includes an intelligent decision support system and a control and status function for the system and equipment of the platform.

26. The system managing system of claim 25 wherein the intelligent decision support system includes some or all of a task manager, a mission manager, an equipment health monitor, an operator guidance function, a stability and load manager, a crew manager, a system aggregation function, a damage control manager and a power manager.

27. The system managing system of claim 25 wherein the control and status function includes some or all of a ride control function, an electrical function, a propulsion function, an auxiliary function, and a damage control function.

28. The system managing system of claim 24 wherein the execution and monitor component includes a data converter and plural communication protocol adapters for communicating data to and from the system manager system.

29. The system managing system of claim 24 wherein the common services component includes some or all of a time function, a station control manager, a security and login manager, a data logger, an event logger, an application health monitor, an alarm manager, a life cycle services function, a platform data store, a communication services function, an IT resource manager, a data trender, a cross domain solution function, and a trainer function.

30. The system managing system of claim 24 wherein said management component:
- analyzes sensor values and alarms to determine system status, monitor equipment health, manage stability, manage damage control, manage power, and/or manage restrictions;
- deconflicts and prioritizes commands and tasks prior to execution;
- approves tasks, denies tasks, stops tasks, cancels tasks, removes tasks, and/or indicates non-feasible tasks;
- monitors task effectiveness and submits replacement tasks if more effective;
- maintains a queue of tasks to be executed and adds to, removes, and reorders the tasks in the queue;
- provides control commands for equipment; or
- provides data for display via a human-interface component; or
- any combination of the foregoing.

31. The system managing system of claim 24 wherein said execution and monitor component:
- monitors equipment sensors and checks for alarm conditions;
- converts, scales and filters sensor data; or
- provides sensor values and alarm values; or
- converts control commands to a predetermined protocol and distributes control commands in the predetermined protocol; or
- any combination of the foregoing.

32. The system managing system of claim 24 further comprising:
- a development kit for providing a suite of tools for developing a platform-specific application that employs the intelligent system manager system.

33. The system managing system of claim 32 wherein the development kit contains some or all of a system control database development tool, an automated checklist manager development tool, a graphics development tool, a logic development tool, a system simulation development tool, and a data history and/or trending development tool.

34. The method of claim 33 wherein the system control database development tool provides a system control database that includes data representative of the equipment, the location of the equipment, the characteristics of signals received and/or produced by the equipment, and alarm thresholds, if any, of the equipment, and:
- wherein the data included in the system control database is employed by some or all of the automated checklist manager development tool, the graphics development tool, the logic development tool, the system simulation development tool, and the data history and/or trending development tool; or
- wherein the data included in the system control database is employed for generating documentation representative of the platform and of the equipment thereof; or
- wherein the data included in the system control database is employed by some or all of the automated checklist manager development tool, the graphics development tool, the logic development tool, the system simulation development tool, and the data history and/or trending development tool and is employed for generating documentation representative of the platform and of the equipment thereof.

35. The method of claim 33, before or after or before and after equipment is added, removed and/or replaced, further comprising:
- updating the system control database to include equipment added, removed and/or replaced, and the characteristics thereof, and
- employing the suite of tools to automatically update from the updated data in the system control database to provide an updated platform-specific application for utilizing the method for intelligently managing and controlling a platform with the added, removed and/or replaced equipment.

36. The system managing system of claim 24 wherein the platform includes a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

37. A computer-readable storage medium encoded with computer instructions for intelligently managing and controlling a platform, comprising:
- means for causing a computer to provide intelligent decision support and to manage platform functions for providing tasks and/or commands for controlling a platform and equipment thereof, in a management component responsive to data representative of the platform and equipment thereof and to data representative of a current condition thereof;
- means for causing the computer to cause execution of the tasks and/or commands, in an execution and monitor component;
- means for causing the computer to monitor the execution of the commands and the status of platform sensors and platform equipment, in the execution and monitor component;
- means for causing the computer to provide information representative of the current state of the platform and equipment thereof for display in a human perceivable form;
- means for causing the computer to receive input for controlling the platform and/or equipment thereof; and
- means for causing the computer to provide shared processing services to the management component, to the execution and monitor component and to a display component,
- whereby the data representative of the platform and equipment thereof and the data representative of a current condition thereof are transformed to provide the information representative of the current state of the platform and equipment thereof.

38. The computer-readable storage medium of claim 37 wherein said means for causing the computer to provide intelligent decision support and to manage platform functions includes some or all of managing tasks, managing mission, monitoring equipment health, providing operator guidance, managing stability and load, managing crew, managing system aggregation, managing damage control, managing power, controlling ride, controlling an electrical function, controlling a propulsion function, controlling an auxiliary function, and controlling damage.

39. The computer-readable storage medium of claim 37 wherein said means for causing the computer to monitor the execution of the commands and the status of platform sensors and platform equipment includes converting data, adapting communication protocol, and communicating data to and from the platform system.

40. The computer-readable storage medium of claim 37 wherein said means for causing the computer to provide processing services includes some or all of providing time, managing station control, managing security and login, logging data, logging events, monitoring application health, managing alarms, providing life cycle services, a providing a platform data store, providing communication services, managing IT resources, providing data trending, providing cross domain solutions, and providing training.

41. The computer-readable storage medium of claim 37 wherein said means for causing the computer to provide intelligent decision support and to manage platform functions includes:
- means for causing the computer to analyze sensor values and alarms to determine system status, monitor equipment health, manage stability, manage damage control, manage power, and/or manage restrictions;
- means for causing the computer to deconflict and prioritize commands and tasks prior to execution;
- means for causing the computer to approve tasks, deny tasks, stop tasks, cancel tasks, remove tasks, and/or indicate non-feasible tasks;
- means for causing the computer to monitor task effectiveness and submit replacement tasks if more effective;
- means for causing the computer to maintain a queue of tasks to be executed and add to, remove, and reorder the tasks in the queue;
- means for causing the computer to provide control commands for equipment; or
- means for causing the computer to provide data for display via a human-machine interface component; or
- any combination of the foregoing.

42. The computer-readable storage medium of claim 37 wherein said means for causing the computer to monitor the execution of the commands and the status of platform sensors and platform equipment includes:
- means for causing the computer to monitor equipment sensors and check for alarm conditions;
- means for causing the computer to convert, scale, and filter sensor data;
- means for causing the computer to provide sensor values and alarm values; or
- means for causing the computer to convert control commands to a predetermined protocol and distribute control commands in the predetermined protocol; or
- any combination of the foregoing.

43. The computer-readable storage medium of claim 37 further comprising:
- means for causing the computer to provide a suite of tools for developing a platform-specific application that employs the computer-readable storage medium for intelligently managing and controlling a platform system.

44. The computer-readable storage medium of claim 43 wherein said means for causing the computer to provide a suite of tools includes some or all of providing a system control database development tool, providing an automated checklist manager development tool, providing a graphics development tool, providing a logic development tool, providing a system simulation development tool, and providing a data history and/or trending development tool.

45. The computer-readable storage medium of claim 44 wherein the system control database development tool provides a system control database that includes data representative of the equipment, the location of the equipment, the characteristics of signals received and/or produced by the equipment, and alarm thresholds, if any, of the equipment, and:
- wherein the data included in the system control database is employed by some or all of the automated checklist manager development tool, the graphics development tool, the logic development tool, the system simulation development tool, and the data history and/or trending development tool; or
- wherein the data included in the system control database is employed for generating documentation representative of the platform and of the equipment thereof; or
- wherein the data included in the system control database is employed by some or all of the automated checklist manager development tool, the graphics development tool, the logic development tool, the system simulation development tool, and the data history and/or trending development tool and is employed for generating documentation representative of the platform and of the equipment thereof.

46. The computer-readable storage medium of claim 44, before or after or before and after equipment is added, removed and/or replaced, further comprising:
  updating the system control database to include equipment added, removed and/or replaced, and the characteristics thereof, and
  employing the suite of tools to automatically update from the updated data in the system control database to provide an updated platform-specific application for utilizing the method for intelligently managing and controlling a platform with the added, removed and/or replaced equipment.

47. The computer-readable storage medium of claim 37 wherein the platform includes a vessel, a government vessel, a commercial vessel, a space vessel, a ship, a government ship, a commercial ship, a space ship, an aircraft, a government aircraft, a commercial aircraft, an installation, a building, a factory, a facility, an oil rig, a drilling platform, a refinery, an industrial facility, a manufacturing facility, a processing facility, an automated facility, an integrated production system, or an integrated processing system.

48. The computer-readable storage medium of claim 37 wherein the computer instructions for intelligently managing and controlling a platform are on plural physical computer-readable storage media for being executed on plural processing nodes, and wherein some or all of the plural processing nodes:
  are in the same location or are in different locations, and/or
  are of the same type or are of different types.

* * * * *